United States Patent [19]
Minor et al.

[11] Patent Number: 5,275,354
[45] Date of Patent: Jan. 4, 1994

[54] GUIDANCE AND TARGETING SYSTEM

[75] Inventors: Lewis G. Minor; Robert T. Kitahara, both of Arlington, Tex.

[73] Assignee: Loral Vought Systems Corporation, Grand Prairie, Tex.

[21] Appl. No.: 912,914

[22] Filed: Jul. 13, 1992

[51] Int. Cl.$^5$ .......................... F41G 7/34; G01S 17/00
[52] U.S. Cl. .................................................. 244/3.17
[58] Field of Search ............................ 244/3.17, 3.16; 235/411, 412; 364/423; 382/1, 48; 356/5, 3

[56] References Cited

U.S. PATENT DOCUMENTS

| | | | |
|---|---|---|---|
| 3,459,392 | 8/1969 | Buynak et al. | 244/3.16 |
| 4,162,775 | 7/1979 | Voles | 244/3.17 |
| 4,383,663 | 5/1983 | Nichols | 244/3.16 |
| 5,088,659 | 2/1992 | Neff et al. | 244/3.16 |

FOREIGN PATENT DOCUMENTS 2164427  3/1986  United Kingdom ............... 244/3.17

Primary Examiner—Ian J. Lobo
Attorney, Agent, or Firm—Arnold, White & Durkee

[57] ABSTRACT

The invention provides a method and apparatus for recognizing physical objects, such as targets, through three dimensional image sensing. A three dimensional sensor, such as a solid-state LADAR sensor, is utilized to establish a three dimensional image of an object or target. The target will be identified or recognized in reference to a two dimensional digital representation of the object taken from a first eye point. A sensor field of view anticipated to include the object will be transformed such that sensed data is viewed from the perspective of the eye point from which the reference image was established. Selected surfaces or contours of the two dimensional image and the transformed image are then compared to identify the object or target in question.

17 Claims, 10 Drawing Sheets

REFERENCE IMAGE DATA — 52

54 — EYE-POINT

| | | | |
|---|---|---|---|
| LON | 37° | 15' | 10.12" E |
| LAT | 33° | 20' | 10.13" N |
| ALT (m) | 100,000 | | |

56 — SHADOWS (YES/NO)

YES

58 — TIME

1210.12

60 — DATE

12/6/93

TARGETING DATA

46 — AIM-POINT

| | | | |
|---|---|---|---|
| LON | 37° | 32' | 15.00" E |
| LAT | 33° | 21' | 41.12" N |
| ALT (m) | 10.0 | | |

48 — FUZE RANGE (m)

20.0

50 — OFF-SET AIM (m)

| ΔX | ΔY | ΔZ |
|---|---|---|
| 0.0 | 0.0 | 10.0 |

Fig. 3

GUIDANCE AND TARGETING SYSTEM

BACKGROUND OF THE INVENTION

The present invention relates generally to guidance and targeting systems such as may be utilized with air-conveyed weapons, such as missiles and glide bombs, etc.; and more specifically relates to guidance and targeting systems utilizing imaging sensors in such weapons to identify targets and to be used in guiding the weapon toward the target.

Many conventional weapon guidance and targeting systems are utilized to acquire specific targets, and to guide the missile or other weapon to the specific, identified, fixed target. These conventional systems use some type of imaging sensor, such as a passive infrared, MMW, TV, SAR, or $CO_2$ laser radar (LADAR) sensor. Each of these conventional systems requires that for any specific target, a target reference be prepared. Conventional target reference preparation typically requires the generation of a three dimensional image or model of the target, and may further require the identification of materials for objects and surfaces presented in the three dimensional reference image. This target reference image is then loaded on board the missile to provide a reference for comparison with data sensed by the imaging sensor.

As will be readily appreciated, the difficulty of preparing these target reference models may often make the process extremely time consuming, potentially taking hours and even days of preparation. In many tactical scenarios, this preparation time, and accordingly relatively low response time to changing situations, can present a serious tactical or strategic problem. Another problem, apparent from the discussion above, is that reconnaissance must not only obtain sufficient visual data to facilitate generation of the reference model, but must also provide information regarding materials and stereo pair information to facilitate the three dimensional modeling. Otherwise, the model would contain errors making guidance inaccurate.

Once the basic three dimensional model is created based upon the reconnaissance data, additional complex modeling must be applied to predict IR, MMW, and/or SAR signatures to provide the target reference model to be utilized by the weapon during attack. Once the three dimensional reference model is established, and attack geometry for the weapon is selected, a target reference file is generated for loading into the weapon. This target reference file is frequently an edge map modeled after the edge signatures predicted to be viewed by the particular imaging sensor of the missile. During an attack, the target reference file will be compared to the sensed image to determine when the target has been located and to provide guidance information to the missile guidance system.

As noted above, a significant problem with conventional systems is the requirement that a three dimensional target reference model be prepared in order to establish a target reference file for use on the missile. Additionally, the complexity of the modeling, involving the prediction of signatures which would be recognized by the involved sensor, based upon the reconnaissance data, is significant. Additionally, conventional systems have typically been relatively constrained to attack from the reconnaissance sensor viewing direction, severely limiting tactical options.

Accordingly, the present invention provides a new method and apparatus for guiding and targeting a weapon where a three dimensional imaging sensor may be utilized to provide target recognition without the requirement of the preparation of three dimensional models, thereby optimizing and simplifying mission planning and preparation operations.

SUMMARY OF THE INVENTION

The present invention provides a method and apparatus for recognizing a selected physical object, such as a potential target, through three dimensional image sensing. The method and apparatus are particularly suited for use with air-conveyed weapons, such as missiles, glide bombs, etc. Once a physical object has been recognized, it may be identified as a target, and the resulting target identification may be used in effecting or controlling the guidance of a weapon toward the target.

In one preferred embodiment, selected surfaces of an object will be identified relative to a generally two dimensional reference image of the object as viewed from a given viewpoint, or "eye point". The reference image, in one particularly preferred embodiment, is derived substantially in part from a photograph. However, other imagery such as synthetic aperture radar (SAR), may also be employed to provide the reference image.

A sensor carried by the missile or other weapon will be utilized to establish a three dimensional image of the object or target as the weapon approaches the target. The position of the sensor will define a second eye point relative to the object. In one particularly preferred implementation, solid-state LADAR, will be utilized as the weapon sensor mechanism.

To facilitate object recognition, the sensed three dimensional image will be transformed to form a transformed image of the object as the sensed portions of the object would be viewed from the eye point from which the two dimensional reference image was obtained. This transformation provides images which may be correlated with the reference image through correlation of similar features or characteristics. In a particularly preferred embodiment, the images will be cot elated through use of edge matching techniques, with both the reference image and the transformed image having lines digitally defined through their end points. In other implementations, planes or other defined surfaces or intensity data, may be utilized to correlate between the reference image and the transformed image.

Once a transformed image and the reference image have been sufficiently matched to identify a target, or to specifically identify a particular aim point (or data coordinate point) on the target, an error signal may be generated and communicated to the guidance system of the weapon to control the course of the weapon. In a particularly preferred embodiment, this error signal will include not only placement in terms of X, Y and Z coordinates, but will also include angular error and angular rate error data.

BRIEF DESCRIPTION OF THE DRAWINGS

FIG. 3 depicts exemplary input mensuration data to be utilized in preparation of the reference image for active processing during an operation in accordance with the present invention.

Figure 7A:
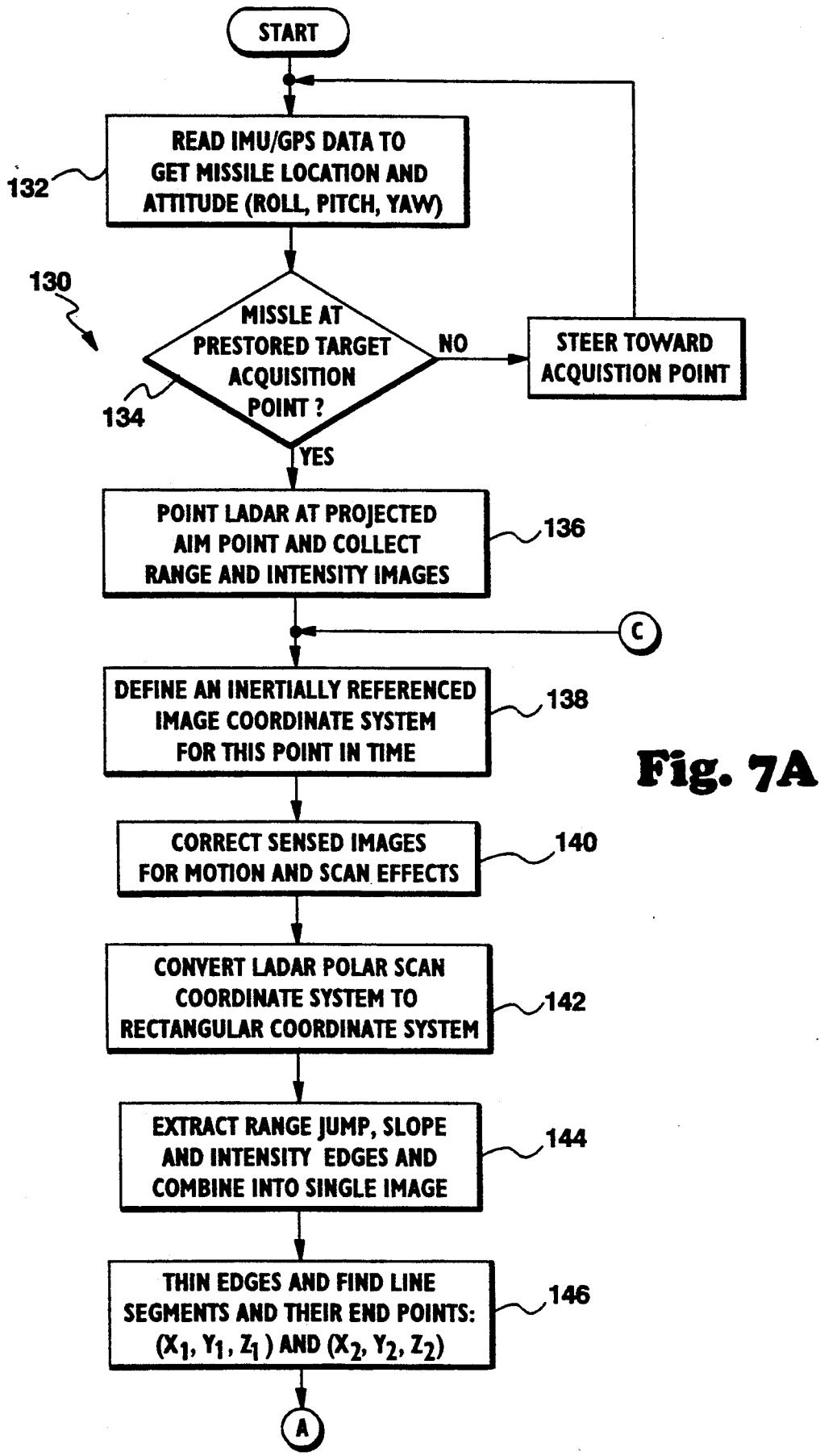
FIGS. 7A-C represent an exemplary flow chart of processing of LADAR sensed images relative to a target area during a hypothetical operation, in accordance with the present invention.
Figure 7B:
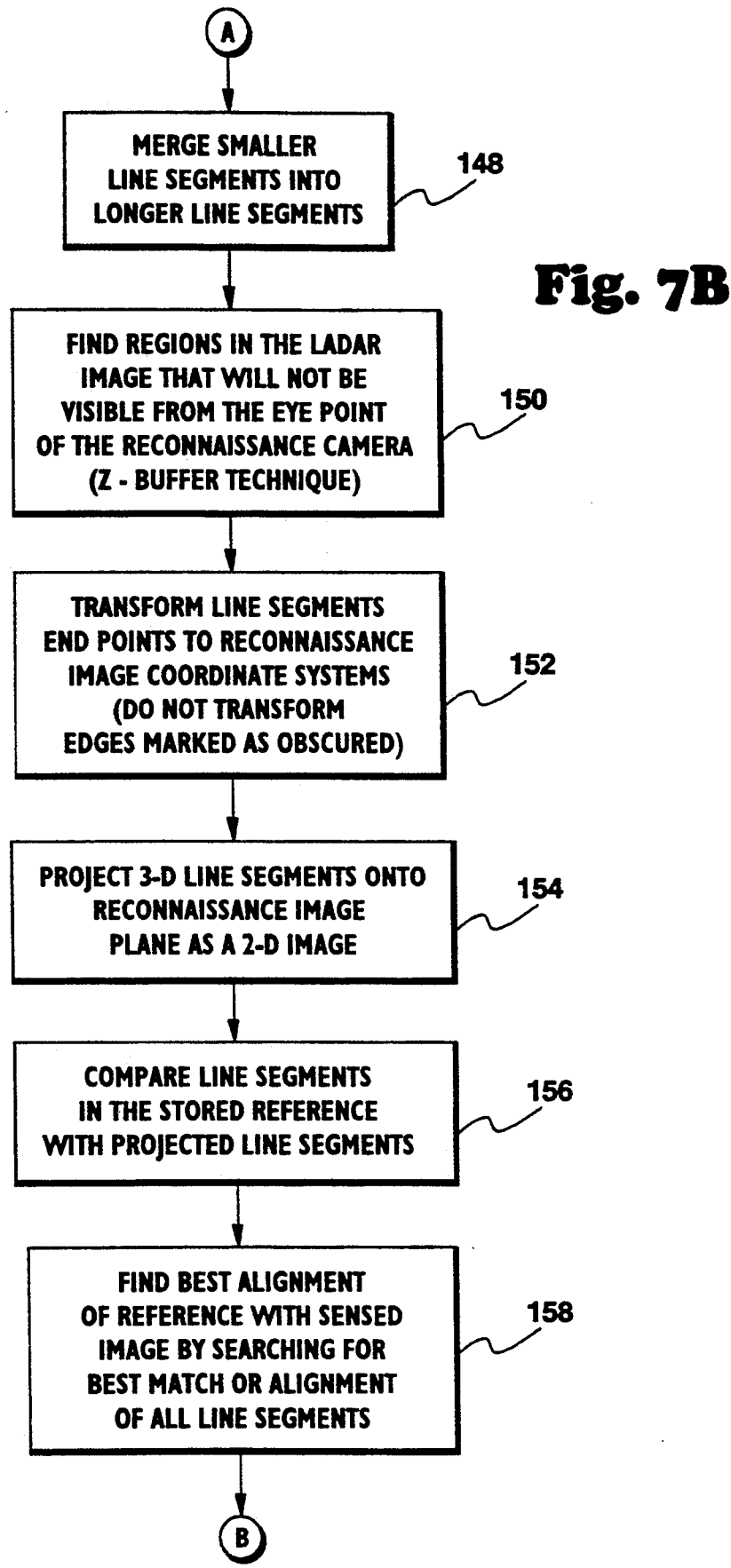
Figure 7C:
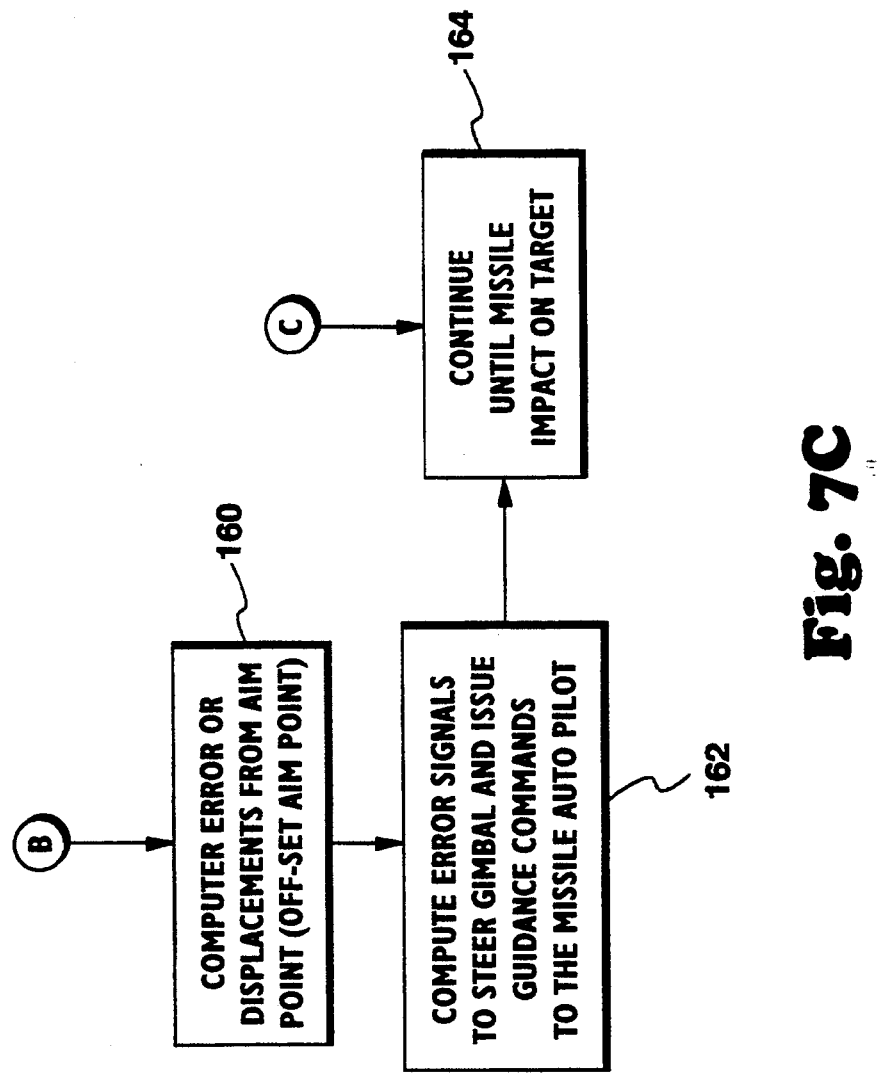

At the end of the application is an Appendix A which contains source code depicting the steps and operations identified in the flow chart of FIGS. 7A-C, as well as sub-operations and steps thereof, and additional operations.

DETAILED DESCRIPTION OF PREFERRED EMBODIMENTS

The techniques described and illustrated herein are believed to be useful with any sensor system providing both range imaging to facilitate the establishing of an edge image, and intensity imaging. However, the system is preferred to operate through use of a solid-state LADAR (SS-LADAR) sensor system. In such a system, range data is obtained by measuring the time delay between transmitted and received laser light pulses emitted by the LADAR seeker. Pulses are preferably provided by a Q-switched, solid-state laser, such as ND:YLF, ND:YAG, or Nd:YVO$_4$ laser, for example, pumped by an external, remotely located diode laser, for example a GaAlAs diode laser.

In a particularly preferred embodiment, a gallium aluminum arsenide laser pumps a solid-state laser which is mounted on a gambled optical system, and which emits the laser light energy employed for illuminating the target. The gallium aluminum arsenide pumping laser produces a continuous signal of wavelengths suitable for pumping the solid-state laser in the crystal absorption band width. The pumping laser preferably laser preferably has an output power, such as in the ten to twenty watt range, which is sufficient to actuate the solid-state laser.

In this particularly preferred embodiment, the solid-state laser is one of the previously identified types operable to produce pulses with widths of ten to twenty nanoseconds, peak power levels of approximately ten kilowatts, and repetition rates of 10-120 kHz. The equivalent average power is in the range of one to four watts. The preferred range of wave lengths of the output radiation is in the near infrared range, e.g. 1.047 or 1.064 microns. A laser system of this type is described in U.S. patent application Ser. No. 07/724,750, in the name of Lewis G. Minor (an inventor of the present application) and Nicholas J. Krasutsky, filed Jul. 2, 1991, and entitled: "Sensor Head", and assigned to the Assignee of the present invention. The disclosure of U.S. aplication Ser. No. 07/724,750 is incorporated herein by reference for all purposes.

Figure 1:
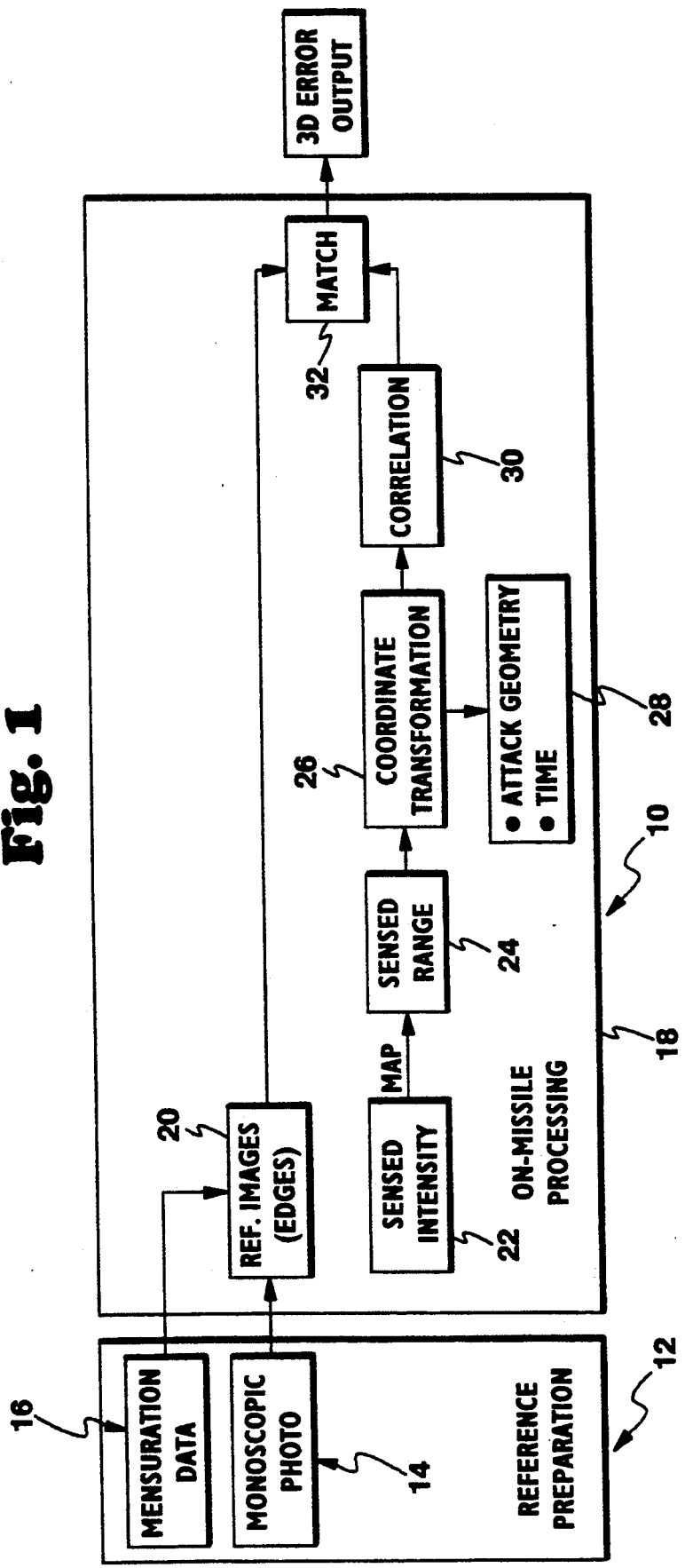
FIG. 1 schematically depicts an exemplary method of target identification in accordance with the present invention.

Referring now to the drawings in more detail, and particularly to FIG. 1, therein is schematically depicted a flow chart, indicated generally at 10, of an exemplary method of target recognition in accordance with the present invention. Relative to conventional systems, the steps of preparation of the reference, indicated generally at 12, are dramatically simplified. A target identifier, such as a single photograph, will be taken through conventional reconnaissance techniques, as indicated generally at 14. Similarly, mensuration data, as indicated generally at 16, is also compiled, also such as through general reconnaissance techniques. Such data is then compiled in a manner suitable for use by an on-board digital computer handling target recognition and guidance processing, as indicated generally at 18. Such compiling may be preferred on an appropriate interactive workstation. The target data will be utilized to form a reference image, as will be described in more detail later herein. The on-weapon processing 18 will be performed in real time during the attack run.

The target reference data will include an edge image aim point identified by the operator, while the mensuration data will include such data as the image eye point (i.e. the point from which the reference photograph was taken). This information will be held on a cartridge mass storage device, such as a data tape, suitable for insertion into and use by the weapon's computerized guidance system.

Because the described LADAR sensor provides three dimensional data of the target, and also provides intensity data of the target, both the LADAR-sensed range and intensity data may be transformed to any view in the three dimensional Cartesian coordinate system.

In a manner known to those skilled in the art, where the missile includes global positioning system (GPS) navigation capability, the location of the missile will be determinable with significant accuracy, such as on the order of within a radius of ten to sixteen meters. At a predetermined location, determined partially in response to the attack geometry, the LADAR target recognition system will be actuated. This actuation will occur at a point where the target will be within the "sight" of the LADAR image. The LADAR will then establish a map of sensed intensity data 22 within its field of view, and of sensed range data 24 within its field of view. Based upon input data 28, including both targeting data identifying the location of the target, data relative to the reference image, the weapon attack geometry, and the time, the sensed LADAR image will be transformed 26 in a Cartesian coordinate system to reflect the sensed LADAR image as if it were sensed from the eye point utilized for establishing the reconnaissance target reference. This coordinate transformation will include both scaling and rotation and perspective distortion of the sensed LADAR image. The resulting transformed LADAR image may then be compared 30 through edge matching, feature matching, or direct image correlation until a match is achieved 32.

Figure 2:
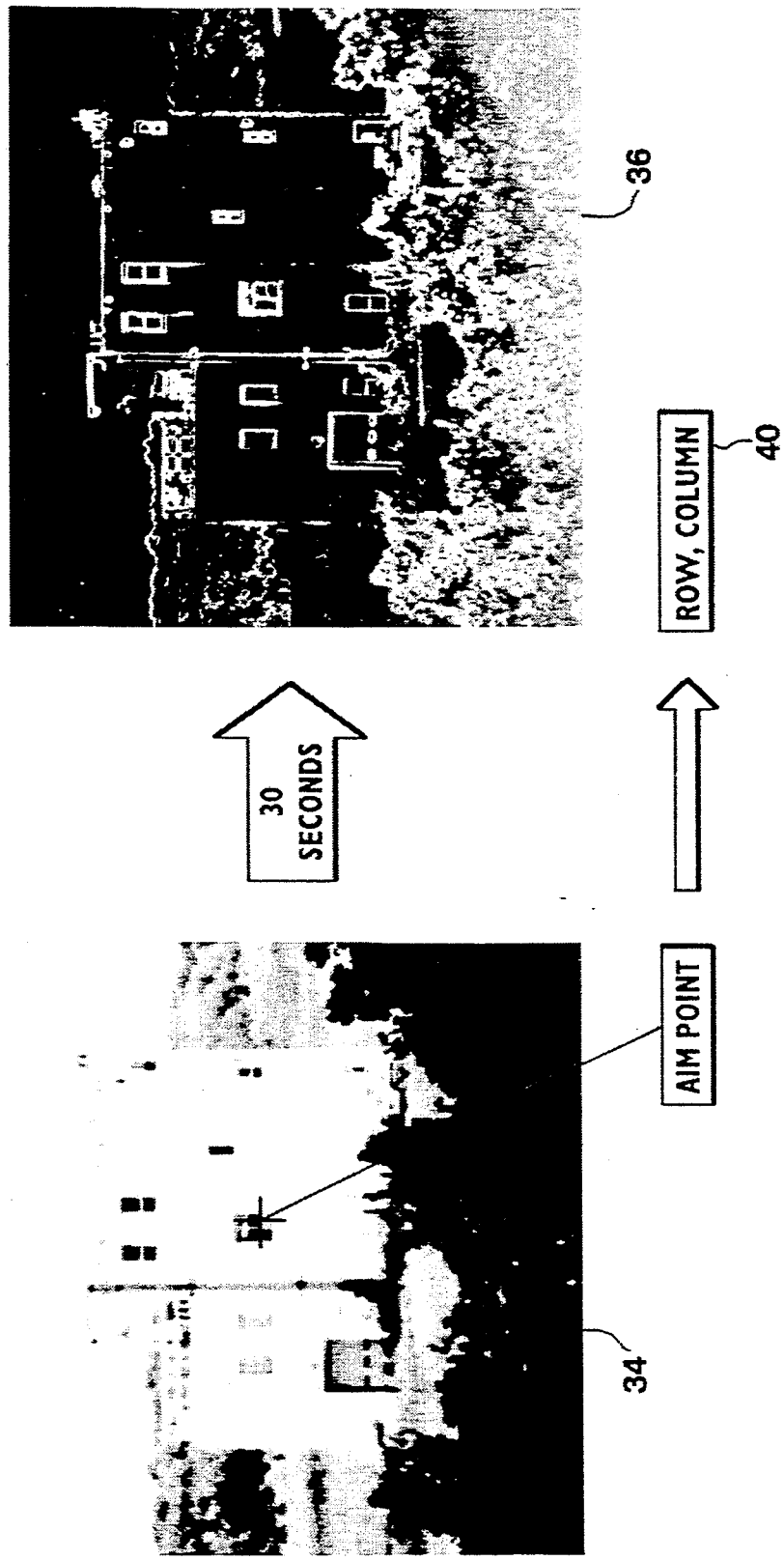
FIG. 2 depicts an exemplary reconnaissance photograph, and a target reference image as may be developed from such reconnaissance photograph.

Referring now to FIG. 2, therein is depicted a reconnaissance photo 34 which has been digitized in accordance with step 14 to form a target reference image 36. As can be seen in reconnaissance photo 34, an aim point 38 has been identified on the photo. Aim point 38 may be an area identified on the surface of the target building. Additionally, however, because the SS-LADAR imaging system provides the capability of sensing in three dimensions, the actual aim point may be located at an off-set aim point location such as internal to a building. The aim point 38 may be identified relative to the target reference such as by reference to a row and column, as indicated at 40, relative to the digitized image 36.

Referring now to FIG. 3, therein are indicated exemplary input parameters relative to the target and reference image data. Such reference data will include, e.g., the aim point 46, expressed in terms of longitude, latitude, and altitude (as may be described in units of meters); the fuse range 48; and the off-set aim 50. As can be seen in the example of FIG. 3, the off-set aim is depicted as ten feet deep, or along the Z-axis (vertical direction), relative to the identified aim point. Also input is data regarding the reference image 52. Such reference image data will include the eye point 54 from which the reconnaissance photograph was taken, once again expressed in terms of longitude, latitude, and altitude; the presence of any shadows may in some implementations be input 56; the time of day 58 expressed such as in Greenwich mean time; and the date 60. If the eye point and camera model are not available, they may be approximated by using five or more control points identifying longitude, latitude and altitude for prominent features in the image.

Figure 4:
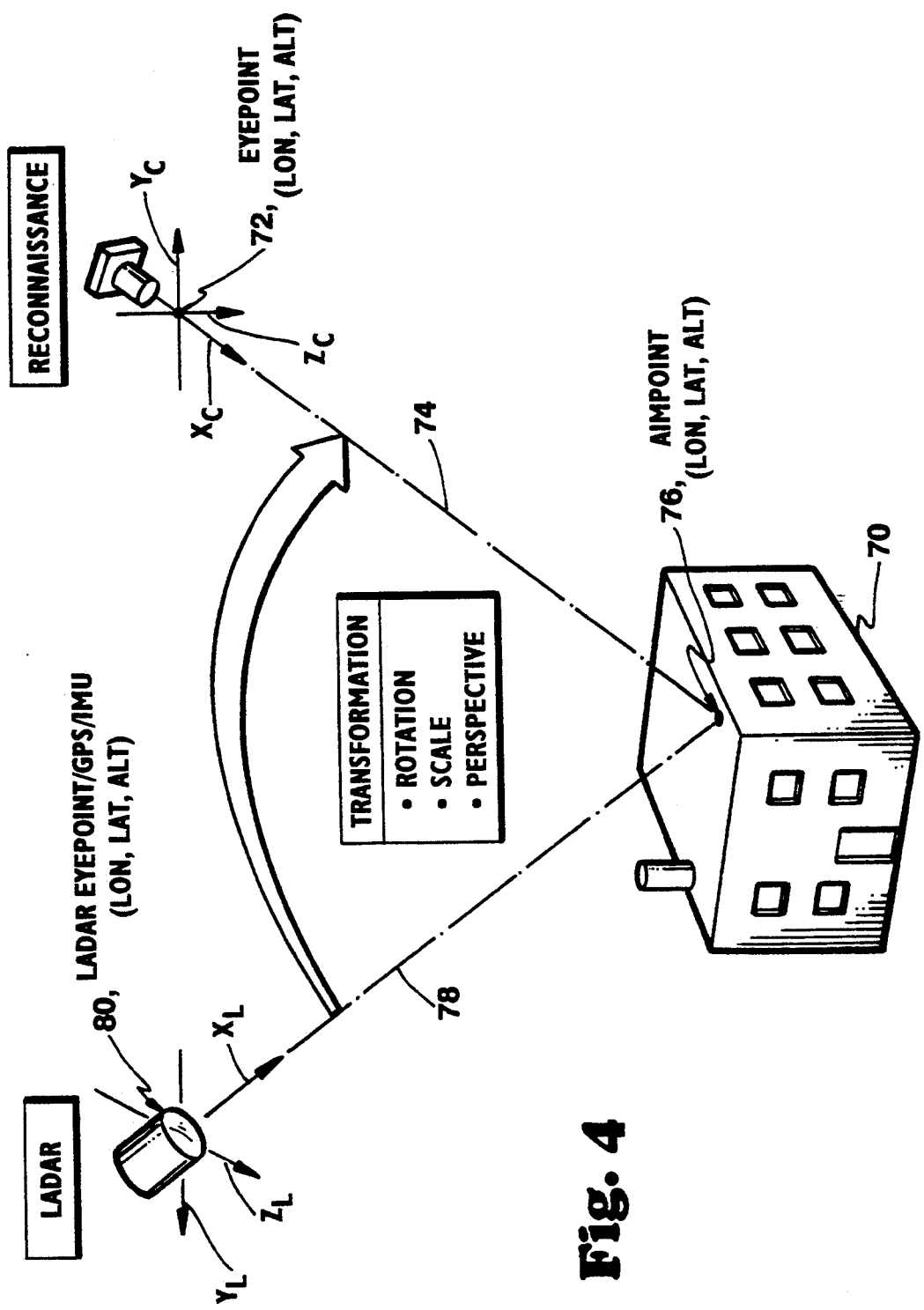
FIG. 4 schematically depicts the transformation process of FIG. 1, relative to reconnaissance data obtained from a first eye point and a weapon system operative from a second eye point.

Referring now to FIG. 4, therein is schematically depicted an exemplary representation of the transformation of an image between view points. The target 70 is depicted relative to the perspective from which the reconnaissance image was taken (i.e. from eye point 72). This eye point, as discussed previously, is identified in terms of latitude, longitude, and altitude to place the point in space, relative to a Cartesian coordinate system. Thus, the reference photograph of the example in FIG. 4 is taken along axis 74. An aim point 76 is identified on target 70, as discussed in relation to FIG. 2. As noted in reference to FIG. 3, the aim point may be precisely identified in space by longitude, latitude, and altitude.

At a subsequent time, (such as during an attack), the LADAR sensor images target 70 from a different location, along axis 78. Once again, as noted previously, the LADAR sensor or eye point 80 is precisely identified in space through longitude, latitude and altitude. The coordinate transformation step (item 26 in FIG. 1) involves shifting the effective eye point of the sensed LADAR image (sensed along axis 78) until it coincides with the image sensed along axis 74, and scaling the transformed image to compensate for variance between the length of axis 74 between aim point 76 and eye point 72, and the length of axis 78 between eye point 80 and aim point 76.

Figure 5:
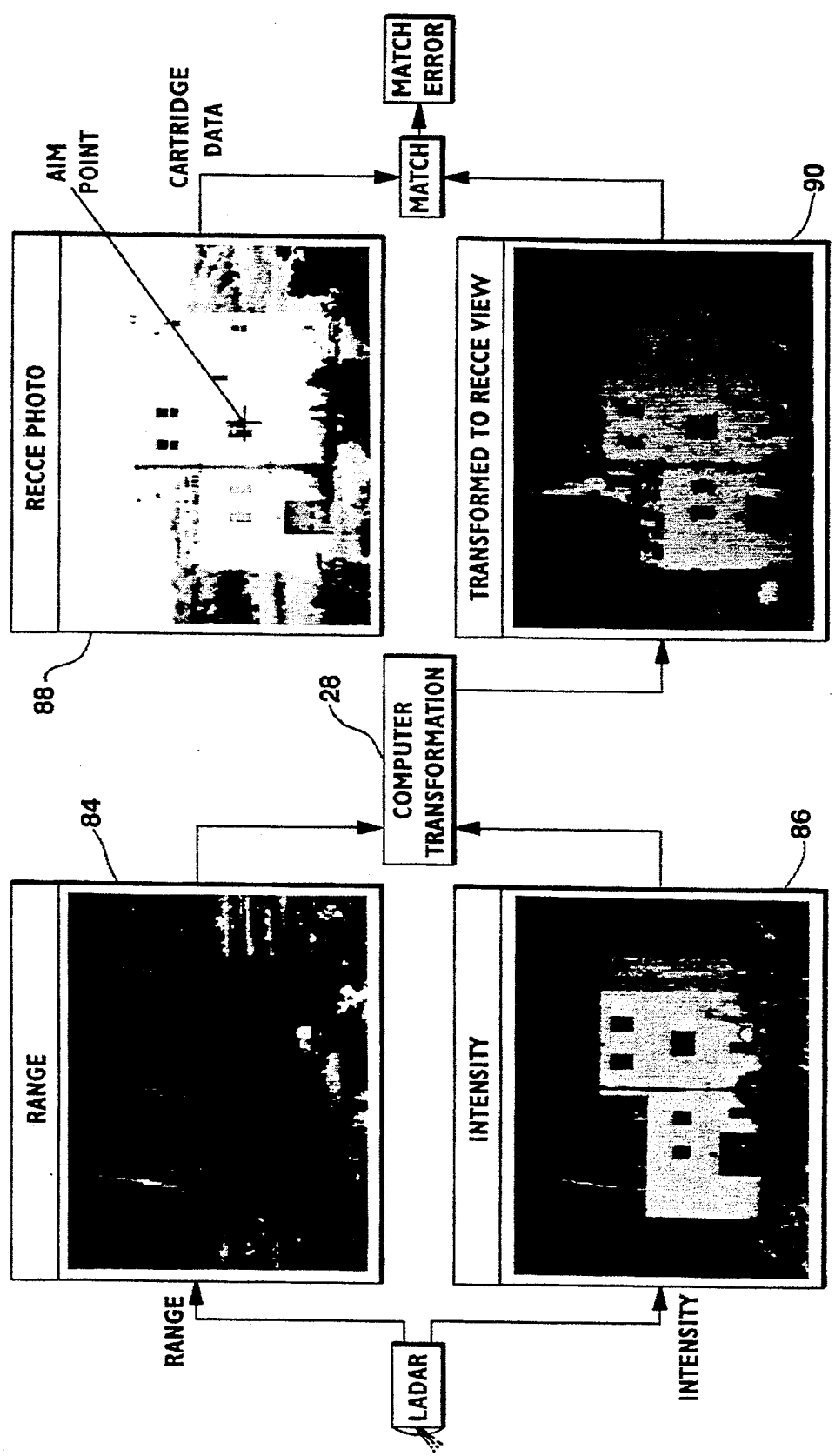
FIG. 5 provides an exemplary depiction of range and intensity data of a potential target, and the transformation of that sensed data to a transformed image relative to a reconnaissance photo (also as depicted in FIG. 2) used to identify a reference image.

Referring now to FIG. 5, therein is depicted an exemplary LADAR range image 84 and an exemplary LADAR intensity image 86 with an exemplary target. A representation of an exemplary reconnaissance photo 88 (corresponding to the representation 34 in FIG. 2) is identified. As can be seen from a comparison of reconnaissance photo 88 relative to LADAR range and intensity images 84 and 86, respectively, the LADAR senses the building from a perspective rotated approximately 45 degrees relative to that of reconnaissance photo 88. Accordingly, the performance of the computer transformation 28 yields the transformed LADAR image which corresponds to a common eye point relative to that utilized for the reconnaissance photo 88 (all as discussed relative to FIG. 4). Once the image is matched 32, such as through edge matching, then the match error will be defined 92. This match error may be utilized to generate an error signal for use by the weapon guidance system.

Figure 6A:
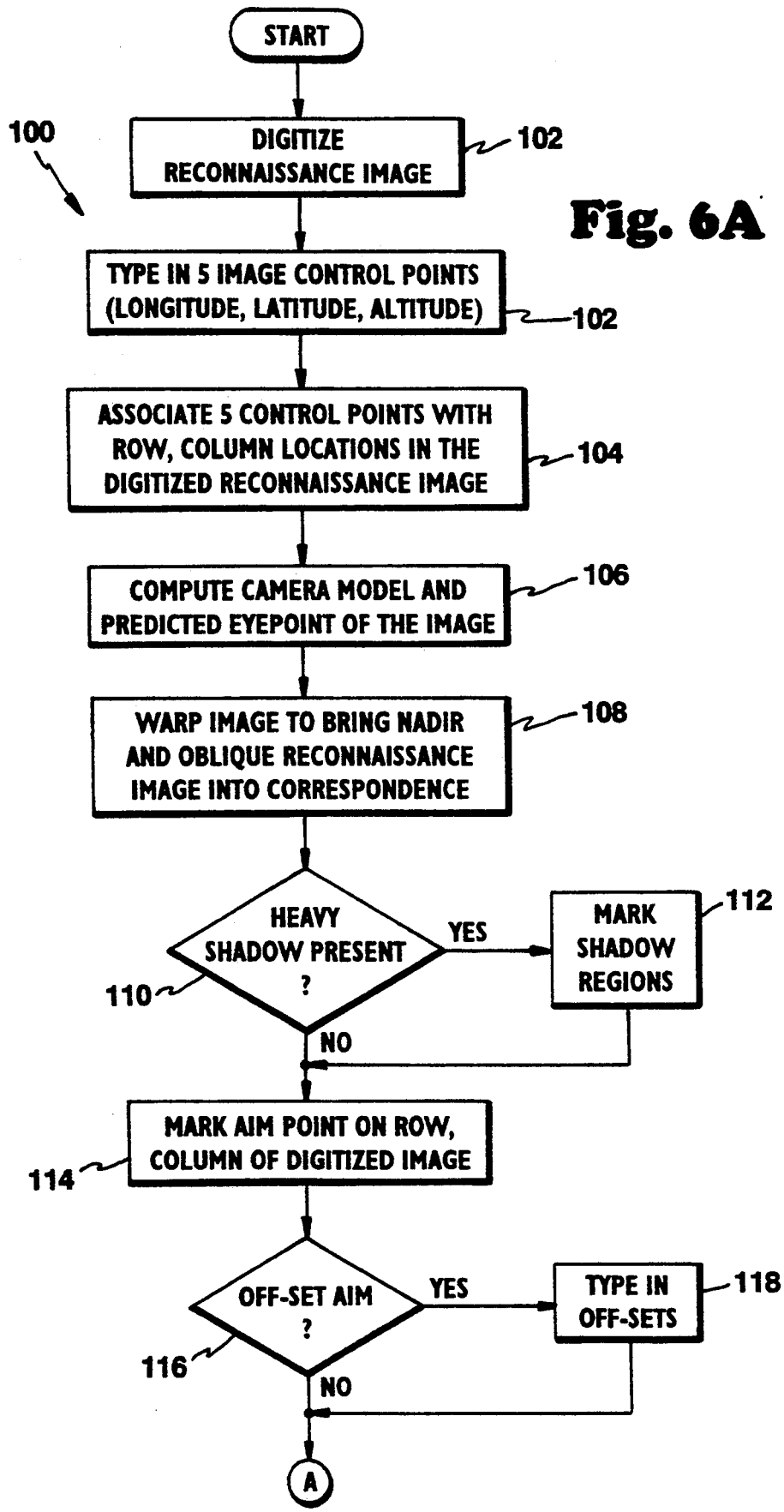
FIGS. 6A-B represent an exemplary flow chart of operations involved in reference preparation, as identified in FIG. 1, in accordance with the present invention.
Figure 6B:
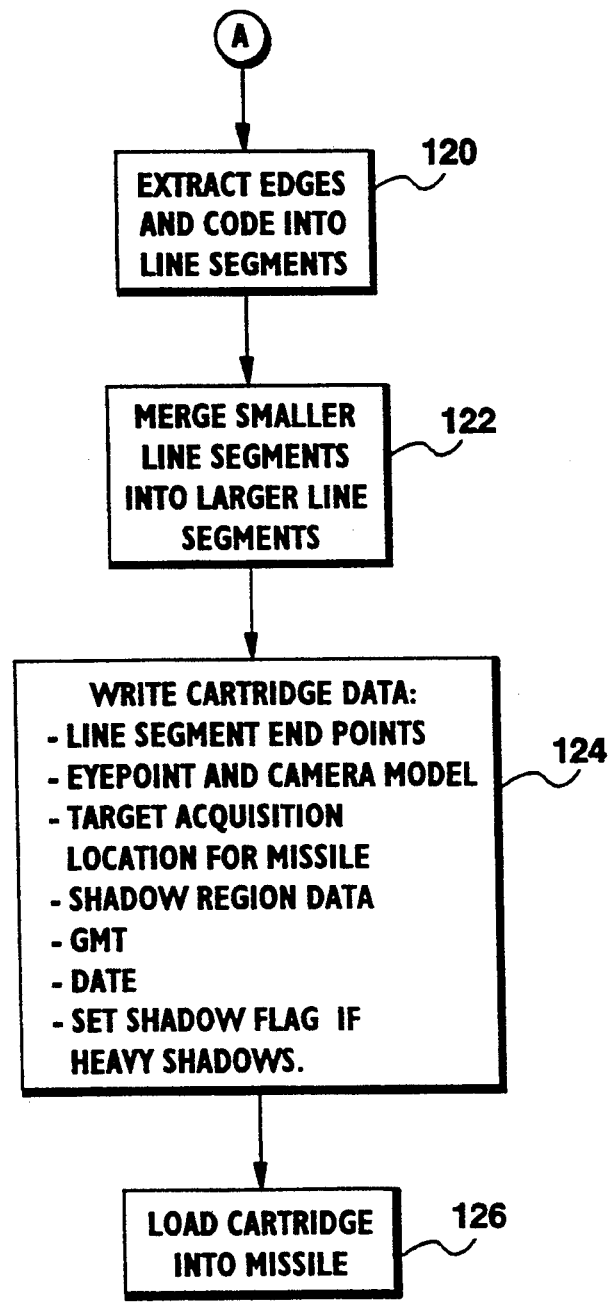

Referring now to FIG. 6, therein is depicted a flow chart for the mission planning portion of a weapon deployment operation, including the ground operation preparation of the reference, indicated generally at 12 in FIG. 1. As previously noted, if the reconnaissance image is not already in digital form, but is in another form such as a photograph, the reconnaissance image will be digitized 102. Five image control points will be entered 102. Each image control point represents a mensurated point indicating longitude, latitude, and altitude. These five image control points are then associated with row and column locations in the digitized image 104. Subsequently, the computation of eye point and camera model from the five control points is established 106, in a manner well known to the art. If the camera model and eye point are already known, the control points are not needed.

The digitized image will then be warped to bring nadir and oblique reconnaissance images into correspondence with one another 108. The image warping may also be utilized to refine the eye point computation and camera modeling when both nadir and oblique images are available. A determination will be made 110 as to whether heavy shadow is present in the reconnaissance image; the shadow being present sufficiently to obscure significant detail of the image. If the shadow is present the shadow regions may be manually marked, or the shadows may be predicted relative to sun position at the time the reconnaissance image was taken. As is well known in the art, sun position may be predicted from the time of day, date, and longitude and latitude of the area of interest. If shadowing is predicted using a sun position model, shadows then become useful match features rather than problematical distortions.

An aim point may be identified on the reference image by selecting a row and column 114 (as discussed relative to FIG. 2). Where the actual desired aim point is not visible in the reference image, a decision may be made 116 to offset the aim. In such situation, the offsets will be entered 118 (as discussed relative to FIG. 3). Edges in the reference image will be extracted 120 through conventional edge operator techniques, such as the Sobel operator. As is known in the art, line segments may be extracted by finding end points to the extracted edges using conventional image processing techniques. The defining of line end points facilitates entry of specific line/edge identifiers. Smaller line segments may be merged into larger line segments 122. This merging may be applied where smaller identifiable line segments can be adequately reflected as a portion of a larger line, and will result in reduction of the size of the line segment data file, thereby facilitating the simplification of later operations. Finally, the data cartridge may be loaded into the missile or other weapon.

Referring now to FIGS. 7A–C, therein is depicted an exemplary flow chart 130 of target recognition and tracking operations as may be implemented by the on-board computer during an actual operation. As previously described, the guidance computer will read Inertial Measurement Unit (IMU) and GPS data to identify the precise missile location, and will determine the missile attitude (i.e. roll, pitch, and yaw) 132. When the missile arrives at the predetermined target acquisition point 134, the LADAR will be actuated relative to the projected aim point, and range and intensity images will be collected 136. The projected aim point will be established in reference to the predetermined attack plan for the weapon.

The range and intensity pixels of an area comprising the target will then be correlated with an inertially referenced image coordinate system to establish a fixed frame of reference at the time of image acquisition 138. The sensed range and intensity images will be corrected for motion and scan affects 140 arising as a result of missile travel during the LADAR scan period using the frame of reference. The corrected image therefore reflects the image as of the determined time and location of image acquisition. The LADAR polar scan coordinate system will be converted to a rectangular coordinate system correlatable with that utilized relative to the reference image 142, in a manner known to the art.

The LADAR sensed image will be analyzed to extract range jump, range slope, and intensity edges 44. These extracted edges will then be combined to form a single three dimensional image. Additionally, the edge thickness typically imposed by the edge operator will be thinned to the extent feasible. In the single three dimensional image, edges and line segments will be identified, and line segments will be identified relative to their three dimensional end points ($X_1$, $Y_1$, $Z_1$) and ($X_2$, $Y_2$, $Z_2$), in a Cartesian coordinate system. As with the digitized reference image, smaller line segments will be merged into longer line segments 148. Regions in the LADAR image which will not be visible from the eye point from which the reconnaissance reference image was established will be identified 150.

Once the sensed data of the LADAR image has been reconciled to eliminate data not available from the eye point of the reference image, the line segments of the LADAR sensed image will be transformed, through use of the line segment end points, to the reconnaissance image coordinates 152. In simplifying this operation, images obscured to the eye point of the reconnaissance camera will not be transformed, as these surfaces would not provide information useful to assist in image matching and could reduce accuracy of the match.

The transformed three dimensional LADAR image line segments will then be projected onto a reconnaissance or reference image plane as a two dimensional image 154. Line segments of the stored reference image will then be compared with line segments defined by the transformed LADAR image 156.

Through an iterative process the optimal alignment of reference image line segments with sensed image line segments will be achieved 158. Once such alignment has been achieved, the error displacements relative to the aim point (or relative to the offset aim point) will be determined 160. The error displacements, which, as noted above will include information in three axes as well as angular rate and angular error, will then be utilized to compute error signals to issue guidance commands useable by the missile autopilot to control guidance functions 162. The above image identification and transformation steps will be repeated 164 to continually control missile guidance until impact with the target.

The present invention has been described in relation to implementation with a two dimensional reference image such as one formed in part through use of a photograph. Another type of reference image which may be utilized in accordance with the present invention, however, would be an image from synthetic aperture radar (SAR). SAR sensors typically yield an essentially two dimensional plan view of a sensed area. SAR sensors will reveal shadow data, which provides reference data relative to the height of a given object. Because LADAR senses a three dimensional image, coordinate transformation of the LADAR sensed image of a given scene may also yield a plan view of a given area.

In a manner generally analogous to predicting sun shadows, SAR shadowing may be predicted from knowledge of the eye point of the SAR sensor. Accordingly, SAR data may be utilized to not only identify edge maps for use in LADAR correlation, but also to define shadow regions which may also be predicted through the described LADAR imaging techniques.

Many modifications and variations may be made in the techniques and structures described and illustrated herein without departing from the spirit and scope of the present invention. Accordingly, it should be readily understood that the methods and apparatus described and illustrated herein are illustrative only and are not considered as limitations upon the scope of the present invention.

APPENDIX A

```
/*****************************************************************/
/*                                                               */
/*                         QUICKHIT                              */
/*                                                               */
/* Program to transform LADAR data to a different point-of-view  */
/* The 3-D position of the target is determined for each pixel.  */
/* The projection to a new point-of-view determines a pixel-by pixel */
/* mapping of the LADAR intensity to the recon PHOTO coordinates.*/
/*                                                               */
/* By: B. Pettitt    April 22, 1992 - June 10, 1992              */
/* and D. McArthur   April 22, 1992                              */
/*                                                               */
/* LTV Aerospace & Defense                                       */
/*****************************************************************/
#include <stdio.h>
#include <math.h>
include <stdlib.h>
include <time.h> include "qh.def"   /* <-- function prototypes */
```

```c
/* Macros and constants */
#define EDGE_COLOR    255
#define ARTIF_COLOR   255
#define GET_ANSWER    c = getch();answer[0] = c;if (answer[0] != 'n' && answer[0] != 'N')
#define GET_FILENAME  printf("Enter filename: ");scanf ("%s", filename );
#define INTEGER 2
#define BYTE    1

/*********************************************/
/******************* START: MAIN() ***********/
/*********************************************/
void main( )
{ int     i, j, k, del;
  int     **edge, **i_edge, **r_edge, **edgecomb, **lines;
  int     **ithin_edge, **rthin_edge;
  int     **recon_edge, **art_regions, **thin_edges, **inten_new_sub;
  int     ncols_ladar, nrows_ladar, ncols_recon, nrows_recon;
  int     **inten_new, **inten_croshair, **z_buf, **recon, **inten_new_edge;
  int     **inten, **range;
  int     **ladar_label_y, **ladar_label_x, edgecount;
  int     replength, intthresh, rngthresh;
  int     c, imag, res;
  int     slide,start1col,start1row,start2col,start2row;
  int     ladar_x, ladar_y, recon_x, recon_y;
  int     size;
  char    answer[1], filename[80];
  float   overscan, **re_mat, **se_mat, **pr_mat, deg_to_radian;
  float   pos_sen[3], rr[3];
  float   yaw_sen, yaw_recon,pitch_sen,pitch_recon,roll_sen,roll_recon;
  float   fov_sen, fov_recon, k_col, k_row, kk_col, kk_row;
  char    fln_int[80], fln_rng[80], fln_recon[80];
  FILE    *parms_fp;

/* read in parameter data file */
  if ((parms_fp = fopen("parms.dat", "r")) == NULL)
  { printf("\nError opening parameter data file: parms.dat\n");
    exit(1);
  }
  fscanf(parms_fp,"%f %*s %f %*s %f %*s %f %*s %f %*s %f %*s",
      &yaw_sen, &pitch_sen, &roll_sen, &yaw_recon, &pitch_recon,&roll_recon );
  fscanf(parms_fp,"%f %*s %f %*s %f %*s %d %*s %d %*s %d %*s %d %*s",
      &pos_sen[0], &pos_sen[1], &pos_sen[2],
      &ncols_ladar, &nrows_ladar, &ncols_recon, &nrows_recon );
  fscanf(parms_fp,"%f %*s %d %*s %d %*s %d %*s %d %*s %d %*s %s
              %*s %s %*s %s",
              &overscan, &replength, &intthresh, &rngthresh,
              &recon_x, &recon_y,fln_int, fln_rng, fln_recon );
  fclose (parms_fp);

/****** initialise constants ******/
  deg_to_radian = 3.1415926/180.0;
  k_row  = k_col = 3.5 * 3.14159 /(180.0*nrows_ladar); /* SENSOR pix fov */
  kk_col = kk_row = 1.0/(0.7*k_row);                   /* 1/(RECON pix fov) */

/****** dynamic memory allocation ******/
  re_mat       = (float **) memory(3,3,4);
  se_mat       = (float **) memory(3,3,4);
  pr_mat       = (float **) memory(3,3,4);

inten        = (int **) memory(ncols_ladar,nrows_ladar,4);
  range        = (int **) memory(ncols_ladar,nrows_ladar,4);
  i_edge       = (int **) memory(ncols_ladar,nrows_ladar,4);
  r_edge       = (int **) memory(ncols_ladar,nrows_ladar,4);
  ithin_edge   = (int **) memory(ncols_ladar,nrows_ladar,4);
  rthin_edge   = (int **) memory(ncols_ladar,nrows_ladar,4);
  thin_edges   = (int **) memory(ncols_ladar,nrows_ladar,4);
  lines        = (int **) memory(ncols_ladar,nrows_ladar,4);

inten_new_sub = (int **) memory(ncols_recon/2,nrows_recon/2,4);

edge         = (int **) memory(ncols_recon,nrows_recon,4);
  recon        = (int **) memory(ncols_recon,nrows_recon,4);
  inten_new    = (int **) memory(ncols_recon,nrows_recon,4);
  inten_new_edge= (int **) memory(ncols_recon,nrows_recon,4);
  edgecomb     = (int **) memory(ncols_recon,nrows_recon,4);
  recon_edge   = (int **) memory(ncols_recon,nrows_recon,4);
  art_regions  = (int **) memory(ncols_recon,nrows_recon,4);
  z_buf        = (int **) memory(ncols_recon,nrows_recon,4);
  ladar_label_y = (int **) memory(ncols_recon,nrows_recon,4);
  ladar_label_x = (int **) memory(ncols_recon,nrows_recon,4);

/***** initialize matricees to a constant *****/
  _Matrix_Init(ncols_ladar,nrows_ladar,  0,inten);
  _Matrix_Init(ncols_ladar,nrows_ladar,  0,range);
```

```
_Matrix_Init(ncols_ladar,nrows_ladar,    0,l_edge);
_Matrix_Init(ncols_ladar,nrows_ladar,    0,r_edge);
_Matrix_Init(ncols_ladar,nrows_ladar,    0,lthin_edge);
_Matrix_Init(ncols_ladar,nrows_ladar,    0,rthin_edge);
_Matrix_Init(ncols_ladar,nrows_ladar,    0,thin_edges);
_Matrix_Init(ncols_ladar,nrows_ladar,    0,lines);

_Matrix_Init(ncols_recon/2,nrows_recon/2,0,inten_new_sub);

_Matrix_Init(ncols_recon,nrows_recon,    0,edge);
_Matrix_Init(ncols_recon,nrows_recon,    0,recon);
_Matrix_Init(ncols_recon,nrows_recon,    0,inten_new);
_Matrix_Init(ncols_recon,nrows_recon,    0,inten_new_edge);
_Matrix_Init(ncols_recon,nrows_recon,    0,edgecomb);
_Matrix_Init(ncols_recon,nrows_recon,    0,recon_edge);
_Matrix_Init(ncols_recon,nrows_recon,    0,art_regions);
_Matrix_Init(ncols_recon,nrows_recon,70000,z_buf);
_Matrix_Init(ncols_recon,nrows_recon, nrows_ladar/2, ladar_label_y);
_Matrix_Init(ncols_recon,nrows_recon, ncols_ladar/2, ladar_label_x);

/**** SENSOR position and orientation paramerers ******/
yaw_sen     = yaw_sen     * deg_to_radian;
pitch_sen   = pitch_sen   * deg_to_radian;
roll_sen    = roll_sen    * deg_to_radian;
yaw_recon   = yaw_recon   * deg_to_radian;
pitch_recon = pitch_recon * deg_to_radian;
roll_recon  = roll_recon  * deg_to_radian;

/***** generate SENSOR and RECON rotation matrices *****/
r_rot(yaw_recon, pitch_recon, roll_recon, re_mat);
r_rot(yaw_sen, pitch_sen, roll_sen, se_mat);
Mult_Tran_Matrix_3x3(re_mat, se_mat, pr_mat);
Mult_Tran_Matrix_3x1(re_mat, pos_sen, rr);

/***** read intensity and range LADAR images *****/
read_image(fln_int, ncols_ladar, nrows_ladar, inten, 1);
read_image(fln_rng, ncols_ladar, nrows_ladar, range, 2);
eliminate_water(inten, range, ncols_ladar, nrows_ladar);

/***** read original recon photo image       *****/
read_image(fln_recon, ncols_recon, nrows_recon, recon, 1);

printf("Display MISSLE VIEW INTENSITY and RANGE Images? (y/n)\n");
GET_ANSWER
{   disp_2images(ncols_ladar,nrows_ladar,inten,150,50,ncols_ladar,
                 nrows_ladar,range,150,250,slide=0);
    write_image(inten, ncols_ladar, nrows_ladar,
                size=INTEGER, "bunint.img");
    write_image(range, ncols_ladar, nrows_ladar,
                size=INTEGER, "bunrng.img");
}

/***********************************************************/
/***** determmine array size needed for mapping *****/
map_corners(ncols_ladar, nrows_ladar, ncols_recon, nrows_recon,
            pr_mat, rr, k_col, k_row, kk_col, kk_row, range);

/***** map ladar intensity to recce viewpoint *****/
map_visible(overscan, ncols_ladar, nrows_ladar, ncols_recon, nrows_recon,
            pr_mat, rr, k_col, k_row, kk_col, kk_row,
            inten, inten_new, range, z_buf, ladar_label_y, ladar_label_x );

printf("MEDIAN FILTER generated recon? (y/n)\n");
GET_ANSWER
    median(inten_new, ncols_recon, nrows_recon);

printf("Display ORIGINAL LADAR INTENSITY and GENERATED RECON? (y/n)\n");
GET_ANSWER
{   disp_2images(ncols_ladar,nrows_ladar, inten, 1, 160,
                 ncols_recon, nrows_recon, inten_new, 342, 1, slide=0);
    write_image(recon, ncols_recon, nrows_recon,
                size=INTEGER, "labrecc.img");
    write_image(inten_new, ncols_recon, nrows_recon,
                size=INTEGER, "gbunrecc.img");
}
```

```
printf("GAP FILL generated recon? (y/n)\n");
GET_ANSWER
{   gapfill(inten_new, ncols_recon, nrows_recon);
    disp_2images(ncols_ladar,nrows_ladar, inten, 1, 160, ncols_recon,
                nrows_recon, inten_new, 342, 1, slide=0);
    write_image(inten_new, ncols_recon, nrows_recon,
                size=INTEGER, "g5unrecc.img");
}

/************************************************************/
printf("Generate ARTIFICIAL REGIONS? (y/n)\n");
GET_ANSWER
{
    /**** find EDGES from LADAR imagery -- generate binary image ***/
    edggrad3(inten, i_edge, ncols_ladar, nrows_ladar, 2, 1, intthresh);
    edggrad3(range, r_edge, ncols_ladar, nrows_ladar, 2, 1, rngthresh);

printf("Display LADAR INTENSITY and EDGE Images? (y/n)\n");
    GET_ANSWER
        disp_2images(ncols_ladar, nrows_ladar, inten, 1,160,ncols_ladar,
                    nrows_ladar, i_edge, 342,160,slide=0);

printf("Display LADAR RANGE and EDGE Images? (y/n)\n");
    GET_ANSWER
        disp_2images(ncols_ladar, nrows_ladar, range, 1,160,ncols_ladar,
                    nrows_ladar, r_edge, 342,160,0);

edge_thin(i_edge, ncols_ladar, nrows_ladar, ithin_edge );
    edge_thin(r_edge, ncols_ladar, nrows_ladar, rthin_edge );

printf("Display INTENSITY and THINNED INTENSITY Images? (y/n)\n");
    GET_ANSWER
        disp_2images(ncols_ladar, nrows_ladar, i_edge, ncols_ladar,
                    nrows_ladar, ithin_edge, 0);

printf("Display RANGE and THINNED RANGE Images? (y/n)\n");
    GET_ANSWER
        disp_2images(ncols_ladar, nrows_ladar, r_edge, ncols_ladar,
                    nrows_ladar, rthin_edge, 0);

/* combine edges from LADAR intensity and range */
    image_OR(ithin_edge, rthin_edge, ncols_ladar, nrows_ladar, thin_edges);

printf("Display COMBINED Edge Image (y/n)\n");
    GET_ANSWER
        disp_2images(ncols_ladar, nrows_ladar, inten, ncols_ladar,
                    nrows_ladar, thin_edges, 0);

find_lines( thin_edges, ncols_ladar, nrows_ladar, lines );

printf("Display LINES Image (y/n)\n");
    GET_ANSWER
        disp_lines( lines, ncols_ladar, nrows_ladar );

/* define artificial (hidden) regions using */
    /* adjacent vertical edge points            */
    map_artificial_V(ncols_ladar, nrows_ladar, ncols_recon, nrows_recon,
                    pr_mat, rr, k_col, k_row, kk_col, kk_row,
                    art_regions, range, z_buf, thin_edges, replength );

/* define artificial (hidden) regions using */
    /* adjacent horizontal edge points          */
    map_artificial_H(ncols_ladar, nrows_ladar, ncols_recon, nrows_recon,
                    pr_mat, rr, k_col, k_row, kk_col, kk_row,
                    art_regions, range, z_buf, thin_edges, replength );

printf("Median filter ARTIFICIAL REGIONS? (y/n)\n");
    GET_ANSWER
    median(art_regions, ncols_recon, nrows_recon);

/* combine edges from LADAR intensity and range */
    image_OR(ithin_edge, rthin_edge, ncols_ladar, nrows_ladar, thin_edges);

free(ithin_edge);
    free(rthin_edge);

printf("Display COMBINED EDGE and ARTIFICIAL REGION Image? (y/n)\n");
    GET_ANSWER
        disp_2images(ncols_ladar,nrows_ladar, thin_edges, ncols_recon,
                    nrows_recon, art_regions,slide=0);

printf("Display ORIGINAL RECON and GENERATED RECON w/ ARTIFICIAL
            REGIONS? (y/n)\n");
```

```
     GET_ANSWER
     { Image_OR(art_regions, inten_new, ncols_recon, nrows_recon,
               edgecomb );
       disp_2images(ncols_recon,nrows_recon, recon, 1,160,
                 ncols_recon,nrows_recon, edgecomb, 345, 160, slide=0);
       write_image(edgecomb, ncols_recon, nrows_recon,
                 size=INTEGER, "bunart.img");
     }
} /***** end map artificial block *****/
/************************************************************/ printf("Display ORIGINAL RECON and GENERATED RECON w/o
          ARTIFICIAL REGIONS? (y/n)\n");
   GET_ANSWER
   { disp_2images(ncols_recon,nrows_recon, recon, 1,110,
                 ncols_recon,nrows_recon, inten_new, 305,1,slide=0);
     write_image(recon, ncols_recon, nrows_recon,
                 size=INTEGER, "labrecc.img");
     write_image(inten_new, ncols_recon, nrows_recon,
                 size=INTEGER, "gbunrecc.img");
   } printf("Generate EDGES for ORIGINAL RECON image? (y/n)\n");
   GET_ANSWER
   {
     edggrad3(recon, recon_edge, ncols_recon, nrows_recon,
           1, 1, intthresh/2);
     edggrad3(inten_new, inten_new_edge, ncols_recon, nrows_recon,
           1, 1, Intthresh/2);
     edge_thin(recon_edge, ncols_recon, nrows_recon, recon_edge );
     edge_thin(inten_new_edge, ncols_recon, nrows_recon, inten_new_edge );
     disp_2images(ncols_recon, nrows_recon, recon_edge, 1,110,
                 ncols_recon, nrows_recon, inten_new_edge, 305, 1,slide=0);
     write_image(recon_edge, ncols_recon, nrows_recon,
                 size=INTEGER, "labredge.img");
     write_image(inten_new_edge, ncols_recon, nrows_recon,
                 size=INTEGER, "labiedge.img");

printf("Display EDGE OVERLAY and EDGE MATCH image? (y/n)\n");
     GET_ANSWER
     { Matrix_Init(ncols_recon,nrows_recon,0,edge);
       Matrix_Init(ncols_recon,nrows_recon,0,edgecomb);
       Image_OR(recon_edge, inten_new_edge, ncols_recon, nrows_recon, edge);
       image_AND(recon_edge, inten_new_edge, ncols_recon,
                 nrows_recon, edgecomb);
       disp_2images(ncols_recon,nrows_recon,edge, 1,110,
                 ncols_recon, nrows_recon, edgecomb, 305, 1, slide=0);
       write_image(edge, ncols_recon, nrows_recon,
                 size=INTEGER, "edgecomb.img");
       write_image(edgecomb, ncols_recon, nrows_recon,
                 size=INTEGER, "labmatch.img");
     }
   } printf("Display Crosshairs? (y/n)\n");
   GET_ANSWER
   { display_crosshairs(ncols_ladar,nrows_ladar, inten, ncols_recon,
                 nrows_recon, inten_new, slide=2,ladar_label_y,
                 ladar_label_x,recon_y,recon_x);

answer[0]='y';
     while (answer[0]!='n' && answer[0]!='N')
     { printf("Enter new RECON HIT POINT? (y/n)\n");
       GET_ANSWER
       { printf("Old Hitpoint at X,Y = %d,%d\n",recon_x,recon_y);
         printf("Enter new X,Y hitpoint in %dx%d recon
                 photo:\n",nrows_recon,ncols_recon);
         scanf("%d,%d",&recon_x,&recon_y);

display_crosshairs(ncols_ladar, nrows_ladar, inten, ncols_recon, nrows_recon,
                 inten_new, slide=2, ladar_label_y,ladar_label_x,
                 recon_y,recon_x);
       }
     }
   } free(re_mat);
free(se_mat);
free(pr_mat);
free(inten);
```

```
   free(range);

free(recon);

free(inten_new);
   free(edge);

free(inten_croshair);
   free(edgecomb);
   free(recon_edge);
   free(art_regions);
   free(z_buf);
   free(ladar_label_y);
   free(ladar_label_x);

printf("\nProgram successfully completed.\n");

} /****************** END: MAIN() *************************/
/*********************************************************/
/*********************************************************/
/************ START: Subroutine MAP_VISIBLE() ************/
/*********************************************************/
void map_visible(float overscan,int ncols_ladar, int nrows_ladar,
         int ncols_recon,int nrows_recon,
         float **pr_mat, float *rr,
         float k_col, float k_row, float kk_col, float kk_row,
         int **inten, int **inten_new, int **range, int **z_buf,
         int **ladar_label_y, int **ladar_label_x )
{  int i,j ,ir,jr,ir_cen,jr_cen,oldi ;
   float fli, flj, rt[3], rcol[3], rc[3], jpix, mtk[3], rng ;
   printf("Please wait...mapping VISIBLE regions...\n");
   ir_cen = ncols_recon/2;
   jr_cen = nrows_recon/2;
   /**** For each pixel, ---in small angle approximation ****/
   /**** compute line-of-sight vector in LADAR coordinates ****/
   for (fli=0; fli<ncols_ladar; fli=fli+overscan)
   {  i = (int) fli;
      rt[1] = (fli-ncols_ladar/2) * k_col;
      /** transform line-of-sight to recon photo coords **/
      rcol[0] = pr_mat[0][1] * rt[1] + pr_mat[0][2];
      rcol[1] = pr_mat[1][1] * rt[1] + pr_mat[1][2];
      rcol[2] = pr_mat[2][1] * rt[1] + pr_mat[2][2];
      jpix =(float)nrows_ladar/2;
      mtk[0] = pr_mat[0][0]*k_row;
      mtk[1] = pr_mat[1][0]*k_row;
      mtk[2] = pr_mat[2][0]*k_row;
      for(flj=0; flj<nrows_ladar; flj=flj+overscan)
      {  j = (int)flj;
         rng = 20 + range[i][j];
         rt[0] = (flj-jpix);
         rc[0] = rr[0] + rng *( mtk[0]*rt[0] + rcol[0] );
         rc[1] = rr[1] + rng *( mtk[1]*rt[0] + rcol[1] );
         rc[2] = rr[2] + rng *( mtk[2]*rt[0] + rcol[2] );
         /** project onto recon plane **/
         if (rc[2]>0.0)
         {  ir = ir_cen + kk_col * rc[1]/rc[2];
            jr = jr_cen + kk_row * rc[0]/rc[2];
            if    ( (0<ir) && (ir<ncols_recon) )      /*clip*/
            {  if ( (0<jr) && (jr<nrows_recon) )
               {  if ( rc[2] < z_buf[ir][jr] )
                  { inten_new[ir][jr] = inten[i][j];
                    z_buf[ir][jr] = rc[2];
                    ladar_label_y[ir][jr] = i;
                    ladar_label_x[ir][jr] = j;
                  }
               }
            }
         }
      }
   }
   return;
} /*********** END: subroutine MAP_VISIBLE()****************/

/*********************************************************/
/************ START: Subroutine MAP_CORNERS() ************/
/*********************************************************/
void map_corners(int ncols_ladar, int nrows_ladar,
         int ncols_recon,int nrows_recon,
         float **pr_mat, float *rr,
         float k_col, float k_row, float kk_col, float kk_row,
         int **range)
```

```c
{ int i,j ,ir,jr,ir_cen,jr_cen,oldi ;
  float fli, flj, rt[3], rcol[3], rc[3], jpix, mtk[3], rng ;
  int col_max, row_max, col_min, row_min;
  int nrows, ncols; /* returned as necessary array size */
  int corner[4][4];

printf("ncols_ladar = %d, nrows_ladar = %d\n", ncols_ladar,
         nrows_ladar);

printf("Please wait...determining VISIBLE
         mapping corners...\n");

ir_cen = 1024;
  jr_cen = 1024;

/**** For each pixel, ---in small angle approximation ****/
  /*** compute line-of-sight vector in LADAR coordinates ****/

/* map upper left pixel */
  fli = 0;
  flj = 0;
  i = (int) fli;
  j = (int) flj;
  rt[1] = (fli-ncols_ladar/2) * k_col;
  /** transform line-of-sight to recon photo coords **/
  rcol[0] = pr_mat[0][1] * rt[1] + pr_mat[0][2];
  rcol[1] = pr_mat[1][1] * rt[1] + pr_mat[1][2];
  rcol[2] = pr_mat[2][1] * rt[1] + pr_mat[2][2];
  jpix =(float)nrows_ladar/2;
  mtk[0] = pr_mat[0][0]*k_row;
  mtk[1] = pr_mat[1][0]*k_row;
  mtk[2] = pr_mat[2][0]*k_row;

rng = 20 + range[i][j];
  rt[0] = (flj-jpix);
  rc[0] = rr[0] + rng *( mtk[0]*rt[0] + rcol[0] );
  rc[1] = rr[1] + rng *( mtk[1]*rt[0] + rcol[1] );
  rc[2] = rr[2] + rng *( mtk[2]*rt[0] + rcol[2] );
  /** project onto recon plane **/
  corner[0][0] = ir_cen + kk_col * rc[1]/rc[2];
  corner[0][1] = jr_cen + kk_row * rc[0]/rc[2];

/* map upper right pixel */
  fli = 0;
  flj=nrows_ladar-1;
  i = (int) fli;
  j = (int) flj;
  rt[1] = (fli-ncols_ladar/2) * k_col;
  /** transform line-of-sight to recon photo coords **/
  rcol[0] = pr_mat[0][1] * rt[1] + pr_mat[0][2];
  rcol[1] = pr_mat[1][1] * rt[1] + pr_mat[1][2];
  rcol[2] = pr_mat[2][1] * rt[1] + pr_mat[2][2];
  jpix =(float)nrows_ladar/2;
  mtk[0] = pr_mat[0][0]*k_row;
  mtk[1] = pr_mat[1][0]*k_row;
  mtk[2] = pr_mat[2][0]*k_row;

rng = 20 + range[i][j];
  rt[0] = (flj-jpix);
  rc[0] = rr[0] + rng *( mtk[0]*rt[0] + rcol[0] );
  rc[1] = rr[1] + rng *( mtk[1]*rt[0] + rcol[1] );
  rc[2] = rr[2] + rng *( mtk[2]*rt[0] + rcol[2] );
  /** project onto recon plane **/
  corner[0][2] = ir_cen + kk_col * rc[1]/rc[2];
  corner[0][3] = jr_cen + kk_row * rc[0]/rc[2];

/* map lower left pixel */
  fli = ncols_ladar-1;
  flj = 0;
  i = (int) fli;
  j = (int) flj;
  rt[1] = (fli-ncols_ladar/2) * k_col;
  /** transform line-of-sight to recon photo coords **/
  rcol[0] = pr_mat[0][1] * rt[1] + pr_mat[0][2];
  rcol[1] = pr_mat[1][1] * rt[1] + pr_mat[1][2];
  rcol[2] = pr_mat[2][1] * rt[1] + pr_mat[2][2];
  jpix =(float)nrows_ladar/2;
  mtk[0] = pr_mat[0][0]*k_row;
  mtk[1] = pr_mat[1][0]*k_row;
  mtk[2] = pr_mat[2][0]*k_row;

rng = 20 + range[i][j];
```

```
        rt[0] = (flj-jpix);
        rc[0] = rr[0] + rng *( mtk[0]*rt[0] + rcol[0] );
        rc[1] = rr[1] + rng *( mtk[1]*rt[0] + rcol[1] );
        rc[2] = rr[2] + rng *( mtk[2]*rt[0] + rcol[2] );
        /** project onto recon plane **/
        corner[1][0] = ir_cen + kk_col * rc[1]/rc[2];
        corner[1][1] = jr_cen + kk_row * rc[0]/rc[2];

/* map lower right pixel */
        fli = ncols_ladar-1;
        flj = nrows_ladar-1;
        i = (int) fli;
        j = (int) flj;
        rt[1] = (fli-ncols_ladar/2) * k_col;
        /** transform line-of-sight to recon photo coords **/
        rcol[0] = pr_mat[0][1] * rt[1] + pr_mat[0][2];
        rcol[1] = pr_mat[1][1] * rt[1] + pr_mat[1][2];
        rcol[2] = pr_mat[2][1] * rt[1] + pr_mat[2][2];
        jpix =(float)nrows_ladar/2;
        mtk[0] = pr_mat[0][0]*k_row;
        mtk[1] = pr_mat[1][0]*k_row;
        mtk[2] = pr_mat[2][0]*k_row;

rng = 20 + range[i][j];
        rt[0] = (flj-jpix);
        rc[0] = rr[0] + rng *( mtk[0]*rt[0] + rcol[0] );
        rc[1] = rr[1] + rng *( mtk[1]*rt[0] + rcol[1] );
        rc[2] = rr[2] + rng *( mtk[2]*rt[0] + rcol[2] );
        /**** project onto recon plane *****/
        corner[1][2] = ir_cen + kk_col * rc[1]/rc[2];
        corner[1][3] = jr_cen + kk_row * rc[0]/rc[2];

col_max = -100000;
        row_max = -100000;
        col_min =  100000;
        row_min =  100000;

if (corner[0][0] > col_max) col_max = corner[0][0];
        if (corner[0][0] < col_min) col_min = corner[0][0];

if (corner[0][1] > row_max) row_max = corner[0][1];
        if (corner[0][1] < row_min) row_min = corner[0][1];

if (corner[0][2] > col_max) col_max = corner[0][2];
        if (corner[0][2] < col_min) col_min = corner[0][2];

if (corner[0][3] > row_max) row_max = corner[0][3];
        if (corner[0][3] < row_min) row_min = corner[0][3];

if (corner[1][0] > col_max) col_max = corner[1][0];
        if (corner[1][0] < col_min) col_min = corner[1][0];

if (corner[1][1] > row_max) row_max = corner[1][1];
        if (corner[1][1] < row_min) row_min = corner[1][1];
        if (corner[1][2] > col_max) col_max = corner[1][2];
        if (corner[1][2] < col_min) col_min = corner[1][2];
        if (corner[1][3] > row_max) row_max = corner[1][3];
        if (corner[1][3] < row_min) row_min = corner[1][3];
        ncols = col_max - col_min;
        nrows = row_max - row_min;
        printf("Calculated: ncols_recon = %d,
                nrows_recon = %d\n",ncols, nrows);

return;
} /******** END: subroutine MAP_CORNERS() *****************/ define ARTIF_COLOR   255
/*************************************************************/
/************* START: Subroutine MAP_ARTIFICIAL_V() ***********/
/*************************************************************/
void map_artificial_V(int ncols_ladar, int nrows_ladar,
        int ncols_recon, int nrows_recon,
        float **pr_mat, float *rr,
        float k_col, float k_row, float kk_col, float kk_row,
        int art_regions, int range, int **z_buf,
        int **edge, int replength )
{ int i,j ,ir,jr,ir_cen,jr_cen,ir1,ir2,jr1,jr2;
  int jtemp, jpre, jfil, rc;
  float fli,flj, rt[3],rcol[3], rc1[3], rc2[3], mtk[3], rng;
  int point1_inside, point2_inside;

printf("Please wait...generating ARTIFICIAL regions...\n");
```

```c
/**** Initialize variables ****/
ir_cen = ncols_recon/2;     /* center of recon photo */
jr_cen = nrows_recon/2;

/**** For each pixel, ---in small angle approximation  *******/
/****  compute line-of-sight vector in SENSOR coordinates *******/
for (i=2; i<ncols_ladar-2; i++)    /* scan along col starting at col 2 */
{   rt[1] = (i-ncols_ladar/2) * k_col;
    /******  transform line-of-sight to recon photo coordinates ******/
    rcol[0] = pr_mat[0][1] * rt[1] + pr_mat[0][2];
    rcol[1] = pr_mat[1][1] * rt[1] + pr_mat[1][2];
    rcol[2] = pr_mat[2][1] * rt[1] + pr_mat[2][2];

mtk[0] = pr_mat[0][0]*k_row;
    mtk[1] = pr_mat[1][0]*k_row;
    mtk[2] = pr_mat[2][0]*k_row;

for(j=2; j<nrows_ladar-2; j++)   /*** start line processing ****/
    {  jpre = j-1;                   /* save for next pass*/
       if (edge[i][j]>0)             /* test for edges*/
       {  /* map current pixel*/
          /* correction for sensor dynamics */
          rng = 20 + range[i][j];
          rt[0] = (float)(j-nrows_ladar/2);
          /* mapping x,y,z of first point */
          rc1[0] = rr[0] + rng *( mtk[0]*rt[0] + rcol[0] );
          rc1[1] = rr[1] + rng *( mtk[1]*rt[0] + rcol[1] );
          rc1[2] = rr[2] + rng *( mtk[2]*rt[0] + rcol[2] );

/* map previous pixel*/
          rng = 20 + range[i][jpre];
          rt[0] = (float)(jpre-nrows_ladar/2);
          /* mapping x,y,z of second point */
          rc2[0] = rr[0] + rng *( mtk[0]*rt[0] + rcol[0] );
          rc2[1] = rr[1] + rng *( mtk[1]*rt[0] + rcol[1] );
          rc2[2] = rr[2] + rng *( mtk[2]*rt[0] + rcol[2] );

/******  project onto recon plane ******/
          if( (rc1[2]>0.0) && (rc2[2]>0.0) )
          {  ir1 = ir_cen + kk_col * rc1[1]/rc1[2];
             jr1 = jr_cen + kk_row * rc1[0]/rc1[2];
             ir2 = ir_cen + kk_col * rc2[1]/rc2[2];
             jr2 = jr_cen + kk_row * rc2[0]/rc2[2];

point1_inside= ( (0<ir1) && (ir1<ncols_recon)
                            && (0<jr1) && (jr1<nrows_recon) );
             point2_inside= ( (0<ir2) && (ir2<ncols_recon)
                            && (0<jr2) && (jr2<nrows_recon) );

if (point1_inside && point2_inside)
             { for(jfil=0; jfil<replength; jfil++)
               { ir = ir1 + ((ir2-ir1)*jfil)/replength;
                 jr = jr1 + ((jr2-jr1)*jfil)/replength;
                 rc = rc1[2] + ((rc2[2]-rc1[2])*jfil)/replength;
                 if ( rc < z_buf[ir][jr] )
                 { art_regions[ir][jr] = ARTIF_COLOR;
                   z_buf[ir][jr] = rc;
                 }
               }
             }
             else if (point1_inside && (! point2_inside))
             { for(jfil=0; jfil<replength; jfil++)
               { ir = ir1 + ((ir2-ir1)*jfil)/replength;
                 jr = jr1 + ((jr2-jr1)*jfil)/replength;

if ( (0<ir) && (ir<ncols_recon) && (0<jr)
                     && (jr<nrows_recon) )
                 { rc = rc1[2] + ((rc2[2]-rc1[2])*jfil)/replength;
                   if ( rc < z_buf[ir][jr] )
                   { art_regions[ir][jr] = ARTIF_COLOR;
                     z_buf[ir][jr] = rc;
                   }
                 }
                 else
                     jfil=replength;
               }
             }
             else if (point2_inside && (! point1_inside))
             { for(jfil=0; jfil<replength; jfil++)
               { ir = ir2 + ((ir1-ir2)*jfil)/replength;
                 jr = jr2 + ((jr1-jr2)*jfil)/replength;
```

```
            if ( (0<ir) && (ir<ncols_recon) && (0<jr)
                  && (jr<nrows_recon) )
               { rc = rc2[2] + ((rc1[2]-rc2[2])*jfil)/replength;
                 if ( rc < z_buf[ir][jr] )
                    { art_regions[ir][jr] = ARTIF_COLOR;
                      z_buf[ir][jr] = rc;
                    }
                }
              else
                  jfil=replength;
            }
          }
        }
      }
    }
  }
  return;
} /************** END: subroutine MAP_ARTIFICIAL_V() *****************/
/********************************************************************/
/************* START: Subroutine MAP_ARTIFICIAL_H() *************/
/********************************************************************/
void map_artificial_H(int ncols_ladar, int nrows_ladar,
          int ncols_recon, int nrows_recon,
          float **pr_mat, float *rr,
          float k_col, float k_row, float kk_col, float kk_row,
          int art_regions, int range, int **z_buf,
          int **edge, int replength )
{ int i,j ,ir,jr,ir_cen,jr_cen,ir1,ir2,jr1,jr2;
  int jtemp, ipre, jfil, rc;
  float fli,flj, rt[3],rcol[3], rc1[3],rc2[3], mtk[3], rng;
  int point1_inside, point2_inside;

/**** Initialize variables ****/
  ir_cen = ncols_recon/2;   /* center of recon photo */
  jr_cen = nrows_recon/2;

/**** For each pixel, ---in small angle approximation  *******/
  /**** compute line-of-sight vector in SENSOR coordinates *******/
  mtk[0] = pr_mat[0][0]*k_row;
  mtk[1] = pr_mat[1][0]*k_row;
  mtk[2] = pr_mat[2][0]*k_row;

for (i=2; i<ncols_ladar-2; i++)    /* scan along col starting at col 2 */
  {
    for(j=2; j<nrows_ladar-2; j++)  /*** start line processing ****/
    { ipre = i-1;                    /* save for next pass*/
      if (edge[i][j] > 0)            /* test for edges*/
      { rt[1] = (i-ncols_ladar/2) * k_col;
        /***** transform line-of-sight to recon photo coordinates *****/
        rcol[0] = pr_mat[0][1] * rt[1] + pr_mat[0][2];
        rcol[1] = pr_mat[1][1] * rt[1] + pr_mat[1][2];
        rcol[2] = pr_mat[2][1] * rt[1] + pr_mat[2][2];

rng = 20 + range[i][j];
        rt[0] = (float)(j-nrows_ladar/2);
        /* mapping x,y,z of first point */
        rc1[0] = rr[0] + rng *( mtk[0]*rt[0] + rcol[0] );
        rc1[1] = rr[1] + rng *( mtk[1]*rt[0] + rcol[1] );
        rc1[2] = rr[2] + rng *( mtk[2]*rt[0] + rcol[2] );

/* map previous pixel*/
        rt[1] = (ipre-ncols_ladar/2) * k_col;
        /***** transform line-of-sight to recon photo coordinates *****/
        rcol[0] = pr_mat[0][1] * rt[1] + pr_mat[0][2];
        rcol[1] = pr_mat[1][1] * rt[1] + pr_mat[1][2];
        rcol[2] = pr_mat[2][1] * rt[1] + pr_mat[2][2];

rng = 20 + range[ipre][j];
        rt[0] = (float)(j-nrows_ladar/2);
        /* mapping x,y,z of second point */
        rc2[0] = rr[0] + rng *( mtk[0]*rt[0] + rcol[0] );
        rc2[1] = rr[1] + rng *( mtk[1]*rt[0] + rcol[1] );
        rc2[2] = rr[2] + rng *( mtk[2]*rt[0] + rcol[2] );

/************* project onto recon plane *****************/
        if( (rc1[2]>0.0) && (rc2[2]>0.0) )
        { /* x,y of points on recon plane */
          ir1 = ir_cen + kk_col * rc1[1]/rc1[2];
          jr1 = jr_cen + kk_row * rc1[0]/rc1[2];
          ir2 = ir_cen + kk_col * rc2[1]/rc2[2];
```

```
              jr2 = jr_cen +  kk_row * rc2[0]/rc2[2];

point1_inside= ( (0<ir1) && (ir1<ncols_recon) && (0<jr1)
                           && (jr1<nrows_recon) );
           point2_inside= ( (0<ir2) && (ir2<ncols_recon) && (0<jr2)
                           && (jr2<nrows_recon) );

if (point1_inside && point2_inside)
           { for(jfil=0; jfil<replength; jfil++)
              { ir = ir1 + ((ir2-ir1)*jfil)/replength;
                jr = jr1 + ((jr2-jr1)*jfil)/replength;
                rc = rc1[2] +  ((rc2[2]-rc1[2])*jfil)/replength;
                if ( rc < z_buf[ir][jr] )
                { art_regions[ir][jr] = ARTIF_COLOR;
                  z_buf[ir][jr] = rc;
                }
              }
           }
           else if (point1_inside && (! point2_inside))
           { for(jfil=0; jfil<replength; jfil++)
              { ir = ir1 + ((ir2-ir1)*jfil)/replength;
                jr = jr1 + ((jr2-jr1)*jfil)/replength;

if ( (0<ir) && (ir<ncols_recon) && (0<jr)
                     && (jr<nrows_recon) )
                { rc = rc1[2] +  ((rc2[2]-rc1[2])*jfil)/replength;
                  if ( rc < z_buf[ir][jr] )
                  { art_regions[ir][jr] = ARTIF_COLOR;
                    z_buf[ir][jr] = rc;
                  }
                }
                else
                   jfil=replength;
              }
           }
           else if (point2_inside && (! point1_inside))
           { for(jfil=0; jfil<replength; jfil++)
              { ir = ir2 + ((ir1-ir2)*jfil)/replength;
                jr = jr2 + ((jr1-jr2)*jfil)/replength;

if ( (0<ir) && (ir<ncols_recon) && (0<jr)
                     && (jr<nrows_recon) )
                { rc = rc2[2] +  ((rc1[2]-rc2[2])*jfil)/replength;
                  if ( rc < z_buf[ir][jr] )
                  { art_regions[ir][jr] = ARTIF_COLOR;
                    z_buf[ir][jr] = rc;
                  }
                }
                else
                   jfil=replength;
              }
           }
         }
        }
       }
      }
     } return;
  } /************* END: subroutine MAP_ARTIFICIAL_H() ****************/ c    Program to correct for LADAR dynamics.

implicit none include 'ipes$include:ipunits.inc'
     include 'ipes$include:ipflag_values.inc'
     include 'ipes$include:ipcontrol.inc' character*80 fname
     integer*4 rslot,islot,azslot,elslot,yawslot,pitslot,rollslot,rw_hdr
     integer*4 xslot,yslot,zslot,nr,nc,i,j,nf,status
     integer*2 az(340,148),el(340,148),pitch(340,148),roll(340,148),yaw(340,148)

include 'lash$include:lash_hdr.inc' do j=1,148
     do i=1,340
     az(i,j)=i-170
     el(i,j)=j-72
     pitch(i,j)=0
     roll(i,j)=0
     yaw(i,j)=0
     end do
     end do
```

```
      call ipinit write(6,'('' Enter filename to process'')')
      read(5,'(q,a80)',err=1,end=1),nf,fname(1:nf)
c
c     Read header for the file
c
      status=rw_hdr('lash$header:'//fname(1:nf)//'.hdr',hdr,0)

call ipinput ('lash$data:'//fname(1:nf),rslot,,)
      call iplist_ctl (rslot,'input and display',ipprompt)

c     call ipinput ('lash$data:'//fname(1:nf)//'az',azslot,,)
c     call iplist_ctl (azslot,'input and display',ipprompt)

c     call ipinput ('lash$data:'//fname(1:nf)//'el',elslot,,)
c     call iplist_ctl (elslot,'input and display',ipprompt)

c     call ipinput ('lash$data:'//fname(1:nf)//'yaw',yawslot,,)
c     call iplist_ctl (yawslot,'input and display',ipprompt)

c     call ipinput ('lash$data:'//fname(1:nf)//'pitch',pitslot,,)
c     call iplist_ctl (pitslot,'input and display',ipprompt)

c     call ipinput ('lash$data:'//fname(1:nf)//'roll',rollslot,,)
c     call iplist_ctl (rollslot,'input and display',ipprompt)

nr=ipslots(rslot).nrows
      nc=ipslots(rslot).ncols call ipoutput('lash$output:'//fname(1:nf)//'x',iptype_rs4,nr,nc,xslot,)
      call ipoutput('lash$output:'//fname(1:nf)//'y',iptype_rs4,nr,nc,yslot,)
      call ipoutput('lash$output:'//fname(1:nf)//'z',iptype_rs4,nr,nc,zslot,)

c     hdr.info.lpr=laser pulse rate (18.8 khz)
c     hdr.info.clks=laser clocks per nod (188)
c     hdr.info.gsf=gimbal scale factor conversion
c     hdr.info.hsf=humphreys scale factor conversion
c     hdr.info.dep=depression angle of sensor (17.5 degrees)
c     hdr.info.hres=hor res (0.4 mrads)
c     hdr.info.vres=ver res (0.4 mrads)
c     hdr.info.nods=number of nods
c     hdr.info.velocity = velocity vector determined from gps
c     hdr.info.ndetectors = 2 (2 channels)

if(status.eq.4) then
         Type*,'Header file not found - attempting to set intital conditions'
         hdr.info.lpr=18800.0
         hdr.info.clks=188.0
         hdr.info.dep=17.5/57.3
         hdr.info.hres=0.0004
         hdr.info.vres=0.0004
         hdr.info.rres=0.15
         hdr.info.gsf(1)=hdr.info.hres
         hdr.info.gsf(2)=hdr.info.vres
         hdr.info.nods=170
         hdr.info.velocity(1)=60
         hdr.info.velocity(2)=0
         hdr.info.velocity(3)=0
         hdr.info.ndetectors=2
         status=rw_hdr('lash$header:'//fname(1:nf)//'.hdr',hdr,1)
      endif if(hdr.info.ndetectors*hdr.info.nods.ne.ipslots(rslot).ncols) stop 'Error in file
     size' c     call
     r2xyz(%val(ipaddresses(rslot).start),%val(ipaddresses(azslot).start),%val(ipaddresses(elsl
     ot).start),
c    1
     %val(ipaddresses(yawslot).start),%val(ipaddresses(pitslot).start),%val(ipaddresses(rollslo
     t).start),
c    2
     %val(ipaddresses(xslot).start),%val(ipaddresses(yslot).start),%val(ipaddresses(zslot).star
     t),
c    3
     nr,hdr.info.hres,hdr.info.vres,hdr.info.rres,hdr.info.gsf,hdr.info.hsf,hdr.info.lpr,hdr.in
     fo.clks,
c    4   hdr.info.velocity,hdr.info.nods,hdr.info.ndetectors)

call r2xyz(%val(ipaddresses(rslot).start),az,el,yaw,pitch,roll,
     1
     %val(ipaddresses(xslot).start),%val(ipaddresses(yslot).start),%val(ipaddresses(zslot).star
     t),
```

```
      2
nr,hdr.info.hres,hdr.info.vres,hdr.info.rres,hdr.info.gsf,hdr.info.hsf,hdr.info.lpr,hdr.in
fo.clks,
      3   hdr.info.dep,hdr.info.velocity,hdr.info.nods,hdr.info.ndetectors)

call ipminmax(xslot)
        call ipminmax(yslot)
        call ipminmax(zslot)

call ipcopy_titles(rslot,xslot)
        call ipcopy_titles(rslot,yslot)
        call ipcopy_titles(rslot,zslot)

ipslots(xslot).ntitles=ipslots(xslot).ntitles+1
        write(ipslots(xslot).titles(ipslots(xslot).ntitles),
     1    '(''    x = r*(cos(az)*cos(dep)*cos(el)-sin(el)*sin(dep))'')')

ipslots(yslot).ntitles=ipslots(yslot).ntitles+1
        write(ipslots(yslot).titles(ipslots(yslot).ntitles),
     1    '(''    y = r*sin(az)*cos(el)'')')
        ipslots(zslot).ntitles=ipslots(zslot).ntitles+1
        write(ipslots(zslot).titles(ipslots(zslot).ntitles),
     1    '(''    z = r*(sin(dep)*cos(az)*cos(el)+cos(dep)*sin(el))'')')

1       stop
        end subroutine
     r2xyz(rng,alpha,gamma,psi,theta,phi,x,y,z,nr,hres,vres,rres,gsf,hsf,lpr,lclks,dep,vel,nods
     ,ndetectors)
        implicit none
        integer*4 nr,nods,ndetectors
        integer*2 rng(0:nods*ndetectors-1,0:nr-1)
        real*4
     x(0:nods*ndetectors-1,0:nr-1),y(0:nods*ndetectors-1,0:nr-1),z(0:nods*ndetectors-1,0:nr-1)
        integer*2 alpha(0:nods*ndetectors-1,0:nr-1),gamma(0:nods*ndetectors-1,0:nr-1)
        integer*2
     psi(0:nods*ndetectors-1,0:nr-1),theta(0:nods*ndetectors-1,0:nr-1),phi(0:nods*ndetectors-1,
     0:nr-1)
        real*4 hres,vres,rres,gsf(2),hsf(3),vel(3),dep,lclks,lpr
        real*4
     c_psi,s_psi,c_theta,s_theta,c_phi,s_phi,c_beta,s_beta,c_alpha,s_alpha,c_gamma,s_gamma
        real*4 r,x1,y1,z1,tj,t,t_nod,d2
        integer*4 i,j,k,l,m c_beta=cos(dep)
        s_beta=sin(dep)
        d2=float(ndetectors-1)/2.
        t_nod=lclks/lpr type*,'Number of nods - ',nods
        type*,'Number of detectors - ',ndetectors
        type*,'Laser info - ',lclks,lpr
        type*,'Depression angle - ',dep*57.3
        type*,'Velocity vector - ',vel
        type*,'Angular resolutions - ',hres,vres
        type*,'Range resolution - ',rres
        type*,'Nod frequency - ',t_nod
        pause do j=0,nr-1
        tj=float(j)/lpr
        do i=0,nods-1
        k=i*ndetectors
        do l=0,ndetectors-1
        m=k+l
        c_psi=cos(psi(m,j)*hsf(1))
        s_psi=sin(psi(m,j)*hsf(1))
        c_theta=cos(theta(m,j)*hsf(2))
        s_theta=sin(theta(m,j)*hsf(2))
        c_phi=cos(phi(m,j)*hsf(3))
        s_phi=sin(phi(m,j)*hsf(3))
        c_alpha=cos(alpha(m,j)*gsf(1)+(l-d2)*hres)
        s_alpha=sin(alpha(m,j)*gsf(1)+(l-d2)*hres)
        c_gamma=cos(gamma(m,j)*gsf(2))
        s_gamma=sin(gamma(m,j)*gsf(2))
        t=i*t_nod+tj
        r=rng(m,j)*rres
        x1=r*(c_gamma*c_alpha*c_beta-s_gamma*s_beta)
        y1=r*c_gamma*s_alpha
        z1=r*(s_gamma*c_beta+c_gamma*c_alpha*s_beta)
c       x(m,j)=x1*c_theta+(y1*s_phi+z1*c_phi)*c_psi-(y1*c_phi-z1*s_phi)*s_psi+t*vel(1)
```

```
c       y(m,j)=x1*c_theta+(y1*s_phi+z1*c_phi)*s_psi+(y1*c_phi-z1*s_phi)*c_psi+t*vel(2)
c       z(m,j)=-x1*s_theta+(y1*s_phi+z1*c_phi)*c_theta+t*vel(3)
        x(m,j)=x1+t*vel(1)
        y(m,j)=y1+t*vel(2)
        z(m,j)=z1+t*vel(3)
        end do
        end do
        end do return
        end include <stdio.h>
include <stdlib.h>
#include <math.h>
#include <graph.h>

/****************************************************************/
/*                  Subroutine: rrot()                          */
/*                                                              */
/* To generate the rotation matrix for angles yaw, pitch, roll. */
/* Axies are    y -- vertical, down                             */
/*              x -- horzontal, to the right                    */
/*              z -- horzontal, forward                         */
/*      Rotations are:                                          */
/*          Yaw around y axis from +z toward +x (clockwise from above) */
/*          Pitch around x axis from +z to +y  (downward)       */
/*          Roll around z axis form +x to -y  (counterclockwise)*/
/*                                                              */
/* Donald E. McArthur    April 17, 1992                         */
/****************************************************************/
void  r_rot(yaw, pitch, roll, rot)
        float yaw,pitch,roll;   /* INPUT angles in radians */
        float **rot;            /* OUTPUT rotation matrix */
{ rot[0][0] = cos(yaw)*cos(roll) +sin(yaw)*sin(pitch)*sin(roll);
  rot[0][1] = cos(yaw)*sin(roll)-sin(yaw)*sin(pitch)*cos(roll);
  rot[0][2] = sin(yaw)*cos(pitch);
  rot[1][0] = -cos(pitch)*sin(roll);
  rot[1][1] = cos(pitch)*cos(roll);
  rot[1][2] = sin(pitch);
  rot[2][0] = -sin(yaw)*cos(roll)+cos(yaw)*sin(pitch)*sin(roll);
  rot[2][1] = -sin(yaw)*sin(roll)-cos(yaw)*sin(pitch)*cos(roll);
  rot[2][2] = cos(yaw)*cos(pitch);
  return;
} /********** END: subroutine r_rot() *********/

/****************************************************************/
/* Subroutine for multiplication of the transpose              */
/*     of a 3x3 matrix by a matrix                             */
/*                                                              */
/* Donald E. McArthur,  April 17,1992                           */
/****************************************************************/
void  Mult_Tran_Matrix_3x3(float **mata,float **matb, float **matp )
{ int i,j;
  for (i=0; i<3; i++)
  { for (j=0; j<3; j++)
    { matp[i][j] =  mata[0][i]*matb[0][j] + mata[1][i]*matb[1][j]+
            mata[2][i]*matb[2][j];
    }
  }
} /******* END: Subroutine Mult_Tran_Matrix_3x3  *******/

/****************************************************************/
/* Subroutine for multiplication of the transpose              */
/*     of a 3x3 matrix by a vector                             */
/*                                                              */
/* Donald E. McArthur,  April 17,1992                           */
/****************************************************************/
void  Mult_Tran_Matrix_3x1(float **mata,float *vec, float *out)
{ int j;
  for (j=0; j<3; j++)
  { out[j] =  mata[0][j] * vec[0] + mata[1][j] * vec[1] +
          mata[2][j] * vec[2]  ;
  }
} /******* END: Subroutine Mult_Tran_Matrix_3x1   *******/

/****************************************************************/
/* Subroutine to initializefor a matrix to                     */
/*      a constant                                             */
/*                                                              */
/* Donald E. McArthur,  April 17,1992                           */
/****************************************************************/
```

```c
void _Matrix_Init(int nc, int nr, int value, int **out)
{ int j,k;
  for (j=0; j<nc; j++)
  { for(k=0; k<nr; k++)
    { out[j][k] = value;
    }
  }
} /******* END: subroutine _Matrix_Init() ******/

/****************************************************************/
/* Subroutine for dynamic memory management                     */
/****************************************************************/
void **memory(int nc,int nr,int size)
{ void **ptr;
  int i;
  ptr=(void **)malloc(nc*sizeof(void *));
  for(i=0; i<nc; i++)
     ptr[i]=(void *)malloc(nr*size);
  return ptr;
} /******** END: subroutine **memory()  ***********/

/****************************************************************/
/* START: Subroutine IMAGE_OR()                                 */
/* by Bryan Pettitt   May 16, 1992                              */
/****************************************************************/
void image_OR(int **edge1, int **edge2,
              int ncols, int nrows, int **image_ORed)
{ int col, row;

for (col=0; col < ncols; col++)
  { for (row=0; row < nrows;  row++)
    { if (edge1[col][row] != 0)
         image_ORed[col][row] = edge1[col][row];
      else if (edge2[col][row] != 0)
         image_ORed[col][row] = edge2[col][row];
      else
         image_ORed[col][row] = 0;
    }
  }
}

/****************************************************************/
/* START: Subroutine IMAGE_AND()                                */
/* by Bryan Pettitt   May 16, 1992                              */
/****************************************************************/ void image_AND(int edge1, int edge2,
               int ncols, int nrows, int **image_ANDed)
{ int col, row;

for (col=0; col < ncols; col++)
  { for (row=0; row < nrows;  row++)
    { if ( (edge1[col][row] != 0) && (edge2[col][row] != 0) )
         image_ANDed[col][row] = edge1[col][row];
      else
         image_ANDed[col][row] = 0;
    }
  }
} include <graph.h>
/****************************************************************/
/* Subroutine to disply two images on VGA                       */
/* The two images are positioned side-by-side on the screen     */
/* Bryan Pettitt May 28, 1992                                   */
/****************************************************************/
disp_2images(int ncols1, int nrows1, int **image1, int start1col, int start1row,
             int ncols2, int nrows2, int **image2, int start2col, int start2row,
             int slide_num)
{ register jm,jn1,jn2,jmax,kk;
  int i;
  long red, green, blue, color;
  int n, col, row;
  struct textsettings ts;
```

```c
_clearscreen ( _GCLEARSCREEN );
_setvideomode(_VRES256COLOR);    /* initialization of VGA */
_gettextsettings ( &ts );
_setcharsize( 15 * ts.height / 10 , 15 * ts.width / 10 );
_settextalign( _CENTER, _HALF );

/* Remap pallet for 64 grey shades */
for ( i=0; i < 64; i++)
{
    red = i;
    green = i << 8;
    blue = i << 16;
    _remappalette( i, red+green+blue);
    _remappalette( i+64, red);
    _remappalette( i+128, green);
    _remappalette( i+192, blue);

_remappalette( 318, red);
    _remappalette( 444, blue);

}

_setcolor(63); /* bright white for title display */
_setcharsize( 10 * ts.height / 10 , 10 * ts.width / 10 );

/* Decide which title text to display based on slide_num */
switch( slide_num )
{   case 1: /* Intensity and Range Ladar Imagery */
        _setcharsize( 15 * ts.height / 10 , 15 * ts.width / 10 );
        _grtext( 345, 70, " LADAR Images " );
        _setcharsize( 10 * ts.height / 10 , 10 * ts.width / 10 );
        _grtext( 130, 110, " Intensity ");
        _grtext( 450, 110, " Range ");
        break;
    case 2: /* Original Intensity and Transformed Image */
        _grtext( 130, 110, " LADAR Intensity ");
        _grtext( 450, 110, " Transformed Image ");
        break;
    case 3: /* Recon Photo and Transformed edges */
        _grtext( 130, 110, " RECCE Photo ");
        _grtext( 450, 110, " Transformed Intensity ");
        break;
    case 4: /* Recon Photo and Transformed edges */
        _grtext( 130, 110, " RECCE Edges ");
        _grtext( 450, 110, " Transformed Edges ");
        break;
    case 5: /* Recon Photo and Transformed edges */
        _grtext( 130, 110, " Edge Image Overlay ");
        _grtext( 450, 110, " Image Match ");
        break;
    default:
        break;
}
/* set color by stripping lower 2 bytes, divide to give 64 grey scales */
for (col=0; col < ncols1; col++)
{   for(row=0; row < nrows1; row++)
    {
        _setcolor((int) (image1[col][row])/4);
        _setpixel(col+start1col,row+start1row);
    }
}
getch();
for (col=0; col < ncols2; col++)
{   for(row=0; row < nrows2; row++)
    {
        _setcolor((int) (image2[col][row])/4);
        _setpixel(col+start2col,row+start2row);
    }
}   /* end of col and rowman loops */
_setcolor(63);
_rectangle( _GBORDER, start1col-1, start1row-1, ncols1+start1col-1,
            nrows1+start1row-1);
_rectangle( _GBORDER, start2col-1, start2row-1, ncols2+start2col-1,
            nrows2+start2row-1);

getch();
_setvideomode(_DEFAULTMODE);
return;
} /*** end of subroutine dispmat_2() ***************************************/
/***************************************************************************/
```

```c
#define N 9   /* size of line kernels */
/*****************************************************************/
/* SUBROUTINE: disp_lines()                                      */
/* Bryan Pettitt  June 17, 1992                                  */
/*****************************************************************/
void disp_lines(int **lines, int ncols, int nrows )
{ register jm,jn1,jn2,jmax,kk;
  int i,j;
  long red, green, blue, color;
int offset = (N-1)/2;  /* kernel center point (array starts at 0) */

_setvideomode(_VRES256COLOR);    /* initialization of VGA */ for (i=offset; i<ncols-offset; i++)  /* moves kernel center */
                                     /* throughout image avoiding edges */
{ for(j=offset; j<nrows-offset; j++)
    { switch( lines[i][j] )
        { case 1:
             _moveto(i-4, j-3);
             _lineto(i+4, j+3);
          break;
          case 2:
             _moveto(i-4, j-4);
             _lineto(i+4, j+4);
          break;
          case 3:
             _moveto(i-3, j-4);
             _lineto(i+3, j+4);
          break;
          case 4:
             _moveto(i-2, j-4);
             _lineto(i+2, j+4);
          break;
          case 5:
             _moveto(i-1, j-4);
             _lineto(i+1, j+4);
          break;
          case 6:
             _moveto(i, j-4);
             _lineto(i, j+4);
          break;
          case 7:
             _moveto(i-4, j+3);
             _lineto(i+4, j-3);
          break;
          case 8:
             _moveto(i-4, j+3);
             _lineto(i+4, j-3);
          break;
          case 9:
             _moveto(i-4, j+1);
             _lineto(i+4, j-1);
          break;
          case 10:
             _moveto(i-4, j);
             _lineto(i+4, j);
          break;
          case 11:
             _moveto(i-4, j-1);
             _lineto(i+4, j+1);
          break;
          case 12:
             _moveto(i-4, j-2);
             _lineto(i+4, j+2);
          break;
          case 13:
             _moveto(i+1, j-4);
             _lineto(i-1, j+4);
          break;
          case 14:
             _moveto(i+2, j-4);
             _lineto(i-2, j+4);
          break;
          case 15:
             _moveto(i+3, j-4);
             _lineto(i-3, j+4);
          break;
          case 16:
             _moveto(i+4, j-4);
             _lineto(i-4, j+4);
          break;
          default:
          break;
        }
    }
}
```

```c
        }
    }
    getch();
    _setvideomode(_DEFAULTMODE);
    return; } include "mouse1.c"
/************************************************************/
/* Subroutine to disply cross-hairs                         */
/* Written by: Bryan Pettitt  May 18, 1992                  */
/************************************************************/
display_crosshairs( int ncols1, int nrows1, int **image1,
                    int ncols2, int nrows2, int **image2,
                    int slide_num,int **ladar_label_y, int **ladar_label_x,
                    int recon_y,int recon_x)

{ register jm,jn1,jn2,jmax,kk;
  int i,j;
  long red, green, blue, color;
  int a, col, row;
  int ladar_x, ladar_y;
  int left_pressed = 0;
  int right_pressed = 0;
  struct textsettings ts;
  char *buf;

_clearscreen ( _GCLEARSCREEN );
  _setvideomode(_VRES256COLOR);    /* initialization of VGA */ if (!init_mouse() )
  {  printf("Mouse initialization error!\n");
     printf("MOUSE.COM or MOUSE.SYS loaded?\n");
     exit(1);
  }

_gettextsettings ( &ts );
  _setcharsize( 15 * ts.height / 10 , 15 * ts.width / 10 );
  _settextalign( _CENTER, _HALF );

/* Remap pallet for 64 grey shades */
  for ( i=0; i < 64; i++)
  {
     red = i;
     green = i << 8;
     blue = i << 16;
     _remappalette( i, red+green+blue);
     _remappalette( 318, red);
     _remappalette( 444, blue);
     _remappalette( 555, green);

}

_setcolor(63); /* bright white for title display */
  _setcharsize( 10 * ts.height / 10 , 10 * ts.width / 10 );

/* Decide which title text to display based on slide_num */
  switch( slide_num )
  { case 1: /* Intensity and Range Ladar Imagery */
         _setcharsize( 15 * ts.height / 10 , 15 * ts.width / 10 );
         _grtext( 345, 70, " LADAR Images " );
         _setcharsize( 10 * ts.height / 10 , 10 * ts.width / 10 );
         _grtext( 130, 110, " Intensity ");
         _grtext( 450, 110, " Range ");
         break;
    case 2: /* Original Intensity and Transformed Image */
         _grtext( 130, 110, " LADAR Intensity ");
         _grtext( 450, 110, " Transformed Image ");
         break;
    case 3: /* Recon Photo and Transformed edges */
         _grtext( 130, 110, " RECCE Photo ");
         _grtext( 450, 110, " Transformed Edges ");
         break;
    case 4: /* Recon Photo and Transformed edges */
         _grtext( 130, 110, " RECCE Edges ");
         _grtext( 450, 110, " Transformed Edges ");
         break;
    case 5: /* Recon Photo and Transformed edges */
         _grtext( 130, 110, " Edge Image Overlay ");
         _grtext( 450, 110, " Image Match ");
         break;
    default:
         break;
  }
```

```
/* display first image starting at 0,125*/
/* and second starting at 345,125      */
/* set color by stripping lower 2 bytes, divide to give 64 grey scales */
for (col=0; col < ncols1; col++)
{   for(row=0; row < nrows1;  row++)
    {
        _setcolor((int) (image1[col][row])/4);
        _setpixel(col,row+125);
    }
}
for (col=0; col < ncols2; col++)
{   for(row=0; row < nrows2;  row++)
    {
        _setcolor((int) (image2[col][row])/4);
        _setpixel(col+345,row+125);
    }
}   /* end of col and rownum loops */

_rectangle( _GBORDER, 0, 125, ncols1, 125+nrows1);
_rectangle( _GBORDER, 345, 125, 345+ncols2, 125+nrows2);

buf = malloc( _imagesize(0, 0, 640, 480) );

_getimage( 0, 0, 640, 480, buf ); /* clean image without crosshairs */
    while (!right_pressed )
    {
        mouse_start();
        while (!left_pressed && !right_pressed )
        {
            mouse_display();    /* draw mouse curson on top of current image */
            right_pressed = right_button();
            left_pressed = left_button();  /* check if left button pressed  */
            if (left_pressed)
            {
                _putimage(0, 0, buf, _GPSET );
                ladar_y=ladar_label_y[recon_y][recon_x];
                ladar_x=ladar_label_x[recon_y][recon_x]+125;
                recon_y=recon_y+345;
                recon_x=recon_x+125;

for (j= 4; j<28; j++)    /* draw 24 point crosshairs on images */
                { _setpixel(ladar_y+j, ladar_x );
                  _setpixel(recon_y+j, recon_x );
                  _setpixel(ladar_y-j, ladar_x );
                  _setpixel(recon_y-j, recon_x );
                  _setpixel(ladar_y,   ladar_x );
                  _setpixel(recon_y,   recon_x );
                  _setpixel(ladar_y,   ladar_x+j);
                  _setpixel(recon_y,   recon_x+j);
                  _setpixel(ladar_y,   ladar_x-j);
                  _setpixel(recon_y,   recon_x-j);
                }
                left_pressed = 0;
            }
        }
        mouse_end();
    }

_setvideomode(_DEFAULTMODE);
    return;

} /*** END: Subroutine display_crosshairs() ***/

/*********************************************************************/
/* Subroutine EDGE_THIN() to thin edges of a binary image            */
/*    based on Jain Fun. of DIP 1989, p. 383.                        */
/* Implemented by: Bryan Pettitt   June 3, 1992                      */
/*********************************************************************/
/*                                                                   */
/*      |12|11|10             Algorithm:                             */
/*      ---+--+--+--                                                 */
/*      p13|p3|p2|p9           P1 deleted if   2 <= NZN(p1) <= 6     */
/*      ---+--+--+--                           and     ZO(p1) = 1    */
/*      p14|p4|P1|p8                           and     p2.p4.p8 = 0  or ZO(p2) != 1 */
/*      ---+--+--+--                           and     p2.p4.p6 = 0  or ZO(p4) != 1 */
/*      p15|p5|p6|p7           where ZO(p1) is number of non-zero transitions */
/*                             in the ordered set p2->p3->...->p9->p2 */
/*                             and NZN is number of nonzero neighbors. */
/*********************************************************************/
```

```c
#define NONZERO  1
#define ZERO     0
#define OFF      0
define ON       1 edge_thin(int ein, int ncols, int nrows, int eout )
{
   int t23,t34,t45,t56,t67,t78,t89,t92; /* zero->nonzero transition count */
   int t1112,t123,t41,t18,t910,t1011,t1415,t155,t61,t12,t313,t1314;
   int p1,p2,p3,p4,p5,p6,p7,p8,p9,p10,p11,p12,p13,p14,p15; /* pixel values */
   int i,j,x;
   int NUM_NonZeroNeighbors;
   int NUM_P1_ZeroToNonzero;
   int NUM_P2_ZeroToNonzero;
   int NUM_P4_ZeroToNonzero;
   int status = 1;
   int ImageChanged = 1;
   int ImageUNchanged = 0;
   int passcount = 0;
   int **flagged;

flagged = (int **) memory(ncols,nrows,4);
   _Matrix_Init(ncols,nrows,0,flagged);

/* copy original edge image to working output array */
   for (i=3; i < ncols-3; i++)
   {  for (j=3; j < nrows-3; j++)
         eout[i][j] = ein[i][j];
   } printf("Please wait...thinning edges...\n");

while (status == ImageChanged)
   {
      status = ImageUNchanged;
      for (i=3; i <= ncols-3; i++)
      {  for (j=3; j <= nrows-3; j++)
         {
            NUM_NonZeroNeighbors = 0;
            if(p1 = eout[i][j] != 0) /* don't need to delete (thin) */
                                     /* a zero valued point */
            {  p2 = eout[i-1][j];
               p3 = eout[i-1][j-1];
               p4 = eout[i][j-1];
               p5 = eout[i+1][j-1];
               p6 = eout[i+1][j];
               p7 = eout[i+1][j+1];
               p8 = eout[i][j+1];
               p9 = eout[i-1][j+1];
               p10= eout[i-2][j+1];
               p11= eout[i-2][j];
               p12= eout[i-2][j-1];
               p13= eout[i-1][j-2];
               p14= eout[i][j-2];
               p15= eout[i+1][j-2];
               if (p2 > ZERO)  NUM_NonZeroNeighbors++;
               if (p3 > ZERO)  NUM_NonZeroNeighbors++;
               if (p4 > ZERO)  NUM_NonZeroNeighbors++;
               if (p5 > ZERO)  NUM_NonZeroNeighbors++;
               if (p6 > ZERO)  NUM_NonZeroNeighbors++;
               if (p7 > ZERO)  NUM_NonZeroNeighbors++;
               if (p8 > ZERO)  NUM_NonZeroNeighbors++;
               if (p9 > ZERO)  NUM_NonZeroNeighbors++;

t23=t34=t45=t56=t67=t78=t89=t92 = 0;
               t1112=t123=t41=t18=t910=t1011=t1415=t155=t61=t12=t313=t1314=0;
               NUM_P1_ZeroToNonzero = 0;
               NUM_P2_ZeroToNonzero = 0;
               NUM_P4_ZeroToNonzero = 0;

/* continue thinning if 2 <= NUM_NonZeroNeighbors <= 6 */
               if (2 <= NUM_NonZeroNeighbors && NUM_NonZeroNeighbors <= 6)
               {  if ((p2 == ZERO) && (p3 != ZERO))  t23   = 1;
                  if ((p3 == ZERO) && (p4 != ZERO))  t34   = 1;
                  if ((p4 == ZERO) && (p5 != ZERO))  t45   = 1;
                  if ((p5 == ZERO) && (p6 != ZERO))  t56   = 1;
                  if ((p6 == ZERO) && (p7 != ZERO))  t67   = 1;
                  if ((p7 == ZERO) && (p8 != ZERO))  t78   = 1;
                  if ((p8 == ZERO) && (p9 != ZERO))  t89   = 1;
                  if ((p9 == ZERO) && (p2 != ZERO))  t92   = 1;
                  if ((p11== ZERO) && (p12!= ZERO))  t1112 = 1;
                  if ((p12== ZERO) && (p3 != ZERO))  t123  = 1;
                  if ((p4 == ZERO) && (p1 != ZERO))  t41   = 1;
                  if ((p1 == ZERO) && (p8 != ZERO))  t18   = 1;
                  if ((p9 == ZERO) && (p10!= ZERO))  t910  = 1;
```

```
            if ((p10== ZERO) && (p11!= ZERO))   t1011= 1;
            if ((p14== ZERO) && (p15!= ZERO))   t1415= 1;
            if ((p15== ZERO) && (p5 != ZERO))   t155 = 1;
            if ((p6 == ZERO) && (p1 != ZERO))   t61  = 1;
            if ((p1 == ZERO) && (p2 != ZERO))   t12  = 1;
            if ((p3 == ZERO) && (p13!= ZERO))   t313 = 1;
            if ((p13== ZERO) && (p14!= ZERO))   t1314= 1;

NUM_P1_ZeroToNonzero =t23+t34+t45+t56+t67+t78+t89+t92;
            NUM_P2_ZeroToNonzero =t1112+t123+t34+t41+t18+t89+t910+t1011;
            NUM_P4_ZeroToNonzero =t1415+t155+t56+t61+t12+t23+t313+t1314;

if (NUM_P1_ZeroToNonzero == 1)  /* continue thinning */
            {  if ((p2&&p4&&p8 == 0)  OR  (NUM_P2_ZeroToNonzero != 1) )
               {  if ( (p2&&p4&&p6 == 0) OR (NUM_P4_ZeroToNonzero != 1))
                  {  status = ImageChanged;
                     flagged[i][j] = 1;
                  }
               }
            }
          }
        }/* end if p1 != 0 */
      }
    } /* end col/row loop */ for (i=3; i <= ncols-3; i++)
    {  for (j=3; j <= nrows-3; j++)
       {  if (flagged[i][j] == 1)
            sout[i][j]=0;
       }
    }
    _Matrix_Init(ncols,nrows,0,flagged);

} /* end while ImageChanaged loop */
}

/********************************************************************/
/*                  SUBROUTINE: edggrad3                             */
/*                                                                   */
/*  Purpose: This subroutine applies four gradient masks to an input */
/*           array and a number of ways exist for determining the    */
/*           magnitude which is taken as the gradient at that point  */
/*           in the input array (or image). The direction of the     */
/*           gradient is determined by teh particular mask that      */
/*           yields the largest magnitude and by the sign of the     */
/*           applied mask.  There are a total of 8 directions        */
/*           45 degrees apart.                                       */
/*********************************************************************/
/*                                                                   */
/*  Notes: The gradient masks are as follows:                        */
/*                                                                   */
/*  work[3]=-1   0   1    work[2]= 0   1   1                         */
/*          -1   0   1            -1   0   1                         */
/*          -1   0   1            -1  -1   0                         */
/*          (0 deg)                (45 deg)                          */
/*                                                                   */
/*  work[1]= 1   1   1    work[4]= 1   1   0                         */
/*           0   0   0             1   0  -1                         */
/*          -1  -1  -1             0  -1  -1                         */
/*          (90 deg)               (135 deg)                         */
/*                                                                   */
/*********************************************************************/
/*                                                                   */
/*  Converted from FORTRAN code for WATCOM C                         */
/*                                                                   */
/*   FORTRAN code by: Walter M. Delashmit    1 September 1983        */
/*   C conversion by: Bryan Pettitt         13 May 1992              */
/*                                                                   */
/*********************************************************************/
/*                                                                   */
/*  Modification history:                                            */
/*     9-7-83 - to combine components differently                    */
/*                                                                   */
/*********************************************************************/
#include <stdio.h>
#include <math.h>
include <stdlib.h> define EDGE_COLOR  318 void edggrad3(int image, int grad_mag,
              int ncols,int nrows, int imag, int div,int threshold)
```

```
{ int x,y,l,sign,smallest,largest,m,k,n;
  int tmp1,tmp2,xtmp1,xtmp2,xtmp;
  int work[5],work1,work2,work3,work4;

printf("Please wait...finding edges\n");

/* Initialize work variables */
  for (x=1; x<=4; x++)
     work[x]=0;
  largest=1;
  smallest=13000;

/* Apply gradient masks to image */
  for (y=2; y<ncols; y++)
  { for (x=2; x<nrows; x++)
    { work[1]=image[y-1][x-1]+image[y-1][x]+image[y-1][x+1]
            -(image[y+1][x-1]+image[y+1][x]+image[y+1][x+1]);
      work1=work[1];
      work[2]=-(image[y-1][x]+image[y-1][x+1]+image[y][x+1])
            +image[y][x-1]+image[y+1][x-1]+image[y+1][x];
      work2=abs(work[2]);
      work[3]=image[y-1][x+1]+image[y][x+1]+image[y+1][x+1]
            -(image[y-1][x-1]+image[y][x-1]+image[y+1][x-1]);
      work3=work[3];
      work[4]=image[y-1][x]+image[y-1][x-1]+image[y][x-1]
            -(image[y][x+1]+image[y+1][x+1]+image[y+1][x]);
      work4=work[4];
      m=abs(work1);
      k=1;
      /* Determine the largest gradient from above masks */
      for (l=2; l<=4; l++)
      { if (m < abs(work[l]))
        { k=l;
          m=abs(work[l]);
        }
      }
      if (imag==1)
      { grad_mag[y][x]=m;
/*      printf("largest mask is\t%d with value\t%d\n",k,m);
        printf("%d\t%d\t%d\n%d\t%d\t%d\n%d\t%d\t%d\n\n",
              image[y-1][x-1],image[y-1][x],image[y-1][x+1],
              image[y][x-1],image[y][x],image[y][x+1],
              image[y+1][x-1],image[y+1][x],image[y+1][x+1]); */
      }
      if (imag==2)
      { xtmp=(abs(work1)+abs(work2)+abs(work3)+abs(work4))/div;
        grad_mag[y][x]=xtmp;
      }
      if (imag==3)
      { xtmp=work1*work1+work2*work2+work3*work3+work4*work4;
        grad_mag[y][x]=sqrt(xtmp/div);
      }
      if (imag==4)
      { xtmp1=sqrt(work1*work1+work3*work3)/div;
        xtmp2=sqrt(work2*work2+work4*work4)/div;
        grad_mag[y][x]=max(xtmp1,xtmp2);
      }
      /* n will be equal to the largest magnitude in grad_mag */
      if (m > largest)
        largest=abs(m);
      /* determine direction of gradient (range is 0-7) */
      if (work[k]>0)
        sign=1;
      else
        sign=-1;
      grad_dir[y][x]=k-1+(sign)-1*(-2);
    }
  }
  /* Create binary edge image */
  for (y=2; y<ncols; y++)
  { for (x=2; x<nrows; x++)
    { if (grad_mag[y][x] >= threshold)
        grad_mag[y][x]=EDGE_COLOR;
      else
        grad_mag[y][x]=0;
    }
  }
  return;}

/*****************************************************************/
/* SUBROUTINE: gapfill();                                        */
/*    performs gap filling on transformed ladar image            */
```

```c
/* Written by: Bryan Pettitt June 9, 1992                              */
/**********************************************************************/
gapfill(int **image, int ncols, int nrows )
{   int col,row, **temp;
    int p4,p3,p2,p1,n1,n2,n3,n4;
    int div = 0;

temp = (int **) memory(ncols, nrows, 4);
    _Matrix_Init(ncols,nrows,0,temp);

printf("Please wait...filling gaps...\n");

/* start at bottom of image and if current point is zero   */
    /* average two previous and next two pixels along a column */
    /* as the filled in pixel value.                           */
    for(col=0; col<ncols; col++)
    {  for(row=nrows-4; row>4; row--)
        {
            if ( (p3=image[col][row-3]) != 0 ) div ++;
            if ( (p2=image[col][row-2]) != 0 ) div ++;
            if ( (p1=image[col][row-1]) != 0 ) div ++;
            if ( (n1=image[col][row+1]) != 0 ) div ++;
            if ( (n2=image[col][row+2]) != 0 ) div ++;
            if ( (n3=image[col][row+3]) != 0 ) div ++;

/* if some of the points above or below the current point  */
            /* are non-zero and the current point is zero, average     */
            /* together the points above and below as the new current point. */
            if ( (div != 0) && (image[col][row] == 0) )
                temp[col][row] = (p3+p2+p1+n1+n2+n3)/div;
            else
                temp[col][row] = image[col][row];

div = 0;
        }
    } for(col=0; col<ncols; col++)
    {  for(row=nrows-4; row>4; row--)
        {  image[col][row] = temp[col][row];
        }
    }

_Matrix_Init(ncols,nrows,0,temp);
    div = 0;

/* start at bottom of image and if current point is zero   */
    /* average two previous and next two pixels along a row    */
    /* as the filled in pixel value.                           */
    for(col=4; col<ncols-4; col++)
    {  for(row=nrows; row>=0; row--)
        {
            if ( (p3=image[col-3][row]) != 0 ) div ++; /* div = # non-zero */
            if ( (p2=image[col-2][row]) != 0 ) div ++;
            if ( (p1=image[col-1][row]) != 0 ) div ++;
            if ( (n1=image[col+1][row]) != 0 ) div ++;
            if ( (n2=image[col+2][row]) != 0 ) div ++;
            if ( (n3=image[col+3][row]) != 0 ) div ++;

/* if some of the points to left or right of the current point */
            /* are != zero and the current point is zero, average          */
            /* together the points to the left and right for current point. */
            if ( (div != 0) && (image[col][row] == 0) )
                temp[col][row] = (p3+p2+p1+n1+n2+n3)/div;
            else
                temp[col][row] = image[col][row];

div = 0;
        }
    } for(col=4; col<ncols-4; col++)
    {  for(row=nrows; row>=0; row--)
        {  image[col][row] = temp[col][row];
        }
    }
    return;

} /** END Subroutine gapfill() **/ include <stdio.h>
```

```
/****************************************************************/
/* SUBROUTINE: read_image()                                     */
/* Bryan Pettitt  May 20, 1992                                  */
/****************************************************************/
void read_image(char *filename,int ncols,int nrows,int **image, int size)
{ FILE *fp1;
   int col,row;

printf("Reading File:   %s\n", filename);

if ((fp1 = fopen(filename,"rb")) == NULL)
   { printf("Cannot open %s for reading.\n",filename);
     return;
   } for (row=0; row < nrows; row++)
   { for (col=0; col < ncols; col++)
     { fread(&image[col][row], size, 1, fp1);
     }
   } fclose(fp1);
   return;
} /*********** END: subroutine read_image() ***************/

/****************************************************************/
/* SUBROUTINE: write_image()                                    */
/* Bryan Pettitt  May 18, 1992                                  */
/****************************************************************/
write_image(int **image, int ncols, int nrows, int size, char *filename)
{ FILE *fp1;
   int j;
   int col,row;

printf("Writing File:   %s\n",filename);
   if ((fp1 = fopen(filename,"wb")) == NULL)

{ printf("Cannot open %s for writing.\n",filename);
     return;
   }

/* write out Fortran ordered image */
   for (row=0; row < nrows; row++)
   { for (col=0; col < ncols; col++)
       fwrite(&image[col][row], size, 1, fp1);
   } fclose(fp1);
   return;
} /**** END: Subroutine write_image() ****/

/****************************************************************/
/* START: Subroutine ELIMINATE_WATER()                          */
/* Written by: Bryan Pettitt June 28, 1992                      */
/****************************************************************/
void eliminate_water(int **inten, int **range, int ncols_ladar, int nrows_ladar)
{ int col, row;

for (col=0; col < ncols_ladar; col++)
   { for (row=0; row < nrows_ladar; row++)
     { if (range[col][row] > 12000) /* water detected */
       { range[col][row] = 0;
         inten[col][row] = 0;
       }
     }
   }
   return;
}

/****************************************************************/
/* SUBROUTINE: find_lines()                                     */
/* Bryan Pettitt  June 17, 1992                                 */
/****************************************************************/
```

```c
#define N 9   /* size of line kernels (NxN kernel)               */
define M 7   /* if M of N edge_image and Kernel points correspond => line */ void find_lines(int edges, int ncols, int nrows, int lines )
{
   int nmasks = 16;        /* number of line masks used in line.h */
   int offset = (N-1)/2;   /* kernel center point (array starts at 0) */
   int count1=0;int count2=0;int count3=0;int count4=0;int count5=0;
   int count6=0;int count7=0;int count8=0;int count9=0;int count10=0;
   int count11=0;int count12=0;int count13=0;
   int count14=0;int count15=0;int count16=0;
   int kernel=0;
   int i,j,m,n;
   int numlines = 0;

printf("Please wait...finding lines...\n");

for (i=0; i<ncols; i++)    /* make binary edge range from 0->1 */
{ for(j=0; j<nrows; j++)
   { if (edges[i][j] > 0)
        edges[i][j] = 1;
   }
} for (i=offset; i<ncols-offset; i++)    /* moves kernel center throughout */
{ for(j=offset; j<nrows-offset; j++)   /* image avoiding edges           */
   {
      /* perform line search using 16 kernels each with 9 points line */
      count1 =   edges[i-4][j-3] + edges[i-3][j-2] + edges[i-2][j-2]
               + edges[i-1][j-1] + edges[i][j]     + edges[i+1][j+1]
               + edges[i+2][j+2] + edges[i+3][j+2] + edges[i+4][j+3];
      if (count1>M)  kernel=1;
      count2 =   edges[i-4][j-4] + edges[i-3][j-3] + edges[i-2][j-2]
               + edges[i-1][j-1] + edges[i][j]     + edges[i+1][j+1]
               + edges[i+2][j+2] + edges[i+3][j+3] + edges[i+4][j+4];
      if (count2>M)  kernel=2;
      count3 =   edges[i-3][j-4] + edges[i-2][j-3] + edges[i-2][j-2]
               + edges[i-1][j-1] + edges[i][j]     + edges[i+1][j+1]
               + edges[i+2][j+2] + edges[i+2][j+3] + edges[i+3][j+4];
      if (count3>M)  kernel=3;
      count4 =   edges[i-2][j-4] + edges[i-2][j-3] + edges[i-1][j-2]
               + edges[i-1][j-1] + edges[i][j]     + edges[i+1][j+1]
               + edges[i+1][j+2] + edges[i+2][j+3] + edges[i+2][j+4];
      if (count4>M)  kernel=4;
      count5 =   edges[i-1][j-4] + edges[i-1][j-3] + edges[i-1][j-2]
               + edges[i][j-1]   + edges[i][j]     + edges[i][j+1]
               + edges[i+1][j+2] + edges[i+1][j+3] + edges[i+1][j+4];
      if (count5>M)  kernel=5;
      count6 =   edges[i][j-4]   + edges[i][j-3]   + edges[i][j-2]
               + edges[i][j-1]   + edges[i][j]     + edges[i][j+1]
               + edges[i][j+2]   + edges[i][j+3]   + edges[i][j+4];
      if (count6>M)  kernel=6;
      count7 =   edges[i-4][j+3] + edges[i-3][j+2] + edges[i-2][j+2]
               + edges[i-1][j+1] + edges[i][j]     + edges[i+1][j-1]
               + edges[i+2][j-2] + edges[i+3][j-2] + edges[i+4][j-3];
      if (count7>M)  kernel=7;
      count8 =   edges[i-4][j+2] + edges[i-3][j+2] + edges[i-2][j+1]
               + edges[i-1][j+1] + edges[i][j]     + edges[i+1][j-1]
               + edges[i+2][j-1] + edges[i+3][j-2] + edges[i+4][j-2];
      if (count8>M)  kernel=8;
      count9 =   edges[i-4][j+1] + edges[i-3][j+1] + edges[i-2][j+1]
               + edges[i-1][j]   + edges[i][j]     + edges[i+1][j]
               + edges[i+2][j-1] + edges[i+3][j-1] + edges[i+4][j-1];
      if (count9>M)  kernel=10;
      count10 =  edges[i-4][j]   + edges[i-3][j]   + edges[i-2][j]
               + edges[i-1][j]   + edges[i][j]     + edges[i+1][j]
               + edges[i+2][j]   + edges[i+3][j]   + edges[i+4][j];
      if (count10>M)  kernel=10;
      count11 =  edges[i-4][j-1] + edges[i-3][j-1] + edges[i-2][j-1]
               + edges[i-1][j]   + edges[i][j]     + edges[i+1][j]
               + edges[i+2][j+1] + edges[i+3][j+1] + edges[i+4][j+1];
      if (count11>M)  kernel=11;
      count12 =  edges[i-4][j-2] + edges[i-3][j-2] + edges[i-2][j-1]
               + edges[i-1][j-1] + edges[i][j]     + edges[i+1][j+1]
               + edges[i+2][j+1] + edges[i+3][j+2] + edges[i+4][j+2];
      if (count12>M)  kernel=12;
      count13 =  edges[i+1][j-4] + edges[i+1][j-3] + edges[i+1][j-2]
               + edges[i][j-1]   + edges[i][j]     + edges[i][j+1]
               + edges[i-1][j+2] + edges[i-1][j+3] + edges[i-1][j+4];
      if (count13>M)  kernel=13;
      count14 =  edges[i+2][j-4] + edges[i+2][j-3] + edges[i+1][j-2]
               + edges[i+1][j-1] + edges[i][j]     + edges[i-1][j+1]
               + edges[i-1][j+2] + edges[i-2][j+3] + edges[i-2][j+4];
      if (count14>M)  kernel=14;
```

```
        count15 =   edges[i+3][j-4] + edges[i+2][j-3] + edges[i+2][j-2]
                  + edges[i+1][j-1] + edges[i][j]     + edges[i-1][j+1]
                  + edges[i-2][j+2] + edges[i-2][j+3] + edges[i-3][j+4];
        if (count15>M)  kernel=15;
        count16 =   edges[i+4][j-4] + edges[i+3][j-3] + edges[i+2][j-2]
                  + edges[i+1][j-1] + edges[i][j]     + edges[i-1][j+1]
                  + edges[i-2][j+2] + edges[i-3][j+3] + edges[i-4][j+4];
        if (count16>M)  kernel=16;

if (kernel > 0)
        {
            lines[i][j] = kernel;  /* store kernel number in lines array  */
                                   /* at point i,j where kernel number    */
                                   /* corresponds to 1-16 line orientation */
            numlines++;
        }
        else
            lines[i][j] = 0;

count1=0; count2=0; count3=0; count4=0; count5=0;
        count6=0; count7=0; count8=0; count9=0; count10=0;
        count11=0; count12=0; count13=0; count14=0; count15=0; count16=0;
        kernel = 0;
      }
   }
   printf("%d lines detected\n",numlines);
   return;
}

/********************************************************************/
/* SUBROUTINE: median();                                            */
/*      performs median filtering on an image                       */
/* written by: Bryan Pettitt   June 1, 1992                         */
/********************************************************************/
median(int **image, int ncols, int nrows )
{   int i,j,k,l,temp;
    static int filter[9];

printf("Please wait...median filtering...\n");

for(i=1; i<ncols-1; i++)
    { for(j=1; j<nrows-1; j++)
      {
          filter[0] = image[i-1][j-1];
          filter[1] = image[i-1][j];
          filter[2] = image[i-1][j+1];
          filter[3] = image[i][j-1];
          filter[4] = image[i][j];
          filter[5] = image[i][j+1];
          filter[6] = image[i+1][j-1];
          filter[7] = image[i+1][j];
          filter[8] = image[i+1][j+1];

for(k=0; k<8; k++)
          {  for(l=k+1; l<9; l++)
                if( filter[k] < filter[l] )
                {  temp = filter[k];
                   filter[k] = filter[l];
                   filter[l] = temp;
                }
          }
          image[i][j] = filter[4];   /* median value now in filter[4] */
      }
    }
} /**** END Subroutine median() ****/

/********************************************************************/
/* MOUSE subroutines                                                */
/********************************************************************/
#include <dos.h>
include <malloc.h> int left_button(void);
int right_button(void);
void mouse_display(void);
int init_mouse(void);
void mouse_start(void);
void mouse_end(void);
```

```c
/* WHD    #define X_WIDTH 1024
define Y_HEIGHT 768                    WHD    */ define X_WIDTH 640
define Y_HEIGHT 480 char            *mouse_buf;
unsigned char   first_byte;
long            vector;
long            sticks, eticks;
union REGS      iReg,oReg;
union REGS      iZoom,oZoom;
struct SREGS    segregs;
int             cursor_x,cursor_y;

void (interrupt far *int_handler)();

/* What does the mouse pointer look like? */ int     mouse_size  = 17;
int     mouse_size2 = 8;

int mouse[17][17] = {  0, 0, 0, 0, 0, 0,63, 0, 0, 0,63, 0, 0, 0, 0, 0, 0,
                       0, 0, 0, 0, 0, 0,63, 0, 0, 0,63, 0, 0, 0, 0, 0, 0,
                       0, 0, 0, 0, 0, 0,63, 0, 0, 0,63, 0, 0, 0, 0, 0, 0,
                       0, 0, 0, 0, 0, 0,63, 0, 0, 0,63, 0, 0, 0, 0, 0, 0,
                       0, 0, 0, 0, 0, 0,63, 0, 0, 0,63, 0, 0, 0, 0, 0, 0,
                       0, 0, 0, 0, 0, 0,63, 0, 0, 0,63, 0, 0, 0, 0, 0, 0,
                      63,63,63,63,63,63,63, 0, 0, 0,63,63,63,63,63,63,63,
                       0, 0, 0, 0, 0, 0, 0, 0, 0, 0, 0, 0, 0, 0, 0, 0, 0,
                       0, 0, 0, 0, 0, 0, 0, 0, 0, 0, 0, 0, 0, 0, 0, 0, 0,
                      63,63,63,63,63,63,63, 0, 0, 0,63,63,63,63,63,63,63,
                       0, 0, 0, 0, 0, 0,63, 0, 0, 0,63, 0, 0, 0, 0, 0, 0,
                       0, 0, 0, 0, 0, 0,63, 0, 0, 0,63, 0, 0, 0, 0, 0, 0,
                       0, 0, 0, 0, 0, 0,63, 0, 0, 0,63, 0, 0, 0, 0, 0, 0,
                       0, 0, 0, 0, 0, 0,63, 0, 0, 0,63, 0, 0, 0, 0, 0, 0,
                       0, 0, 0, 0, 0, 0,63, 0, 0, 0,63, 0, 0, 0, 0, 0, 0,
                       0, 0, 0, 0, 0, 0,63, 0, 0, 0,63, 0, 0, 0, 0, 0, 0 };

/****************************************************************

Mouse Routines

****************************************************************/ int left_button(void)
{
        iZoom.w.ax = 3;                 /* Get mouse button info */
        int386(0x33, &iZoom, &oZoom);
        if( oZoom.w.bx & 0x01 )
            return(1);                  /* left mouse button pressed */
        else
            return(0);                  /* left mouse button NOT pressed */
} int right_button(void)
{
        iZoom.w.ax = 3;                 /* Get mouse button info */
        int386(0x33, &iZoom, &oZoom);
        if( oZoom.w.bx & 0x02 )
            return(1);                  /* right mouse button pressed */
        else
            return(0);                  /* right mouse button NOT pressed */
} void mouse_display(void)
{
        int     x_off,y_off;

iReg.w.ax = 11;                 /* Read mickey counter */
        int386(0x33, &iReg, &oReg);
        if (oReg.w.cx != 0 || oReg.w.dx != 0)   /* Mouse has moved */
        {
                _putimage( cursor_x-mouse_size2, cursor_y-mouse_size2,
                           mouse_buf, _GXOR );

if( oReg.w.cx > 32768 )         /* Compute X movement */
                    x_off = oReg.w.cx - 65536;
                else
                    x_off = oReg.w.cx;
                cursor_x=cursor_x+x_off;
```

```c
                if (cursor_x < 1) cursor_x=1;
                if (cursor_x > X_WIDTH-1) cursor_x = X_WIDTH-1;

if( oReg.w.dx > 32768 )         /* Compute Y movement */
                    y_off = oReg.w.dx - 65536;
                else
                    y_off = oReg.w.dx;
                cursor_y=cursor_y+y_off;
                if (cursor_y < 1) cursor_y=1;
                if (cursor_y > Y_HEIGHT-1) cursor_y = Y_HEIGHT-1;

_putimage( cursor_x-mouse_size2, cursor_y-mouse_size2,
                        mouse_buf, _GXOR );
            }

} int init_mouse(void)
    {
        int     i,j,x,y,old_col;

old_col = _getcolor();

cursor_x = X_WIDTH/2;
        cursor_y = Y_HEIGHT/2;

int_handler = _dos_getvect(0x33);   /* Get mouse interrupt vector */
        first_byte = *(unsigned char far *) int_handler;
        vector = (long) int_handler;
        if ((vector == 0) || (first_byte == 0xcf))
            return(0);                  /* Return error if 1st byte is IRET or 0 */
        iReg.w.ax = 0;
        int386(0x33, &iReg, &oReg);                 /* Mouse reset and status */
        if( !(oReg.w.ax == -1) )                    /* Was mouse found? */
            return(0);                              /* If NOT, return true */ mouse_buf = malloc( _imagesize( 1, 1, mouse_size, mouse_size ) );
        for(i=0; i<mouse_size; i++)
            for(j=0; j<mouse_size; j++)
            {
                x = cursor_x + i - mouse_size2;
                y = cursor_y + j - mouse_size2;
                _setcolor( mouse[i][j] );
                _setpixel( x, y );
            }
        _getimage( cursor_x-mouse_size2, cursor_y-mouse_size2,
                cursor_x+mouse_size2, cursor_y+mouse_size2, mouse_buf );

iReg.w.ax = 11;
        int386(0x33, &iReg, &oReg);             /* Reset mouse */

_setcolor(old_col);

_clearscreen( _GCLEARSCREEN );

return(1);

} void mouse_start(void)
    {
            _putimage( cursor_x-mouse_size2, cursor_y-mouse_size2,
                    mouse_buf, _GXOR );
    } void mouse_end(void)
    {
            _putimage( cursor_x-mouse_size2, cursor_y-mouse_size2,
                    mouse_buf, _GXOR );
    }
#include <stdio.h>
include <stdlib.h>
#include <math.h>

/*****************************************************************/
/* subsample() - this subroutine subsamples an image             */
/*****************************************************************/
void subsample(int **image, int ncols, int nrows,
        int new_ncols, int new_nrows, int **imageout)
{
```

```c
   int col,row;
   int co, ro;
   float col_step, row_step,c,r;

col_step = (float) ncols / new_ncols;
   row_step = (float) nrows / new_nrows;

c=0.0;
   r=0.0;
   co=0;
   ro=0;

/* copies original image into new image array by skipping pixels */
   for (row=0; row < nrows; row=ceil(r) )
   {  for(col=0; col < ncols; col=ceil(c) )
      {  c += col_step;
         imageout[co][ro]=image[col][row];
         co++;
      }
      co = 0;
      c = 0.0;
      r += row_step;
      ro++;
   } return;
} /** END: Subroutine write_sub_image() **/
```

```
0            LADAR_Pitch_Degrees
0            LADAR_Yaw_Degrees
0            LADAR_Roll_Degrees
90           Recon_Pitch_Degrees
0            Recon_Yaw_Degrees
0            Recon_Roll_Degrees0
2500         LADAR_y(up_and_down)
0            LADAR_x(left_to_right)
1700         LADAR_z(distance_away)
340          LADAR_ncols
148          LADAR_nrows
295          Recon_ncols
415          Recon_nrows
.5           Map_Visible_Overscan_Stepsize(1=none,.25=4:1)
100          Map_Artificial_Line_Fill_Replication
100          Intensity_Edge_Threshold
200          Range_Edge_Threshold
127          Crosshairs_x
90           Crosshairs_y
f21p5if.img  Intensity_Image
f21p5rf.img  Range_Image
ship1ros.img Original_Recon_Image
```

Alabama side to top down view conversion parameter data file
read in by main.

```
        SUBROUTINE PROCEDUR2(IA,IB,IC,ID,NR,NC,ISR,ISC,ISIZE,IX1,IY1,
        1IX2,IY2,INDEX)
        INTEGER*2 NR,NC
        INTEGER*2 IA(NC,NR),IB(NC,NR),IC(NC,NR),ID(NC,NR)
        INTEGER*2 IX1(1),IY1(1),IX2(1),IY2(1),INDEX
C       PERFORM GRADIENT OPERATION ON IMAGE
        CALL EDGGRAD(IA,IB,ID,NR,NC)
        CALL IMGTGR(IB,ISR-NR-10,ISC,NR,NC,ISIZE)
C       CALL DOCUMENT(IB,NR,NC)
C       DELETE SMALL VALUES
        CALL LEVCHG(IB,IA,NR,NC,ISR-NR-10,ISC,ISIZE)
        CALL IMGTXF(IA,IB,NR,NC)
C       CLUSTER THE LINES FROM THE GRADIENT IMAGE
        CALL LNCLSTR1(IB,ID,IA,IC,NR,NC,256)
        CALL IMGTGR(IA,ISR-NR-10,ISC+NC+10,NR,NC,ISIZE)
C       CALL DOCUMENT(IA,NR,NC)
C       TRANSFORM CLUSTERED IMAGE INTO A BINARY IMAGE
        CALL B"NIT(IA,IB,NR,NC,ISR-NR-10,ISC+2*NC+20,ISIZE)
C       IMPLEMENT THINFILL ALGORITHM
        CALL IMGTXF(IB,IA,NR,NC)
1       CALL THINFILL(IB,ID,NR,NC)
        CALL IMGTGR(ID,ISR-2*NR-20,ISC,NR,NC,ISIZE)
```

```
C       CALL DOCUMENT(ID,NR,NC)
        CALL IMGTXF(ID,IB,NR,NC)
        TYPE*,'ENTER 1 TO THINFILL AGAIN'
        ACCEPT*,IGO
        IF(IGO.EQ.1)GO TO 1
C       IMPLEMENT THIN ALGORITHM
2       CALL THINLN(ID,IA,NR,NC)
        CALL IMGTGR(IA,ISR-2*NR-20,ISC,NR,NC,ISIZE)
C       CALL DOCUMENT(IA,NR,NC)
        CALL IMGTXF(IA,ID,NR,NC)
        TYPE*,'ENTER 1 TO THIN AGAIN'
        ACCEPT*,IGO
        IF(IGO.EQ.1)GO TO 2
C       PERFORM MERGE-SLIT ALGORITHM
        CALL IMGTXF(ID,IB,NR,NC)
3       CALL MERGESLIT(ID,IA,NR,NC,IX1,IY1,IX2,IY2,INDEX)
        CALL IMGTGR(IA,ISR-2*NR-20,ISC+2*NC+20,NR,NC,ISIZE)
C       CALL DOCUMENT(IA,NR,NC)
        TYPE*,'ENTER 1 TO WRITE DATA TO LU 9'
        ACCEPT*,IGO
        IF(IGO.NE.1)GO TO 11
        WRITE(9)INDEX
        DO 12 I=1,INDEX
        WRITE(9)IX1(I),IY1(I),IX2(I),IY2(I)
12      CONTINUE
11      CALL IMGTXF(IB,ID,NR,NC)
        TYPE*,'ENTER 1 TO MERGESLIT AGAIN'
        ACCEPT*,IGO
        IF(IGO.EQ.1)GO TO 3
        RETURN
        END

SUBROUTINE EDGGRAD(IA,IB,IC,NR,NC)
C*****************************************************************
C
C       FUNCTION:
C       THIS SUBROUTINE APPLIES FOUR GRADIENT MASKS TO AN INPUT ARRAY
C       AND THE LARGEST MAGNITUDE OF THE FOUR MASKS APPLIED TO A
C       PARTICULAR ARRAY ELEMENT IS TAKEN AS THE GRADIENT AT THAT POINT
C       IN THE INPUT ARRAY (OR IMAGE).  THE DIRECTION OF THE GRADIENT
C       IS DETERMINED BY THE PARTICULAR MASK THAT YIELDS THE LARGEST
C       MAGNITUDE AND BY THE SIGN OF THE APPLIED MASK.  THERE ARE A
C       TOTAL OF 8 DIRECTIONS 45 DEGREES APART.
C
C*****************************************************************
C
C       ARGUMENTS:
C
C       (INPUT)
C       IA    -   INTEGER*2.  INPUT ARRAY TO BE OPERATED ON.
C       NR    -   INTEGER*2.  NO. OF ROWS IN THE IMAGE ARRAY.
C       NC    -   INTEGER*2.  NO. OF COLS IN THE IMAGE ARRAY.
C
C       (OUTPUT)
C       IB    -   INTEGER*2.  OUTPUT GRADIENT MAGNITUDE MATRIX.
C       IC    -   INTEGER*2.  OUTPUT GRADIENT DIRECTION MATRIX.
C
C*****************************************************************
C
C       NOTES:
C       THE GRADIENT MASKS ARE AS FOLLOWS.
C
C       -2 -1  0  1  2          0  1  2  2  2
C       -2 -1  0  1  2         -1  0  1  1  2
C       -2 -1  0  1  2         -2 -1  0  1  2
C       -2 -1  0  1  2         -2 -1 -1  0  1
C       -2 -1  0  1  2         -2 -2 -2 -1  0
C
C       (0 DEG)                (45 DEG)
C
C
C        2  2  2  2  2          2  2  2  1  0
```

```
C      1  1  1  1  1           2  1  1  0 -1
C      0  0  0  0  0           2  1  0 -1 -2
C     -1 -1 -1 -1 -1           1  0 -1 -1 -2
C     -2 -2 -2 -2 -2           0 -1 -2 -2 -2
C
C      (90 DEG)                (135 DEG)
C
C      IF THE SIGN OF THE APPLIED MASK IS NEGATIVE THEN THE
C      DIRECTION IS THE CORRESPONDING DIRECTION PLUS 180 DEGREES.
C
C*******************************************************************
C
C      CREATION DATE:     28 FEBRUARY 1983
C
C*******************************************************************
C
C      MODIFICATION HISTORY:
C
C*******************************************************************
       INTEGER*2 NR,NC
       INTEGER*2 IA(NC,NR),IB(NC,NR),IC(NC,NR)
       INTEGER*2 ID(4),K,M,N
       N=0
C      INITIALIZE OUTPUT MATRICES TO 0
       DO 3 I=1,NR
       DO 3 J=1,NC
       IB(J,I)=0
3      IC(J,I)=0
C      APPLY GRADIENT MASKS TO IMAGE
       DO 1 I=3,NR-2
       DO 1 J=3,NC-2
       ID(1)=-2*(IA(J-2,I-2)+IA(J-2,I-1)+IA(J-2,I)+IA(J-2,I+1)+
      1IA(J-2,I+2))-1*(IA(J-1,I-2)+IA(J-1,I-1)+IA(J-1,I)+IA(J-1,I+1)+
      2IA(J-1,I+2))+IA(J+1,I-2)+IA(J+1,I-1)+IA(J+1,I)+IA(J+1,I+1)+
      3IA(J+1,I+2)+2*(IA(J+2,I-2)+IA(J+2,I-1)+IA(J+2,I)+IA(J+2,I+1)+
      4IA(J+2,I+2))
       ID(2)=-2*(IA(J-2,I)+IA(J-2,I+1)+IA(J-2,I+2)+IA(J-1,I+2)+
      1IA(J,I+2))-1*(IA(J-2,I-1)+IA(J-1,I)+IA(J-1,I+1)+IA(J,I+1)+
      2IA(J+1,I+2))+IA(J-1,I-2)+IA(J,I-1)+IA(J+1,I-1)+IA(J+1,I)+
      3IA(J+2,I+1)+2*(IA(J,I-2)+IA(J+1,I-2)+IA(J+2,I-2)+IA(J+2,I-1)+
      4IA(J+2,I))
       ID(3)=2*(IA(J-2,I-2)+IA(J-1,I-2)+IA(J,I-2)+IA(J+1,I-2)+
      1IA(J+2,I-2))+IA(J-2,I-1)+IA(J-1,I-1)+IA(J,I-1)+IA(J+1,I-1)+
      2IA(J+2,I-1)-(IA(J-2,I+1)+IA(J-1,I+1)+IA(J,I+1)+IA(J+1,I+1)+
      3IA(J+2,I+1))-(IA(J-1,I+2)+IA(J-1,I+2)+IA(J,I+2)+IA(J+1,I+2)+
      4IA(J+2,I+2))*2
       ID(4)=2*(IA(J-2,I)+IA(J-2,I-1)+IA(J-2,I-2)+IA(J-1,I-2)+
      1IA(J,I-2))+IA(J-2,I+1)+IA(J-1,I)+IA(J-1,I-1)+IA(J,I-1)+
      2IA(J+1,I-2)-(IA(J-1,I+2)+IA(J,I+1)+IA(J+1,I+1)+IA(J+1,I))+
      3IA(J+2,I-1))-(IA(J,I+2)+IA(J+1,I+2)+IA(J+2,I+2)+IA(J+2,I+1)+
      4IA(J+2,I))*2
       M=IIABS(ID(1))
       K=1
C      DETERMINE THE LARGEST GRADIENT FROM ABOVE MASKS
       DO 2 L=2,4
       IF(M.LT.IIABS(ID(L)))THEN
       K=L
       M=IIABS(ID(L))
       ENDIF
2      CONTINUE
       IB(J,I)=M
C      N WILL BE EQUAL TO THE LARGEST MAGNITUDE IN IB
       IF(M.GT.N)N=M
C      DETERMINE DIRECTION OF GRADIENT (RANGE IS 0 - 7)
       IC(J,I)=K-1+(IISIGN(1,ID(K))-1)*(-2)
1      CONTINUE
C      RESCALE IB MATRIX TO A MAX OF 255
       S=255./N
       DO 4 I=2,NR-1
       DO 4 J=2,NC-1
4      IB(J,I)=IB(J,I)*S
       RETURN
       END
```

```
      SUBROUTINE LEVCHG(IA,IB,NR,NC,ISR,ISC,ISIZE)
C*****************************************************************
C
C     FUNCTION:
C     THIS PROGRAM SETS ALL VALUES BELOW A THRESHOLD TO ZERO IN
C     AN INPUT IMAGE.
C
C*****************************************************************
C
C     ARGUMENTS:
C
C     INPUTS:
C     IA   - INT*2. INPUT IMAGE.
C     NR   - INT*2. NO. OF ROWS IN IMAGE.
C     NC   - INT*2. NO. OF COLS IN IMAGE.
C     ISR  - STARTING ROW TO DISPLAY IMAGE ON RAMTEK
C     ISC  - STARTING COL TO DISPLAY IMAGE ON RAMTEK
C     ISIZE- ZOOM FACTOR FOR IMGTGR
C
C     OUTPUTS:
C     IB   - INT*2. OUTPUT IMAGE.
C
C*****************************************************************
C
C     CREATION DATE:      18 MAY 1983
C
C*****************************************************************
C
C     MODIFICATION HISTORY:
C
C*****************************************************************
      INTEGER*2 NR,NC
      INTEGER*2 IA(NC,NR),IB(NC,NR)
    2 TYPE*,'ENTER THRESHOLD FOR LEVCHG '
      ACCEPT*,ITHRSH
      DO 1 I=1,NR
      DO 1 J=1,NC
      IB(J,I) = IA(J,I)
      IF (IB(J,I).LE.ITHRSH) IB(J,I) = 0
    1 CONTINUE
      CALL IMGTGR (IB,ISR,ISC,NR,NC,ISIZE)
C     CALL DOCUMENT(IB,NR,NC)
      TYPE*,'ENTER "1" TO CHANGE THRESHOLD'
      ACCEPT*,IGO
      IF (IGO.EQ.1) GO TO 2
      RETURN
      END

SUBROUTINE LNCLSTR1(IB,IC,ID,IE,NR,NC,IAMB)
C*****************************************************************
C
C     THIS PROGRAM CLUSTERS FUZZY EDGES FROM A GRADIENT MAGNITUDE
C     MASK AND A GRADIENT DIRECTION MASK.
C
C*****************************************************************
C.
C     ARGUMENTS:
C
C     INPUTS:
C     IB   - INT*2. GRADIENT MAGNITUDE MASK
C     IC   - INT*2. GRADIENT DIRECTION MASK
C     NR   - INT*2. NO. OF ROWS
C     NC   - INT*2. NO. OF COLS
C     IE   - INT*2. WORKING MATRIX
C     IAMB - AMBIGUITY LEVEL = 255
C
C     OUTPUTS:
C     ID   - INT*2. CLUSTERED IMAGE
C
C*****************************************************************
C
C     CREATION DATE:      18 MAY 1983
```

```
C
C*****************************************************************
C
C       MODIFICATION HISTORY:
C
C*****************************************************************
C
        INTEGER*2 NR,NC
        INTEGER*2 IB(NC,NR),IC(NC,NR)
        INTEGER*2 ID(NC,NR),IE(NC,NR)
        INTEGER*2 IDIR,MAX,M,ISUM,A(3),LONG,LAT
        INTEGER*2 MAXX,MAXY,MINX,MINY,MAXXL,MAXYL,MINXL,MINYL
C
C       INITIALIZE OUTPUT MATRIX IE TO 1 ON THE INTERIOR AND 0 AROUND
C       THE BORDER AND THE OUTPUT MATRIX ID TO 0 AROUND THE BORDER
C
        IMAX = 0
C
        DO 20 I = 1,NR
          DO 10 J = 1,NC
            IF (I .LT. 3 .OR. I .GT. NR-2 .OR.
     1          J .LT. 3 .OR. J .GT. NC-2) THEN
              ID(J,I) = 0
              IE(J,I) = 0
            ELSE
              IE(J,I) = 1
            ENDIF
  10      CONTINUE
  20    CONTINUE
C
C       THE ACTUAL GRADIENT IMAGE RANGES FROM (3,3) TO (NR-2,NC-2)
        DO 1 I=3,NR-2
        DO 2 J=3,NC-2
C
C       IF IE(J,I) IS EQUAL TO 0, THEN THE GRADIENT IMAGE IS NOT
C       OPERATED ON AT THIS POINT
C
        IF(IE(J,I).EQ.0)GO TO 2
C       DETERMINE THE DIRECTION STEPS, SUCH AS, LONG=1, LAT=1 FOR 45 DEG.
        IDIR=IC(J,I)
        DO 3 M=1,3
        A(M)=IDIR.AND.'0001'X
   3    IDIR=IDIR/2
        LONG=.NOT.A(2).AND.'0001'X.OR.A(1)
        IF(A(3).XOR.A(2).EQ.1)LONG=-LONG
        LAT=A(2).OR.A(1)
        IF(A(3).EQ.0)LAT=-LAT
        MINX=J
        MINY=I
        MAXX=J
        MAXY=I
C       TRAVERSE IC MATRIX IN THE DIRECTION OF IC(J,I) AND DETERMINE THE
C       COORDINATES (MAXX,MAXY) WHERE IC CHANGES DIRECTION
        DO 5 M=1,NC+NR
        MAXXL=MAXX+LONG
        MAXYL=MAXY+LAT
        IF(IE(MAXXL,MAXYL).EQ.0.OR.IC(MAXXL,MAXYL).NE.IC(J,I))GO TO 6
        MAXX=MAXXL
        MAXY=MAXYL
   5    CONTINUE
C       TRAVERSE IC MATRIX IN THE DIRECTION OF IC(J,I)+180 DEG. AND
C       DETERMINE THE COORDINATES (MINX,MINY) WHERE IC CHANGES DIRECTION
   6    DO 7 M=1,NC+NR
        MINXL=MINX-LONG
        MINYL=MINY-LAT
        IF(IE(MINXL,MINYL).EQ.0.OR.IC(MINXL,MINYL).NE.IC(J,I))GO TO 8
        MINX=MINXL
   7    MINY=MINYL
   8    M=IMAX0(IIABS(MAXX-MINX),IIABS(MAXY-MINY))+1
        ISUM=0
        MAXX=MINX
        MAXY=MINY
```

```
              MAX=IB(MINX,MINY)
C       COMPUTE THE CLUSTERED LINE GRADIENT BETWEEN (MAXX,MAXY) AND
C       (MINX,MINY) BY SUMMING UP THE MAGNITUDES BETWEEN THESE TWO
C       POINTS ON THE IB MATRIX AND PLACING THE RESULT IN THE ID
C       MATRIX AT THE COORDINATE THAT HAD THE GREADTEST MAGNITUDE IN
C       THE IB MATRIX.  SET ALL OTHER POINTS EQUAL TO 0 BETWEEN THE
C       COORDINATES (MAXX,MAXY) AND (MINX,MINY) IN THE ID MATRIX.
              DO 9 L=1,M
              ID(MINX,MINY)=0
              IE(MINX,MINY)=0
              ISUM=IB(MINX,MINY)+ISUM
              IF(IB(MINX,MINY).GT.MAX)THEN
              MAX=IB(MINX,MINY)
              MAXX=MINX
              MAXY=MINY
              ENDIF
              MINX=MINX+LONG
              MINY=MINY+LAT
9             CONTINUE
              ITEMP = ISUM/(M*1.0)
              ID(MAXX,MAXY)=ITEMP
              IF (ITEMP .GT. IMAX) THEN
                 IMAX = ITEMP
              ENDIF
2             CONTINUE
1             CONTINUE
C
              SCALE = IMAX/(IAMB-1.0)
              TYPE*,'LINE CLUSTER SCALE :',SCALE
C
              DO 40 I = 3,NR-2
                DO 30 J = 3,NC-2
                  ID(J,I) = ID(J,I)/SCALE
30            CONTINUE
40         CONTINUE
C
              RETURN
              END

SUBROUTINE BINIT(IA,IB,NR,NC,ISR,ISC,ISIZE)
C*******************************************************************
C
C       FUNCTION:
C       THIS SUBROUTINE CREATES A BINARY IMAGE FROM AN INPUT IMAGE.
C       THE USER SPECIFIES A VALUE K SUCH THAT PELS ABOVE U+K*S ARE
C       SET TO 255; OTHERWISE THE PEL IS ASSIGNED A VALUE OF ZERO.
C       U IS THE COMPUTED MEAN AND S IS THE STANDARD DEVIATION OF THE
C       INPUT IMAGE.
C
C*******************************************************************
C
C       ARGUMENTS:
C       (INPUTS)
C       IA    -   INT*2.  THE INPUT IMAGE.
C       NR    -   INT*2.  NO. OF ROWS IN IA.
C       NC    -   INT*2.  NO. OF COLS IN IA.
C       ISR   -   STARTING ROW OF DISPLAYED OUTPUT.
C       ISC   -   STARTING COL OF DISPLAYED OUTPUT.
C       ISIZE-    SCALE FACTOR FOR IMGTGR.
C
C       (OUTPUTS)
C       IB    -   INT*2.  THE COMPUTED BINARY IMAGE.
C
C*******************************************************************
C
C       NOTES:
C       COMPUTES MEAN AND STD DEV ON NON-ZERO PIXELS
C
C*******************************************************************
C
C       CREATION DATE:         8 MARCH 1983
C
C*******************************************************************
```

```
C
C       MODIFICATION HISTORY:
C
C***********************************************************************
        INTEGER*2 NR,NC
        INTEGER*2 IA(NC,NR),IB(NC,NR)
        INTEGER*2 L
        S=0
        U=0
        L=0
C       COMPUTE THE MEAN
        DO 1 I=1,NR
        DO 1 J=1,NC
        IF(IA(J,I).GT.0)THEN
        U=U+IA(J,I)
        L=L+1
        ENDIF
1       CONTINUE
        U=U/L
C       COMPUTE THE STD DEVIATION
        DO 2 I=1,NR
        DO 2 J=1,NC
        IF(IA(J,I).GT.0)S=(IA(J,I)-U)**2+S
2       CONTINUE
        L=L-1
        S=S/L
        S=SQRT(S)
15      TYPE*,'MEAN, STD DEV - ',U,S
        TYPE*,'ENTER X FOR U+XS'
        ACCEPT*,X
        N=U+X*S
C       COMPUTE BINARY IMAGE
        DO 3 I=1,NR
        DO 3 J=1,NC
        IF(IA(J,I).GE.N)THEN
        IB(J,I)=255
        ELSE
        IB(J,I)=0
        ENDIF
3       CONTINUE
        CALL IMGTGR(IB,ISR,ISC,NR,NC,ISIZE)
C       CALL DOCUMENT(IB,NR,NC)
        TYPE*,'ENTER 1 TO CHANGE BINARY IMAGE THRESHOLD'
        ACCEPT*,IGO
        IF(IGO.EQ.1)GO TO 15
        RETURN
        END

C***********************************************************************
C
C       FUNCTION:
C       THIS SUBROUTINE IS DESIGNED TO IMPLEMENT AN IMAGE THINFILLING
C       PROCESS ON A BINARY IMAGE.
C
C***********************************************************************
C
C       ARGUMENTS:
C
C       (INPUTS)
C       IA    -   INT*2. INPUT IMAGE MATRIX
C       NR    -   INT*2. NO. OF ROWS IN THE IMAGE MATRIX
C       NC    -   INT*2. NO. OF COLS IN THE IMAGE MATRIX
C
C       (OUTPUTS)
C       IB    -   INT*2. THINFILLED OUTPUT IMAGE
C
C***********************************************************************
C
C       NOTES:
C       NONE
C
C***********************************************************************
```

```
C
C      CREATION DATE:       14 MARCH 1983
C
C*********************************************************************
C
C      MODIFICATION HISTORY:
C
C*********************************************************************
       SUBROUTINE THINFILL(IA,IB,NR,NC)
       INTEGER*2 NR,NC
       INTEGER*2 IA(NC,NR),IB(NC,NR)
       INTEGER*2 IC(50),Z
       LOGICAL A,B,C,D,E,F,G,H
       DATA IC/0,7,11,22,41,59,62,79,87,91,93,94,95,
      1104,110,115,117,118,119,121,122,123,124,125,
      2224,148,208,220,232,158,242,211,203,155,217,218,
      3206,186,205,174,179,119,221,238,187,207,190,243,222,250/
       DO 2 I=1,NR
       DO 2 J=1,NC
2      IB(J,I)=0
       DO 1 I=2,NR-1
       DO 1 J=2,NC-1
       IB(J,I)=IA(J,I)
       A=IA(J-1,I-1).AND.1
       B=IA(J,I-1).AND.1
       C=IA(J+1,I-1).AND.1
       D=IA(J-1,I).AND.1
       E=IA(J+1,I).AND.1
       F=IA(J-1,I+1).AND.1
       G=IA(J,I+1).AND.1
       H=IA(J+1,I+1).AND.1
       Z=((((((((((A*2)+B)*2)+C)*2)+D)*2)+E)*2)+F)*2)+G)*2+H
       DO 3 K=1,50
       IF(Z.EQ.IC(K))THEN
       IB(J,I)=0
       MM=A+B+C+D+E+F+G+H
       IF(MM.GT.4)IB(J,I)=255
       GO TO 1
       ENDIF
3      CONTINUE
1      CONTINUE
       RETURN
       END

C*********************************************************************
C
C      FUNCTION:
C      THIS SUBROUTINE IS DESIGNED TO IMPLEMENT AN IMAGE THINNING
C      PROCESS ON A BINARY IMAGE.
C
C*********************************************************************
C
C      ARGUMENTS:
C
C      (INPUTS)
C      IA    -   INT*2. INPUT IMAGE MATRIX
C      NR    -   INT*2. NO. OF ROWS IN THE IMAGE MATRIX
C      NC    -   INT*2. NO. OF COLS IN THE IMAGE MATRIX
C
C      (OUTPUTS)
C      IB    -   INT*2. THINNED OUTPUT IMAGE
C
C*********************************************************************
C
C      NOTES:
C      NONE
C
C*********************************************************************
C
C      CREATION DATE:       8 MARCH 1983
C
C*********************************************************************
```

```
C
C       MODIFICATION HISTORY:
C
C***********************************************************************
        SUBROUTINE THINLN(IA,IB,NR,NC)
        INTEGER*2 NR,NC
        INTEGER*2 IA(NC,NR),IB(NC,NR)
        INTEGER*2 IC(12),Z1,Z2,Z3,Z4
        LOGICAL A,B,C,D,E,F,G,H
        DATA IC/0,7,11,15,22,23,31,43,47,150,151,191/
        DO 2 I=1,NR
        DO 2 J=1,NC
2       IB(J,I)=0
        DO 1 I=2,NR-1
        DO 1 J=2,NC-1
        IB(J,I)=IA(J,I)
        A=IA(J-1,I-1).AND.1
        B=IA(J,I-1).AND.1
        C=IA(J+1,I-1).AND.1
        D=IA(J-1,I).AND.1
        E=IA(J+1,I).AND.1
        F=IA(J-1,I+1).AND.1
        G=IA(J,I+1).AND.1
        H=IA(J+1,I+1).AND.1
        Z1=((((((((((A*2)+B)*2)+C)*2)+D)*2)+E)*2)+F)*2)+G)*2+H
        Z2=((((((((((H*2)+G)*2)+F)*2)+E)*2)+D)*2)+C)*2)+B)*2+A
        Z3=((((((((((C*2)+E)*2)+H)*2)+B)*2)+G)*2)+A)*2)+D)*2+F
        Z4=((((((((((F*2)+D)*2)+A)*2)+G)*2)+B)*2)+H)*2)+E)*2+C
        DO 1 K=1,12
        IF(Z1.EQ.IC(K).OR.Z2.EQ.IC(K).OR.Z3.EQ.IC(K).OR.Z4.EQ.IC(K))
       1IB(J,I)=0
1       CONTINUE
        RETURN
        END

SUBROUTINE MERGESLIT(IA,IB,NR,NC,IX1,IY1,IX2,IY2,INDEX)
C***********************************************************************
C
C       FUNCTION:
C       THIS SUBROUTINE IMPLEMENTS THE MERGE-SLIT ALGORITHM
C
C***********************************************************************
C
C       ARGUMENTS:
C
C       (INPUTS)
C       IA    -   INT*2.  THE INPUT BINARY IMAGE ARRAY.
C       NR    -   INT*2.  NO. OR ROWS IN IA.
C       NC    -   INT*2.  NO. OF COLS IN IA.
C
C       (OUTPUTS)
C       IB    -   INT*2.  THE OUTPUT BINARY IMAGE ARRAY.
C
C***********************************************************************
C
C       NOTES:
C       NONE
C
C***********************************************************************
C
C       CREATION DATE:      MARCH 28,1983
C
C***********************************************************************
C
C       MODIFICATION HISTORY:
C
C***********************************************************************
        INTEGER*2 NR,NC
        INTEGER*2 IA(NC,NR),IB(NC,NR)
        INTEGER*2 ISP(16,9,9),IX1(1),IX2(1),IY1(1),IY2(1)
        INTEGER*2 X1,X2,Y1,Y2,X,Y,INDEX
        INDEX=0
```

```
C       DEFINE THE POSSIBLE LINE SEGMENTS
        CALL GENSLT(ISP,9,16)
        TYPE*,'ENTER SLIT VALUE THRESHOLD'
C       ITHRSH HAS A VALUE BETWEEN 0 AND 9
        ACCEPT*,ITHRSH
        ITHRSH=ITHRSH*255
C       ITHRSH=ITHRSH*9
C       TWO LINES WILL MERGE IF THEIR ENDPOINTS ARE WITHIN THRSH DISTANCE
C       OF THE OTHER LINE
        TYPE*,'ENTER MERGE DISTANCE THRESHOLD'
        ACCEPT*,THRSH
        TYPE*,'ENTER MAXIMUM DISTANCE FOR A MERGE'
        ACCEPT*,DIST
C       OPERATE ON EVERY THIRD PIXEL
        DO 1 I=5,NR-5,1
        DO 1 J=5,NC-5,1
        ISUM1=0
        ISUM3=0
        DO 2 K=1,16
C       USE ONLY 8 LINES DEFINED IN ISP ARRAY
C       IF(K.EQ.2.OR.K.EQ.3.OR.K.EQ.6.OR.K.EQ.7.OR.K.EQ.11.OR.K.EQ.12
C      1.OR.K.EQ.15.OR.K.EQ.16)GO TO 2
        ISUM=0
C       ISUM2=0
        DO 3 L=1,9
        DO 3 M=1,9
        IF(ISP(K,M,L).NE.0)THEN
                IF(M.EQ.1.OR.L.EQ.1)THEN
                        X=M
                        Y=L
                ENDIF
C       IF K.LE.8 THEN LOGICALLY .OR. ABOVE AND BELOW PIXEL TO GET
C       ACTUAL PIXEL VALUE FOR DETERMINING LINE REQUIREMENTS, ELSE
C       LOGICALLY .OR. PIXELS TO LEFT AND RIGHT OF LINE PIXEL.
C               IF(K.LE.8)THEN
C                       ISUM=(IA(J-5+M,I-4+L).OR.2*IA(J-5+M,I-5+L).OR.
C      1                 IA(J-5+M,I-6+L))+ISUM
C                       ISUM2=(IA(J-5+M,I-4+L).OR.IA(J-5+M,I-5+L).OR.
C      1                 IA(J-5+M,I-6+L))+ISUM2
C               ELSE
C                       ISUM=(IA(J-4+M,I-5+L).OR.2*IA(J-5+M,I-5+L).OR.
C      1                 IA(J-6+M,I-5+L))+ISUM
C                       ISUM2=(IA(J-4+M,I-5+L).OR.IA(J-5+M,I-5+L).OR.
C      1                 IA(J-6+M,I-5+L))+ISUM2
C               ENDIF
                ISUM=IA(J-5+M,I-5+L)+ISUM
C               IF(ISUM.NE.0)TYPE*,'ISUM',ISUM
        ENDIF
3       CONTINUE
C       IF ISUM MEETS THRESHOLD REQUIREMENT THEN X1,Y1,X2,Y2 ARE LINE
C       SEGMENT ENDPOINTS
        IF(ISUM.GT.ISUM1.AND.ISUM.GE.ITHRSH)THEN
                ISUM1=ISUM
                ISUM3=ISUM
                X1=J-5+X
                X2=J+5-X
                Y1=I-5+Y
                Y2=I+5-Y
        ENDIF
2       CONTINUE
C       CALL MERGE TO MERGE NEW LINE SEGEMENT WITH ALREADY EXISTING
C       LINE SEGMENTS DEFINED BY IX1,IY1,IX2,IY2.  TWO LINES MERGE
C       IF THEIR ENDPOINT DISTANCES ARE WITHIN THRSH OF THE OTHER LINE.
C       TYPE*,'ISUM3,ITHRSH',ISUM3,ITHRSH
        IF(ISUM3.GE.ITHRSH)
       1CALL MERGE(X1,Y1,X2,Y2,INDEX,IX1,IY1,IX2,IY2,THRSH,DIST)
1       CONTINUE
C       USE LINE ENDPOINTS TO COMPUTE ACTUAL LINES AND STORE IN IB
        CALL VLINE1(IX1,IY1,IX2,IY2,INDEX,IB,NR,NC)
        CALL IMGTGR(IB,191,160,NR,NC,0)
C       CALL DOCUMENT(IB,NR,NC)
```

```
        TYPE*,'ENTER 1 FOR FINAL EDITING'
        ACCEPT*,IGO
        IF(IGO.NE.1)RETURN
        CALL REMERGE(IX1,IY1,IX2,IY2,INDEX,THRSH,DIST)
        CALL VLINE1(IX1,IY1,IX2,IY2,INDEX,IB,NR,NC)
        RETURN
        END
C
        SUBROUTINE MERGE(X1,Y1,X2,Y2,INDEX,IX1,IY1,IX2,IY2,THRSH,DIST)
        INTEGER*2 X1,Y1,X2,Y2,INDEX,IX1(1),IY1(1),IX2(1),IY2(1)
        REAL*4 S(6),S7
        DX1=X2-X1
        DY1=Y2-Y1
        S(1)=SQRT(DX12+DY12)
        IF(INDEX.EQ.0)GO TO 9
        DO 7 I=1,INDEX
        DX2=IX2(I)-IX1(I)
        DY2=IY2(I)-IY1(I)
        S(2)=SQRT(DX22+DY22)
19      SX1=X2-IX2(I)
        SY1=Y2-IY2(I)
        SS1=ABS(SX1*DY2-SY1*DX2)/S(2)
        SS2=ABS(SX1*DY1-SY1*DX1)/S(1)
        SX2=X1-IX1(I)
        SY2=Y1-IY1(I)
        SS3=ABS(SX2*DY1-SY2*DX1)/S(1)
        SS4=ABS(SX2*DY2-SY2*DX2)/S(2)
        SS=MAX(SS1,SS2,SS3,SS4)
        IF(SS.GT.THRSH)GO TO 7
        S(3)=SQRT(SX12+SY12)
        S(4)=SQRT(SX22+SY22)
        S(5)=SQRT(FLOAT((X2-IX1(I))2+(Y2-IY1(I))2))
        S(6)=SQRT(FLOAT((X1-IX2(I))2+(Y1-IY2(I))2))
        S7=AMIN1(S(3),S(4),S(5),S(6))
        IF(S7.GT.DIST)GO TO 9
        S7=S(1)
        M=1
        S7=S(1)
        DO 8 J=2,6
        IF(S(J).GT.S7)THEN
                S7=S(J)
                M=J
        ENDIF
8       CONTINUE
        GO TO (1,2,3,4,5,6)M
        TYPE*,'ERROR IN MERGE COMPARISON'
        STOP
1       IX1(I)=X1
        IY1(I)=Y1
        IX2(I)=X2
        IY2(I)=Y2
2       RETURN
3       IX1(I)=X2
        IY1(I)=Y2
        RETURN
4       IX2(I)=X1
        IY2(I)=Y1
        RETURN
5       IX2(I)=X2
        IY2(I)=Y2
        RETURN
6       IX1(I)=X1
        IY1(I)=Y1
        RETURN
7       CONTINUE
9       INDEX=INDEX+1
        IX1(INDEX)=X1
        IY1(INDEX)=Y1
        IX2(INDEX)=X2
        IY2(INDEX)=Y2
        RETURN
        END
```

```
C
      SUBROUTINE REMERGE(IX1,IY1,IX2,IY2,INDEX,THRSH,DIST)
      INTEGER*2 X1,Y1,X2,Y2,INDEX,IX1(1),IY1(1),IX2(1),IY2(1)
      REAL*4 S(6),S7
      TYPE*,'ENTER MAXIMUM MERGE DISTANCE'
      ACCEPT*,DMAX
      TYPE*,'ENTER SHORTEST LINE THRESHOLD'
      ACCEPT*,DMIN
      INDEX1=INDEX
11    INDEX=INDEX1
      DO 12 J=1,INDEX
      X1=IX1(J)
      Y1=IY1(J)
      X2=IX2(J)
      Y2=IY2(J)
      DO 7 I=1,INDEX
      IF(I.EQ.J)GO TO 7
      DX1=X2-X1
      DY1=Y2-Y1
      S(1)=SQRT(DX12+DY12)
      DX2=IX2(I)-IX1(I)
      DY2=IY2(I)-IY1(I)
      S(2)=SQRT(DX22+DY22)
19    SX1=X2-IX2(I)
      SY1=Y2-IY2(I)
      SS1=ABS(SX1*DY2-SY1*DX2)/S(2)
      SS2=ABS(SX1*DY1-SY1*DX1)/S(1)
      SX2=X1-IX1(I)
      SY2=Y1-IY1(I)
      SS3=ABS(SX2*DY1-SY2*DX1)/S(1)
      SS4=ABS(SX2*DY2-SY2*DX2)/S(2)
      SS=MAX(SS1,SS2,SS3,SS4)
      IF(SS.GT.THRSH)GO TO 7
      S(3)=SQRT(SX12+SY12)
      S(4)=SQRT(SX22+SY22)
      S(5)=SQRT(FLOAT((X2-IX1(I))2+(Y2-IY1(I))2))
      S(6)=SQRT(FLOAT((X1-IX2(I))2+(Y1-IY2(I))2))
      S7=AMIN1(S(3),S(4),S(5),S(6))
      IF(S7.GT.DIST)GO TO 7
      S7=S(1)
      M=1
      S7=S(1)
      DO 8 JJ=2,6
      IF(S(JJ).GT.S7)THEN
            S7=S(JJ)
            M=JJ
      ENDIF
8     CONTINUE
      GO TO (1,2,3,4,5,6)M
      TYPE*,'ERROR IN MERGE COMPARISON'
      STOP
1     IX1(I)=X1
      IY1(I)=Y1
      IX2(I)=X2
      IY2(I)=Y2
2     GO TO 9
3     IX1(I)=X2
      IY1(I)=Y2
      GO TO 9
4     IX2(I)=X1
      IY2(I)=Y1
      GO TO 9
5     IX2(I)=X2
      IY2(I)=Y2
      GO TO 9
6     IX1(I)=X1
      IY1(I)=Y1
      GO TO 9
9     INDEX1=INDEX-1
      DO 10 M=J,INDEX1
      IX1(M)=IX1(M+1)
      IY1(M)=IY1(M+1)
```

```
            IX2(M)=IX2(M+1)
10          IY2(M)=IY2(M+1)
            GO TO 11
7      CONTINUE
12     CONTINUE
            THRSH=THRSH+1
            IF(THRSH.LE.DMAX)GO TO 11
            DO 15 I=1,INDEX
18          IF(I.GT.INDEX1)GO TO 14
            D=(IX2(I)-IX1(I))**2+(IY2(I)-IY1(I))**2
            IF(SQRT(D).GT.DMIN)GO TO 15
            INDEX1=INDEX1-1
            DO 17 J=I,INDEX1
            IX1(J)=IX1(J+1)
            IY1(J)=IY1(J+1)
            IX2(J)=IX2(J+1)
17          IY2(J)=IY2(J+1)
            GO TO 18
15     CONTINUE
14          INDEX=INDEX1
            RETURN
            END
C
            SUBROUTINE VLINE(IX1,IY1,IX2,IY2,INDEX,IB,NR,NC)
C*****************************************************************
C
C      THIS PROGRAM TAKES LINE ENDPOINTS (IX1,IY1) AND (IX2,IY2) AND
C      FILLS IN THE PIXELS ON THESE LINES IN OUTPUT MATRIX IB.
C
C*****************************************************************
C
C      ARGUMENTS:
C
C      INPUTS:
C      IX1,IY1,IX2,IY2 -  INPUT LINE ENDPOINTS.
C      INDEX  -  NO. OF LINES
C      NR     -  NO. OF ROWS IN IB
C      NC     -  NO. OF COLS IN IB
C
C*****************************************************************
            INTEGER*2 INDEX,NR,NC
            INTEGER*2 IX1(1),IY1(1),IX2(1),IY2(1),IB(NC+1,NR)
            DO 1 I=1,NR
            DO 1 J=1,NC
1           IB(J,I)=0
            DO 2 I=1,INDEX
            IF(IX1(I).LT.1.OR.IX1(I).GT.NC.OR.IY1(I).LT.1.OR.IY1(I).GT.NC)GOTO337
            IB(IX1(I),IY1(I))=255
337         ISIGNX=ISIGN(1,IX2(I)-IX1(I))
            ISIGNY=ISIGN(1,IY2(I)-IY1(I))
            IF(IABS(IY2(I)-IY1(I)).GT.IABS(IX2(I)-IX1(I)))GO TO 3
            NX1=0
            DELTAY=FLOAT(IY2(I)-IY1(I))/FLOAT(IX2(I)-IX1(I))
4           NX1=NX1+ISIGNX
            NY1=JNINT(IY1(I)+DELTAY*NX1)
            IF(NX1+IX1(I).GT.NC.OR.NX1+IX1(I).LT.1.OR.NY1.GT.NR.OR.NY1.LT.1)
           1GO TO 58
17          IB(NX1+IX1(I),NY1)=255
58          IF(NX1+IX1(I).EQ.IX2(I).AND.NY1.EQ.IY2(I))GO TO 2
            GO TO 4
3           NY1=0
            DELTAX=FLOAT(IX2(I)-IX1(I))/FLOAT(IY2(I)-IY1(I))
5           NY1=NY1+ISIGNY
            NX1=JNINT(IX1(I)+DELTAX*NY1)
            IF(NX1.GT.NC.OR.NX1.LT.1.OR.NY1+IY1(I).GT.NR.OR.NY1+IY1(I).LT.1)
           1GO TO 59
18          IB(NX1,NY1+IY1(I))=255
59          IF(.NOT.(NX1.EQ.IX2(I).AND.NY1+IY1(I).EQ.IY2(I)))GO TO 5
2      CONTINUE
            RETURN
            END
```

```
      SUBROUTINE GENSLT(ISP,ISLT,INSLT)
      INTEGER*2 ISLT,IDEN,IX,IY,KSLIT,INSLT
      INTEGER*2 ISP(INSLT,ISLT,ISLT)
      IDEN=(ISLT-1)/2
      KSLIT=0
      DO 4 I=1,ISLT
      DO 4 J=1,ISLT
      DO 4 K=1,INSLT
      ISP(K,J,I)=0
4     CONTINUE
      IVALUE=(ISLT+1)/2
      DO 3 IJ=1,ISLT
      ISP(KSLIT+1,IJ,IVALUE)=1
3     CONTINUE
      DO 21 K=1,IDEN
      KSLIT=KSLIT+2
      DO 2 IX=(-IVALUE+1),(IVALUE-1)
      IY=IFIX(FLOAT(K)/FLOAT(IDEN)*FLOAT(IX)+IISIGN(1,IX)*0.5)
      ISP(KSLIT,IX+IDEN+1,IY+IDEN+1)=1
      ISP(KSLIT+1,IX+IDEN+1,-IY+IDEN+1)=1
2     CONTINUE
21    CONTINUE
      DO 6 IJ=1,ISLT
      ISP(KSLIT+2,IVALUE,IJ)=1
6     CONTINUE
      DO 22 K=1,(IDEN-1)
      KSLIT=KSLIT+2
      DO 31 IY=(-IVALUE+1),(IVALUE-1)
      IX=IFIX(FLOAT(IDEN-K)/FLOAT(IDEN)*FLOAT(IY)+IISIGN(1,IY)*0.5)
      ISP(KSLIT+1,IX+IDEN+1,IY+IDEN+1)=1
      ISP(KSLIT+2,-IX+IDEN+1,IY+IDEN+1)=1
31    CONTINUE
22    CONTINUE
C     DO 111 K=1,INSLT
C     WRITE(4,9001)
C     WRITE(4,9000) ((ISP(K,I,J),I=1,ISLT),J=1,ISLT)
C 111 CONTINUE
C 9001 FORMAT(///)
C 9000 FORMAT(9(1X,I1))
      RETURN
      END

DIMENSION BNVX(50),BNVY(50),BNVC(50)
      DIMENSION BNLX1(50),BNLY1(50),BNLX2(50),BNLY2(50)
      DIMENSION RNVX(50),RNVY(50),RNVC(50)
      DIMENSION RNLX1(50),RNLY1(50),RNLX2(50),RNLY2(50)
      DIMENSION ANVX(50),ANVY(50),ANVC(50)
      DIMENSION ANLX1(50),ANLY1(50),ANLX2(50),ANLY2(50)
      DIMENSION X(50),Y(50),C(50),NR(50),T(50)
      DIMENSION RR(50,50),AA(50,50),BB(50,50)
      DIMENSION XS(50),YS(50),CS(50),NRS(50),TS(50)
      DIMENSION RRS(50,50),AAS(50,50),BBS(50,50)
      DIMENSION DLTX(700),DLTY(700),DLTHA(700),MSCOR(700)
      INTEGER*2 NL,NLX1(50),NLY1(50),NLX2(50),NLY2(50),NLR
      INTEGER*2 NV,NVX(50),NVY(50),NVC(50),NVR
C
C
      OPEN(UNIT=2,NAME='F00001.DAT',FORM='UNFORMATTED',TYPE='OLD')
      OPEN(UNIT=3,NAME='F00003.DAT',FORM='UNFORMATTED',TYPE='OLD')
      READ(3) NLR
      DO 1006 I=1,NLR
      READ(3) NLX1(I),NLY1(I),NLX2(I),NLY2(I)
1006  CONTINUE
      READ(3) NVR
      DO 1007 I=1,NVR
      READ(3) NVX(I),NVY(I),NVC(I)
1007  CONTINUE
      CLOSE(UNIT=3)
      DO 1008 I=1,NVR
      IF(NVC(I).GT.3) NVC(I)=2
1008  CONTINUE
      TYPE *,'NVR=',NVR,'    NLR=',NLR
```

```
C         DO 1010 I=1,NVR
C         WRITE(6,100) NVX(I),NVY(I),NVC(I)
C 1010 CONTINUE
C         DO 1011 I=1,NLR
C         WRITE(6,101) NLX1(I),NLY1(I),NLX2(I),NLY2(I)
C 1011 CONTINUE
C
C         CONVERT REFERENCE DATAS INTO REAL VALUES
C
          DO 1021 I=1,NVR
          BNVX(I)=FLOAT(NVX(I))
          BNVY(I)=FLOAT(NVY(I))
 1021     BNVC(I)=FLOAT(NVC(I))
          DO 1022 I=1,NLR
          BNLX1(I)=FLOAT(NLX1(I))
          BNLY1(I)=FLOAT(NLY1(I))
          BNLX2(I)=FLOAT(NLX2(I))
 1022     BNLY2(I)=FLOAT(NLY2(I))
          NROW=150
          NCOL=150
          CALL RIVGEN1(NVR,BNVX,BNVY,BNVC,NLR,BNLX1,BNLY1,BNLX2,BNLY2
         1,NROW,NCOL,X,Y,C,RR,AA,BB,NN,NR,T)
C         DO 20 I=1,NN
C         WRITE(6,150) X(I),Y(I),C(I),NR(I),T(I)
C 150  FORMAT(1H ,1X,3(2X,F7.2),2X,I3,2X,F7.2)
C         DO 20 J=1,NR(I)
C         WRITE(6,180) RR(I,J),AA(I,J),BB(I,J)
C 180  FORMAT(1X,3(F7.2,2X))
C 20   CONTINUE
          READ(2) NL
          DO 1000 I=1,NL
          READ(2) NLX1(I),NLY1(I),NLX2(I),NLY2(I)
 1000     CONTINUE
          READ(2) NV
          DO 1001 I=1,NV
          READ(2) NVX(I),NVY(I),NVC(I)
 1001     CONTINUE
          CLOSE(UNIT=2)
          DO 1005 I=1,NV
          IF(NVC(I).GT.3) NVC(I)=2
 1005     CONTINUE
          TYPE*,'NV=',NV,'      NL=',NL
          INV=NV
          INL=NL
C         DO 10 I=1,NV
C         WRITE(6,100) NVX(I),NVY(I),NVC(I)
C 100  FORMAT(1H ,1X,3(I3,2X))
C 10   CONTINUE
C         DO 11 I=1,NL
C         WRITE(6,101) NLX1(I),NLY1(I),NLX2(I),NLY2(I)
C 101  FORMAT(1H ,1X,4(I3,2X))
C 11   CONTINUE
C
C         CONVERT THE INPUT DATAS INTO THE REAL VALUES
C
  15      DO 21 I=1,NV
          ANVX(I)=FLOAT(NVX(I))
          ANVY(I)=FLOAT(NVY(I))
  21      ANVC(I)=FLOAT(NVC(I))
          DO 22 I=1,NL
          ANLX1(I)=FLOAT(NLX1(I))
          ANLY1(I)=FLOAT(NLY1(I))
          ANLX2(I)=FLOAT(NLX2(I))
  22      ANLY2(I)=FLOAT(NLY2(I))
          IXI=1
          IYI=1
          NROW=150
          NCOL=150
          TYPE *,' PARAMETERS OF THE SENSED FEATURE(150x150)'
          TYPE 200, IXI,IYI,NCOL,NROW
  200     FORMAT(1H0, 1X,'IXI=',I3,2X,'IYI=',I3,2X,'NCOL=',I3,2X,
         1'NROW=',I3)
```

```
C
C       SUBFEATURE GENDERATION
C
        TYPE *,'ENTER IXI,IYI,IXF,IYF FOR THE X-Y COORDINATES OF
        1 SUBIMAGE FEATURE'
        ACCEPT *,IXI,IYI,IXF,IYF
        XI=FLOAT(IXI)
        YI=FLOAT(IYI)
        XF=FLOAT(IXF)
        YF=FLOAT(IYF)
        L=0
        I=1
1       IF(ANVX(I).LT.XI.OR.ANVX(I).GT.XF) GO TO 5
        IF(ANVY(I).LT.YI.OR.ANVY(I).GT.YF) GO TO 5
        L=L+1
        ANVX(L)=ANVX(I)-XI+1.0
        ANVY(L)=ANVY(I)-YI+1.0
        ANVC(L)=ANVC(I)
5       I=I+1
        IF(I.LE.NV) GO TO 1
        NV=L
        L=0
        I=1
2       IF(ANLX1(I).LT.XI.OR.ANLX1(I).GT.XF) GO TO 6
        IF(ANLY1(I).LT.YI.OR.ANLY1(I).GT.YF) GO TO 6
        L=L+1
        ANLX1(L)=ANLX1(I)-XI+1.0
        ANLY1(L)=ANLY1(I)-YI+1.0
        ANLX2(L)=ANLX2(I)-XI+1.0
        ANLY2(L)=ANLY2(I)-YI+1.0
        GO TO 7
6       IF(ANLX2(I).LT.XI.OR.ANLX2(I).GT.XF) GO TO 7
        IF(ANLY2(I).LT.YI.OR.ANLY2(I).GT.YF) GO TO 7
        L=L+1
        ANLX1(L)=ANLX1(I)-XI+1.0
        ANLY1(L)=ANLY1(I)-YI+1.0
        ANLX2(L)=ANLX2(I)-XI+1.0
        ANLY2(L)=ANLY2(I)-YI+1.0
7       I=I+1
        IF(I.LE.NL) GO TO 2
        NL=L
        TYPE *,'ENTER NROW AND NCOL OF SUBFEATURE'
        ACCEPT *,NROW,NCOL
C
C       MODEL FEATURE ROTATION BY THE SPECIFIED ANGLE
C
        TYPE *,'ENTER ANGLE FOR ROTATION IN DEGREE'
        ACCEPT *,ANG
        ANG=ANG/180.*3.14159
        COSA=COS(ANG)
        SINA=SIN(ANG)
        XO=FLOAT(NCOL/2)
        YO=FLOAT(NROW/2)
        DO 500 I=1,NV
        RVX=ANVX(I)-XO
        RVY=ANVY(I)-YO
        RNVX(I)=RVX*COSA+RVY*SINA
        RNVY(I)=RVY*COSA-RVX*SINA
        RNVX(I)=RNVX(I)+XO
        RNVY(I)=RNVY(I)+YO
        RNVC(I)=ANVC(I)
500     CONTINUE
        DO 501 I=1,NL
        RLX=ANLX1(I)-XO
        RLY=ANLY1(I)-YO
        RNLX1(I)=RLX*COSA+RLY*SINA
        RNLY1(I)=RLY*COSA-RLX*SINA
        RLX=ANLX2(I)-XO
        RLY=ANLY2(I)-YO
        RNLX2(I)=RLX*COSA+RLY*SINA
        RNLY2(I)=RLY*COSA-RLX*SINA
        RNLX1(I)=RNLX1(I)+XO
```

```
              RNLY1(I)=RNLY1(I)+YO
              RNLX2(I)=RNLX2(I)+XO
              RNLY2(I)=RNLY2(I)+YO
       501    CONTINUE
              L=0
              I=1
       502    IF(RNVX(I).LT.1.0.OR.RNVX(I).GT.XO*2.) GO TO 503
              IF(RNVY(I).LT.1.0.OR.RNVY(I).GT.YO*2.) GO TO 503
              L=L+1
              RNVX(L)=RNVX(I)
              RNVY(L)=RNVY(I)
              RNVC(L)=RNVC(I)
       503    I=I+1
              IF(I.LE.NV) GO TO 502
              NV=L
              L=0
              I=1
       504    IF(RNLX1(I).LT.1.0.OR.RNLX1(I).GT.XO*2.) GO TO 515
              IF(RNLY1(I).LT.1.0.OR.RNLY1(I).GT.YO*2.) GO TO 515
              L=L+1
              RNLX1(L)=RNLX1(I)
              RNLY1(L)=RNLY1(I)
              RNLX2(L)=RNLX2(I)
              RNLY2(L)=RNLY2(I)
              GO TO 505
       515    IF(RNLX2(I).LT.1.0.OR.RNLX2(I).GT.XO*2.) GO TO 505
              IF(RNLY2(I).LT.1.0.OR.RNLY2(I).GT.YO*2.) GO TO 505
              L=L+1
              RNLX1(L)=RNLX1(I)
              RNLY1(L)=RNLY1(I)
              RNLX2(L)=RNLX2(I)
              RNLY2(L)=RNLY2(I)
       505    I=I+1
              IF(I.LE.NL) GO TO 504
              NL=L
       C      DO 506 I=1,NV
       C      WRITE(6,510) RNVX(I),RNVY(I),RNVC(I)
       C510   FORMAT(1H0,1X,3(F7.2,2X))
       C506   CONTINUE
       C      DO 507 I=1,NL
       C      WRITE(6,511) RNLX1(I),RNLY1(I),RNLX2(I),RNLY2(I)
       C511   FORMAT(1H0,1X,4(F7.2,2X))
       C507   CONTINUE
              CALL RIVGEN1(NV,RNVX,RNVY,RNVC,NL,RNLX1,RNLY1,RNLX2,RNLY2
             1,NROW,NCOL,XS,YS,CS,RRS,AAS,BBS,NNS,NRS,TS)
              IF(NNS.EQ.0) GO TO 522
       C      DO 520 I=1,NNS
       C      WRITE(6,150) XS(I),YS(I),CS(I),NRS(I),TS(I)
       C      DO 520 J=1,NRS(I)
       C      WRITE(6,180) RRS(I,J),AAS(I,J),BBS(I,J)
       C 520  CONTINUE
              CALL RIVCMP1(XS,YS,CS,X,Y,C,RRS,AAS,BBS,TS,T,RR,AA,BB
             1,NRS,NR,NNS,NN,MSCOR,DLTX,DLTY,DLTHA,NDL,XO,YO)
       521    TYPE *,'ENTER "1" IF CONTINUED'
              ACCEPT *,IANS
              IF(IANS.NE.1) GO TO 600
              NV=INV
              NL=INL
              GO TO 15
       522    TYPE *,'NO NEIGHBOR AVAILABLE'
              GO TO 521
       600    STOP
              END

SUBROUTINE RIVGEN1(NV,VX,VY,VC,NL,X1,Y1,X2,Y2
             1,NROW,NCOL,X,Y,C,RR,AA,BB,NN,NR,THETA)
       C
       C      THIS ROUTINE GENERATES RELATIVE INFORMATION VECTOR(RIV)
       C      LIST FROM A GIVEN FEATURE LISTS INCLUDING THE COORDINATES
       C      OF VERTICES AND LINE SEGMENTS.
       C
       C      NV......TOTAL NUMBER OF VERTICES
```

```
C       VX,VY..COORDINATES OF VERTICES
C       VC.....CLASS OF VERTEX
C       X1,Y1,X2,Y2...COORDINATES OF
C              LINE SEGMENT END POINTS
C       NROW,NCOL..FEATURE IMAGE SIZE
C       X,Y...COORDINATES OF FEATURE CORE
C       C......CLASS OF FEATURE CORE
C       RR,AA,BB..SORTED PARAMETERS OF RIV DEFINITION
C       NN.....:INDEX OF FEATURE CORE
C       NR......NUMBER OF NEIGHBORS AT A GIVEN CORE
C       THETA...ORIENTATION ANGLE OF THE NEAREST SATELITE
C              AT A GIVEN CORE
        INTEGER*2 NV,NL
        DIMENSION VX(NV),VY(NV),X1(NL),Y1(NL),X2(NL),Y2(NL)
        DIMENSION X(NV),Y(NV),C(NV),VC(NV)
        DIMENSION R(250),A(250),B(250),NR(250),THETA(250)
        DIMENSION RR(250,250),AA(250,250),BB(250,250)
C       TYPE 100
C 100   FORMAT(1H0,1X,'TYPE NUMBER FOR MAX.RADIUS OF
C       1 THE NEIGHBOR RANGE......',$)
C       ACCEPT 101,MR
C 101   FORMAT(I2)
C 50    TYPE *,'ENTER "1" FOR VERTEX MODE OR "2" FOR LINE MODE'
C       ACCEPT *,MOD
        MR=40
        MOD=2
C       IF(MOD.NE.1.AND.MOD.NE.2)GO TO 50
        BMR=FLOAT(MR)
        BCOL=FLOAT(NCOL-MR+1)
        BROW=FLOAT(NROW-MR+1)
        VCLS=3.0
        NN=0
1       I=1
5       IF(VC(I).NE.VCLS) GO TO 15
C       IF(VX(I).GE.BMR.AND.VX(I).LE.BCOL) GO TO 10
C       IF(VY(I).LT.BMR.OR.VY(I).GT.BROW) GO TO 15
10      CX=VX(I)
        CY=VY(I)
        CALL NGBR1(CX,CY,VX,VY,X1,Y1,X2,Y2,NV,NL,
       1NBCNT,R,A,B,MR,MOD)
        NN=NN+1
        CALL NBSORT(NBCNT,R,A,B,RR,AA,BB,NN,NV)
        X(NN)=CX
        Y(NN)=CY
        C(NN)=VCLS
        NR(NN)=NBCNT
C       WRITE(6,150) X(NN),Y(NN),C(NN),NR(NN)
C150    FORMAT(1H ,3(2X,F5.2),2X,I3)
C       NB=NR(NN)
C       WRITE(6,160) (R(J),A(J),B(J),RR(NN,J),AA(NN,J),BB(NN,J),J=1,NB)
C160    FORMAT(1X,6(2X,F7.2))
15      I=I+1
        IF(I.LE.NV) GO TO 5
        VCLS=VCLS-1.0
        IF(VCLS.NE.1.0) GO TO 1
C
C       NORMALIZATION OF ROTATIONAL ANGLE BY MEANS OF THE ORIENTATION
C       OF THE NEAREST SATELITE AT A GIVEN CORE
C
        I=1
300     J=1
301     IF(J.NE.1) GO TO 308
        IF(RR(I,J).NE.0.0) GO TO 305
        IF(BB(I,J).EQ.0.0) GO TO 304
        THETA(I)=BB(I,J)
        BB(I,J)=0.0
302     J=J+1
        IF(J.LE.NR(I)) GO TO 301
303     I=I+1
        IF(I.LE.NN) GO TO 300
        GO TO 309
304     THETA(I)=0.0
        GO TO 303
```

```
305    THETA(I)=AA(I,J)
306    AA(I,J)=AA(I,J)-THETA(I)
307    BB(I,J)=BB(I,J)-THETA(I)
       GO TO 302
308    IF(RR(I,J)) 307,307,306
309    CONTINUE
       RETURN
       END

SUBROUTINE NGBR1(CX,CY,VX,VY,X1,Y1,X2,Y2,NV,NL,
      1 NBCNT,R,A,B,MR,MOD)
C      THIS ROUTINE DETERMINES FEATURE NEIGHBORS FOR
C      A GIVEN FEATURE CORE.
C
C
C
C      CX,CY......COORDINATES OF FEATURE CORE
C      VX,VY......COORDINATES OF VERTICES
C      NV.........TOTAL NUMBER OF VERTICES
C      NL.........TOTAL NUMBER OF LINE SEGMENTS
C      X1,Y1,X2,Y2..COORDINATES OF THE END POINTS
C                  OF LINE SEGMENTS
C      NBCNT......TOTAL NUMBER OF NEIGHBER COUNT
C      R,A,B......PARAMETERS OF RIV DEFINITION
C
C
       INTEGER*2 NV,NL
       DIMENSION VX(NV),VY(NV),X1(NL),Y1(NL),X2(NL),Y2(NL)
       DIMENSION R(250),A(250),B(250)
       NBCNT=0
       I=1
       IF(MOD.EQ.2) GO TO 5
1      IF(I.GT.NV) GO TO 18
       IF(VX(I).EQ.CX.AND.VY(I).EQ.CY) GO TO 55
       BX=VX(I)
       BY=VY(I)
       CALL NBTST1(CX,CY,BX,BY,MR,NBCNT,R,A)
       B(NBCNT)=0.0
55     I=I+1
       IF(I.LE.NV) GO TO 1
       GO TO 18
5      IF(I.GT.NL) GO TO 18
       BX=X1(I)
       BY=Y1(I)
       L=NBCNT
       CALL NBTST1(CX,CY,BX,BY,MR,NBCNT,R,A)
       IF(L.EQ.NBCNT) GO TO 17
       DX=X2(I)-BX
       DY=Y2(I)-BY
       IF(DX.EQ.0.0) GO TO 10
       P=ATAN2(DY,DX)
       B(NBCNT)=P/3.14159*180.0
       GO TO 17
10     IF(DY)15,16,16
15     B(NBCNT)=-90.
       GO TO 17
16     B(NBCNT)=90.
17     I=I+1
       IF(I.LE.NL) GO TO 5
18     RETURN
       END

SUBROUTINE NBSORT(NBCNT,R,A,B,RR,AA,BB,NN,NV)
C
C      THIS ROUTINE SORTS NEIGHBERS IN ASCENDING ORDER
C      FOR THE ABSOLUTE VALUE OF R.
C
       DIMENSION R(250),A(250),B(250)
       DIMENSION RR(250,250),AA(250,250),BB(250,250)
       I=1
1      ICNT=0
       C=R(I)
       J=1
5      IF(R(J)-C) 10,11,12
```

```
10      ICNT=ICNT+1
        GO TO 12
11      IF(I.GE.J) GO TO 10
12      J=J+1
        IF(J.LE.NBCNT) GO TO 5
        II=ICNT
        RR(NN,II)=R(I)
        AA(NN,II)=A(I)
        BB(NN,II)=B(I)
        I=I+1
        IF(I.LE.NBCNT) GO TO 1
        RETURN
        END

SUBROUTINE RIVCMP1(SX,SY,SC,RX,RY,RC,SR,SA,SB,STHA,RTHA
       1,RR,RA,RB,NRS,NRR,NSC,NRC,MSCOR,DLTX,DLTY,DLTHA,NDL,XO,YO)
C
C       THIS ROUTINE COMPARES A SENSED IMAGE FEATURE RIV
C       WITH THE REFERENCE IMAGE FEATURE RIV TO COUNT
C       THE MATCHING SCORES.
C
C       SX,SY...... COORDINATES OF SENSED FEATURE CORES
C       SC.......... CLASS OF SENSED FEATURE CORES
C       RX,RY...... COORDINATES OF REFERENCE FEATURE CORES
C       RC.......... CLASS OF REFERENCE FEATURE CORES
C       SR,SA,SB..... PARAMETERS OF SENSED FEATURE RIV DEFINITION
C       RR,RA,RB..... PARAMETERS OF REF. FEATURE RIV DEFINTION
C       NRS.......... NO. OF NEIGHBORS ABOUT A GIVEN CORE
C                     IN THE SENSED FEATURE RIV
C       NRR.......... NO. OF NEIGHBORS ABOUT A GIVEN CORE
C                     IN THE REFERENCE FEATURE RIV
C       NSC.......... TOTAL NUMBER OF CORES IN THE SENSED
C                     FEATURE RIV
C       NRC.......... TOTAL NUMBER OF CORES IN THE REFERENCE
C                     FEATURE RIV
C       MSCOR......... FEATURE MATCHING SCORE
C       STHA..........ORIENTATION ANGLE OF THE NEAREST LINE SEGMENT
C                     AT A GIVEN CORE IN SENSED FEATURE RIV
C       RTHA..........ORIENTATION ANGLE OF THE NEAREST LINE SEGMENT
C                     AT A GIVEN CORE IN REFERENCE FEATURE RIV
C
        DIMENSION SX(700),SY(700),SC(700),NRS(50),STHA(50)
        DIMENSION RX(700),RY(700),RC(700),NRR(50),RTHA(50)
        DIMENSION SR(50,50),SA(50,50),SB(50,50)
        DIMENSION RR(50,50),RA(50,50),RB(50,50)
        DIMENSION DLTX(700),DLTY(700),DLTHA(700),MSCOR(700),MSCOR1(700)
        DIMENSION SXD(700),RXD(700),SYD(700),RYD(700),SCOR(700)
        TYPE 100
100     FORMAT(1H0,1X,'ENTER THREE THRESHOLDS OF IRT,IPT, AND ITT')
        ACCEPT 101, IRT,IPT,ITT
101     FORMAT(3I2)
        NDL=0
        IS=1
1       IR=1
2       IF(SC(IS).NE.RC(IR)) GO TO 20
        NDL=NDL+1
        MCNT=0
        L=1
        M=1
        MSET=0
        SXD(NDL)=SX(IS)
        RXD(NDL)=RX(IR)
        SYD(NDL)=SY(IS)
        RYD(NDL)=RY(IR)
        DLTX(NDL)=RX(IR)-SX(IS)
        DLTY(NDL)=RY(IR)-SY(IS)
        DLTHA(NDL)=STHA(IS)-RTHA(IR)
5       DR=ABS(SR(IS,L)-RR(IR,M))
        IDR=IFIX(DR+0.5)
        IF(IDR.GT.IRT) GO TO 200
        DPHI=ABS(SA(IS,L)-RA(IR,M))
        IDPHI=IFIX(DPHI+0.5)
```

```
           IF(IDPHI.GT.IPT) GO TO 200
           DTH=ABS(SB(IS,L)-RB(IR,M))
           IDTH=IFIX(DTH+0.5)
           IF(IDTH.GT.ITT) GO TO 200
           MSET=1
           GO TO 10
    200    M=M+1
           IF(M.LE.NRR(IR)) GO TO 5
           IF(MSET.NE.1) GO TO 12
           M=NRR(IR)
           GO TO 13
    12     M=1
    13     L=L+1
           IF(L.LE.NRS(IS)) GO TO 5
           GO TO 15
    10     MCNT=MCNT+1
           L=L+1
           M=M+1
           IF(M.LE.NRR(IR).AND.L.LE.NRS(IS)) GO TO
    15     MSCOR(NDL)=MCNT
    20     IR=IR+1
           IF(IR.LE.NRC) GO TO 2
           IS=IS+1
           IF(IS.LE.NSC) GO TO 1
           WRITE(6,250) NDL
    250    FORMAT(1H0,1X,I4)
           DO 50 I=1,NDL
           WRITE(6,260) DLTX(I),DLTY(I),SXD(I),S
          1,RXD(I),RYD(I),DLTHA(I),MSCOR(I)
    260    FORMAT(1H,1X,6(F7.2,1X),1X,F7.2,3X,I4
    50     CONTINUE
C          .................................
C          SORT MSCOR(I) IN ASCENDING ORDER AND
C          THE THRESHOLDS OF MATCHING SCORE
C          .................................
           DO 270 I=1,NDL
    270    MSCOR1(I)=MSCOR(I)
           DO 280 J=NDL,1,-1
           DO 280 I=1,J
           IF(MSCOR1(I).LE.MSCOR1(J)) GO TO 280
           TEMP=MSCOR1(I)
           MSCOR1(I)=MSCOR1(J)
           MSCOR1(J)=TEMP
    280    CONTINUE
           WRITE(6,290) (MSCOR1(I),I=1,NDL)
    290    FORMAT(1H0,20(1X,I2))
           IDCNT=0
           DO 291 I=1,NDL
           IF(MSCOR1(I).EQ.0) GO TO 291
           IDCNT=IDCNT+1
           MSCOR1(IDCNT)=MSCOR1(I)
    291    CONTINUE
           IF(IDCNT.EQ.0) GO TO 460
           ISUM=0
           VSUM=0.0
           DO 350 I=1,IDCNT
           ISUM=ISUM+MSCOR1(I)
    350    CONTINUE
           AMEAN=FLOAT(ISUM)/FLOAT(IDCNT)
           IF(IDCNT.EQ.1) GO TO 354
           DO 351 I=1,IDCNT
           VAR=FLOAT(MSCOR1(I))-AMEAN
           VSUM=VSUM+VAR*VAR
    351    CONTINUE
           VSUM=VSUM/FLOAT(IDCNT-1)
           VAR=SQRT(VSUM)
           GO TO 355
    354    VAR=0.0
    355    MSTH=IFIX(AMEAN+VAR+0.5)
           IF(IDCNT.NE.2) GO TO 352
           ISDIF=MSCOR1(IDCNT)-MSCOR1(IDCNT-1)
           IF(ISDIF.GT.1) MSTH=MSTH-1
```

```
352   IF(VAR.EQ.0.0) MSTH=MSTH-1
      WRITE(6,360) AMEAN,VAR,MSTH
360   FORMAT(1H0,1X,'MEAN=',F5.2,2X,'SD=',F5.2,2X,'MSTH=',I2)
      IF(MSTH.LT.2.AND.IDCNT.GT.1) GO TO 460
      DO 380 I=1,NDL
      IF(MSCOR(I).GE.MSTH) GO TO 380
      MSCOR(I)=0
380   CONTINUE
C
C     3-D CENTROID CALCULATION FOR THE TRANSLATIONAL
C     COORDINATES AND ROTATIONAL ANGLE BY MEANS OF
C     THE MATCH SCORES
C
      SUM=0.0
      XSUM=0.0
      YSUM=0.0
      PSUM=0.0
      DO 400 I=1,NDL
      IF(MSCOR(I).EQ.0) GO TO 400
      SCOR(I)=FLOAT(MSCOR(I))
      DLTX(I)=DLTX(I)+16.0
      DLTY(I)=DLTY(I)+16.0
      DLTHA(I)=DLTHA(I)+360.0
      SUM=SUM+SCOR(I)
      XSUM=XSUM+DLTX(I)*SCOR(I)
      YSUM=YSUM+DLTY(I)*SCOR(I)
      PSUM=PSUM+DLTHA(I)*SCOR(I)
400   CONTINUE
      IF(SUM.EQ.0.0) GO TO 460
      CP=PSUM/SUM-360.0
      ICP=IFIX(CP+0.5)
      IF(ICP.EQ.0) GO TO 430
      CPR=-CP/180.*3.14159
      COSA=COS(CPR)
      SINA=SIN(CPR)
      NDL1=0
      DO 410 I=1,NDL
      IF(MSCOR(I).EQ.0) GO TO 410
      NDL1=NDL1+1
      RLX=SXD(I)-XO
      RLY=SYD(I)-YO
      SXD(I)=RLX*COSA-RLY*SINA+XO
      SYD(I)=RLX*SINA+RLY*COSA+YO
      DLTX(NDL1)=RXD(I)-SXD(I)
      DLTY(NDL1)=RYD(I)-SYD(I)
      MSCOR(NDL1)=MSCOR(I)
410   CONTINUE
      WRITE(6,411)(DLTX(I),DLTY(I),MSCOR(I),I=1,NDL1)
411   FORMAT(1H ,1X,2(F7.2,2X),1X,I3)
      SUM=0.0
      XSUM=0.0
      YSUM=0.0
      DO 420 I=1,NDL1
      SCOR(I)=FLOAT(MSCOR(I))
      DLTX(I)=DLTX(I)+16.0
      DLTY(I)=DLTY(I)+16.0
      SUM=SUM+SCOR(I)
      XSUM=XSUM+DLTX(I)*SCOR(I)
      YSUM=YSUM+DLTY(I)*SCOR(I)
420   CONTINUE
      IF(SUM.EQ.0.0) GO TO 460
430   CX=XSUM/SUM
      CY=YSUM/SUM
      ICX=IFIX(CX+XO+0.5)-16
      ICY=IFIX(CY+YO+0.5)-16
      WRITE(6,450) ICX,ICY,CP
450   FORMAT(1X,'THE CENTROID FOR MATCH X,Y,THETA=' 2(I4,2X),1X,F7.2)
      GO TO 500
460   TYPE *,'NO MATCH'
500   RETURN
      END
```

What is claimed is:

1. A method of recognizing a selected physical object through three dimensional image sensing, comprising the steps of:
   identifying selected surfaces of said object from a two dimensional image of said object, said two dimensional image established from a first eye point;
   actuating a sensor to establish a three dimensional image of said object, said sensor defining a second eye point from which said three dimensional image is sensed;
   transforming said sensed three dimensional image to form a transformed image of said object, as sensed portions of said object would be viewed from said first eye point; and
   matching said selected surfaces of said two dimensional image to surfaces of said transformed image to identify said object.

2. The method of claim 1, wherein said two dimensional image is formed at least in part from a digitized photograph of said object.

3. The method of claim 1, wherein said sensor comprises a solid-state LADAR sensor.

4. The method of claim 1, wherein said sensor is mounted in a housing moving generally toward said object, and wherein said step of transforming said three dimensional image is performed repeatedly.

5. The method of claim 1, wherein said step of transforming said three dimensional image comprises adjusting the scale of said sensed image.

6. A method of target identification for use with air-conveyed weapons, comprising the steps of:
   establishing a two dimensional image on said target, said two dimensional image established from a first eye point;
   establishing a three dimensional image of an area which includes said target, and said three dimensional image established through use of a LADAR sensor, said three dimensional image established from a second eye point;
   transforming said three dimensional sensed image to an image configured as if said three dimensional sensed image had been established from said first eye point; and
   matching said transformed image to said two dimensional image to identify said target.

7. The method of claim 6, wherein said step of establishing a two dimensional image of said target comprises the steps of:
   establishing a photograph of said target; and
   digitizing said photograph.

8. The method of claim 6, wherein said established three dimensional image comprises the use of said LADAR sensor to define a three dimensional edge representation of said target for both range and intensity edges.

9. The method of claim 6, wherein said step of establishing a three dimensional image comprises the step of utilizing said LADAR sensor to establish three dimensional intensity data of surfaces of said target.

10. The method of claim 6, wherein said step of transforming said three dimensional sensed image to form a transformed image comprises the scaling of said sensed three dimensional image.

11. A method of target identification for use in effecting the guidance of an air-conveyed weapon, comprising the steps of:
    establishing a digital representation of said target, said digital representation established from a first eye point;
    actuating a LADAR sensor in said weapon to establish a three dimensional image of an area which includes said target, said three dimensional image established from a second eye point;
    transforming said three dimensional sensed image to a transformed image generally depicting the sensed data of said area including said target as such sensed data would have been sensed from said first eye point;
    matching said transformed image to said reference image to identify said target; and
    generating an error signal, said error signal communicated to the guidance system of said weapon for controlling the course of said weapon.

12. The method of claim 11, where said established reference image is a two dimensional image.

13. The method of claim 11, wherein said LADAR sensor establishes a three dimensional image including edge boundaries of said sensed area.

14. The method of claim 11, wherein said generated error signal comprises course deviation representations relative to X Y and Z axes in a Cartesian coordinate system.

15. The method of claim 11, wherein said generated error signal includes data representative of angular error.

16. The method of claim 11, wherein said generated error signal contains data representative of angular rate.

17. The method of claim 1, wherein intensity images are interpreted as three dimensional surfaces by using the range image.

* * * * *

UNITED STATES PATENT AND TRADEMARK OFFICE
CERTIFICATE OF CORRECTION

PATENT NO. : 5,275,354
DATED : JANUARY 4, 1994
INVENTOR(S) : LEWIS G. MINOR AND ROBERT T. KITAHARA

It is certified that error appears in the above-indentified patent and that said Letters Patent is hereby corrected as shown below:

Col. 2, line 44, "cot elated" should read --correlated--;

Col. 3, line 39, "ND:YLF, ND:YAG" should read --Nd:YLF, Nd:YAG--;

Col. 3, line 44, "gambled" should read --gimbled--;

Col. 7, line 17, "44" should read --144--.

Signed and Sealed this

Nineteenth Day of July, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,275,354

DATED : January 4, 1994

INVENTOR(S) : Lewis G. Minor and Robert T. Kitihara

It is certified that error appears in the above-indentified patent and that said Letters Patent is hereby corrected as shown below:

Column 3, line 50, delete "laser preferably".

Signed and Sealed this

Twenty-fifth Day of October, 1994

Attest:

BRUCE LEHMAN

*Attesting Officer*        *Commissioner of Patents and Trademarks*